United States Patent
Devarajan et al.

(10) Patent No.: US 12,231,403 B2
(45) Date of Patent: *Feb. 18, 2025

(54) CLOUD-BASED INTRUSION PREVENTION SYSTEM, MULTI-TENANT FIREWALL, AND STREAM SCANNER

(71) Applicant: Zscaler, Inc., San Jose, CA (US)

(72) Inventors: Srikanth Devarajan, San Jose, CA (US); Sushil Pangeni, Fremont, CA (US); Vladimir Stepanenko, Sunnyvale, CA (US); Ravinder Verma, San Jose, CA (US); Naresh Kumar Povlavaram Munirathnam, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 17/584,467

(22) Filed: Jan. 26, 2022

(65) Prior Publication Data

US 2022/0217121 A1 Jul. 7, 2022

Related U.S. Application Data

(63) Continuation of application No. 16/858,892, filed on Apr. 27, 2020, now Pat. No. 11,277,383, which is a (Continued)

(51) Int. Cl.
*H04L 9/40* (2022.01)
*H04L 43/028* (2022.01)
(Continued)

(52) U.S. Cl.
CPC ........ *H04L 63/0254* (2013.01); *H04L 43/028* (2013.01); *H04L 63/0218* (2013.01); *H04L 67/10* (2013.01)

(58) Field of Classification Search
CPC ............ H04L 63/0254; H04L 63/0218; H04L 63/1416; H04L 43/028; H04L 43/04; H04L 41/0681
See application file for complete search history.

(56) References Cited

U.S. PATENT DOCUMENTS

| 7,013,482 B1 * | 3/2006 | Krumel ............... H04L 63/0227 726/13 |
| 7,131,141 B1 | 10/2006 | Blewett et al. |

(Continued)

OTHER PUBLICATIONS

Adityaram Oza, "HTTP Attack Detection using N-gram Analysis," Spring 2013, San Jose State University SJSU ScholarWorks, Master's Theses and Graduate Research, pp. 1-73.
(Continued)

*Primary Examiner* — Robert B Leung
(74) *Attorney, Agent, or Firm* — Baratta Law PLLC; Lawrence A. Baratta, Jr.; Matthew R. Gore

(57) ABSTRACT

A method implemented by a cloud-based system includes steps of, responsive to connecting to a user device with a user associated with a first tenant of a plurality of tenants, obtaining security policies for the user that are configured for the tenant, wherein the security policies for the user are the same regardless of connection type, location of the user, and device type and operating system of the user device; stream scanning traffic between the user device and the Internet based on the security policies, wherein the security policies are for firewall and intrusion prevention functions; and one of allowing and blocking the traffic based on the stream scanning.

18 Claims, 34 Drawing Sheets

Related U.S. Application Data continuation-in-part of application No. 16/781,505, filed on Feb. 4, 2020, now Pat. No. 11,582,192, which is a continuation of application No. 14/943,579, filed on Nov. 17, 2015, now Pat. No. 10,594,656.

(51) Int. Cl.
*H04L 67/10* (2022.01)
*H04L 67/141* (2022.01)
*H04L 67/146* (2022.01)

(56) References Cited

U.S. PATENT DOCUMENTS

| | | | |
|---|---|---|---|
| 7,624,446 B1 | 11/2009 | Wilhelm | |
| 7,891,001 B1* | 2/2011 | Greenawalt | H04L 63/20 |
| | | | 713/153 |
| 8,259,571 B1 | 9/2012 | Raphel et al. | |
| 8,276,202 B1 | 9/2012 | Dubrovsky et al. | |
| 8,464,335 B1* | 6/2013 | Sinha | G06F 21/51 |
| | | | 713/153 |
| 8,813,221 B1 | 8/2014 | Dubrovsky et al. | |
| 8,869,259 B1 | 10/2014 | Udupa et al. | |
| 8,887,236 B2 | 11/2014 | Allison et al. | |
| 9,094,288 B1 | 7/2015 | Nucci et al. | |
| 9,369,433 B1 | 6/2016 | Paul et al. | |
| 9,419,942 B1 | 8/2016 | Buruganahalli et al. | |
| 9,641,544 B1 | 5/2017 | Treat et al. | |
| 10,594,656 B2 | 3/2020 | Devarajan et al. | |
| 10,924,503 B1 | 2/2021 | Pereira et al. | |
| 11,159,486 B2 | 10/2021 | Pangeni et al. | |
| 2003/0110208 A1* | 6/2003 | Wyschogrod | G06F 16/90344 |
| | | | 709/202 |
| 2003/0229708 A1 | 12/2003 | Lie et al. | |
| 2003/0229710 A1 | 12/2003 | Lie et al. | |
| 2006/0174336 A1 | 8/2006 | Chen | |
| 2006/0195896 A1* | 8/2006 | Fulp | H04L 63/0218 |
| | | | 726/13 |
| 2007/0011734 A1* | 1/2007 | Balakrishnan | H04L 63/0245 |
| | | | 726/13 |
| 2007/0192863 A1 | 8/2007 | Kapoor et al. | |
| 2008/0229415 A1 | 9/2008 | Kapoor et al. | |
| 2008/0262990 A1 | 10/2008 | Kapoor et al. | |
| 2010/0043068 A1 | 2/2010 | Varadhan et al. | |
| 2011/0099631 A1* | 4/2011 | Willebeek-LeMair | |
| | | | H04L 43/028 |
| | | | 726/23 |
| 2011/0213869 A1 | 9/2011 | Korsunsky et al. | |
| 2011/0214157 A1 | 9/2011 | Korsunsky et al. | |
| 2011/0219035 A1 | 9/2011 | Korsunsky et al. | |
| 2011/0231510 A1 | 9/2011 | Korsunsky et al. | |
| 2011/0231564 A1 | 9/2011 | Korsunsky et al. | |
| 2011/0238855 A1 | 9/2011 | Korsunsky et al. | |
| 2012/0210417 A1 | 8/2012 | Shieh | |
| 2012/0300615 A1 | 11/2012 | Kempf et al. | |
| 2012/0304244 A1 | 11/2012 | Xie et al. | |
| 2013/0340029 A1* | 12/2013 | De Armas | H04L 63/20 |
| | | | 726/1 |
| 2014/0007222 A1 | 1/2014 | Qureshi et al. | |
| 2014/0013434 A1 | 1/2014 | Ranum et al. | |
| 2014/0115578 A1 | 4/2014 | Cooper et al. | |
| 2014/0153435 A1* | 6/2014 | Rolette | H04L 43/028 |
| | | | 370/252 |
| 2014/0208426 A1 | 7/2014 | Natarajan et al. | |
| 2014/0259094 A1 | 9/2014 | Narayanaswamy et al. | |
| 2015/0052601 A1 | 2/2015 | White et al. | |
| 2015/0058967 A1 | 2/2015 | Ringdahl et al. | |
| 2015/0106909 A1 | 4/2015 | Chen et al. | |
| 2015/0143501 A1 | 5/2015 | Cherukuri et al. | |
| 2015/0244617 A1 | 8/2015 | Nakil et al. | |
| 2016/0044035 A1* | 2/2016 | Huang | H04L 41/0806 |
| | | | 726/4 |
| 2016/0080395 A1 | 3/2016 | Reddy et al. | |
| 2016/0127395 A1 | 5/2016 | Underwood et al. | |
| 2016/0205071 A1 | 7/2016 | Cooper et al. | |
| 2016/0226825 A1 | 8/2016 | Ardeli et al. | |
| 2018/0302342 A1* | 10/2018 | Zaifman | H04L 49/555 |
| 2019/0052553 A1 | 2/2019 | Subramanian et al. | |
| 2019/0141015 A1 | 5/2019 | Nellen | |
| 2019/0182213 A1 | 6/2019 | Saavedra et al. | |
| 2020/0067861 A1 | 2/2020 | Leddy et al. | |
| 2021/0019412 A1 | 1/2021 | Hewlett et al. | |
| 2021/0021611 A1 | 1/2021 | Hewlett et al. | |

OTHER PUBLICATIONS

Saad Hafeez, "Deep Packet Inspection using Snort," 2016, pp. 1-41.
Dec. 20, 2016 European Search Report issued in European Patent Application EP 16 16 8949.

* cited by examiner

Network Services

| # | Name | TCP Source Ports | TCP Destination Ports | UDP Source Ports | UDP Destination Ports | Description |
|---|------|------------------|------------------------|-------------------|------------------------|-------------|
| 1 | AIM | -- | 5190 | -- | -- | AIM (originally AOL Instant Messe... |
| 2 | DNS | -- | 53 | -- | 53 | The DNS protocol is used to transl... |
| 3 | Echo | -- | 7 | -- | 7 | Echo Protocol is a service in the In... |
| 4 | FTP | -- | 21 | -- | -- | The FTP protocol is used for reliab... |
| 5 | Gnutella | -- | 6346-6347 | -- | 6346-6347 | Gnutella is a peer-to-peer protocol... |
| 6 | H.323 | -- | 1503, 1720, 1731, 389, 522 | -- | 1719 | H.323 is a standard approved by I... |
| 7 | HTTP | -- | 80, 81, 82 | -- | -- | The Hypertext Transfer Protocol (... |
| 8 | HTTP Proxy | -- | 3128, 8080 | -- | -- | HTTP tunneling is a technique by ... |
| 9 | HTTPS | -- | 443 | -- | -- | HTTPS is the secure version of HT... |
| 10 | ICMP | -- | -- | -- | -- | ICMP is one of the main protocols... |
| 11 | Ident | -- | 113 | -- | -- | The Identification Protocol provid... |
| 12 | IKE | -- | 500 | -- | 500 | IKE is a protocol to obtain authent... |
| 13 | IKE-NAT | -- | -- | -- | 4500 | IKE-NAT allows Network Address ... |
| 14 | ILS | -- | 1002, 389, 522, 636 | -- | -- | Internet Locator Service includes ... |
| 15 | IMAP | -- | 143, 220, 993 | -- | 220 | Internet Message Access Protocol... |
| 16 | IRC | -- | 6660-6669 | -- | -- | IRC (Internet Relay Chat) is an inst... |
| 17 | Kerberos | -- | 88 | -- | 88 | Kerberos is a computer network a... |

FIG. 9

| # | Name | Category | Description |
|---|---|---|---|
| 22 | aigame | Web | aigame: This protocol plug-in classifies the http traffic to the host aigame.com. |
| 23 | aii | Web | aii: Chinese fashion shopping website. |
| 24 | aim | Instant Messaging | aim: AIM (originally AOL Instant Messenger) is an instant messaging application. The protocol name is OSCAR (Open System for CommunicAti... |
| 25 | aim_express | Instant Messaging | aim_express: AOL Instant Messaging Express supports many of the standard features included in AIM, but does not provide advanced feature... |
| 26 | aim_transfer | File_server_transfer | aim_transfer: AIM is an instant messaging protocol |
| 27 | aimini | File_server_transfer | aimini: Aimini is an online solution to store, send and share files |
| 28 | aims | Instant Messaging | aims: AIMS is the secure version of AIM |
| 29 | airaim | Instant Messaging | airaim: This protocol plug-in classifies the http traffic to the host airaim.com. It also classifies the ssl traffic to the Common Name airaim.com |
| 30 | aizhan | Web | aizhan: This protocol plug-in classifies the http traffic to the host aizhan.com. |
| 31 | akamai | Web | akamai: This protocol plug-in classifies the http traffic to the hosts akamai.net, akamaihd.net, akamaiedge.net, edgesuite.net, edgekey.net, ak... |
| 32 | Alexa | Web | alexa: This protocol plug-in classifies the http traffic to the host alexa.com. |
| 33 | Alibaba | Web | alibaba: Alibaba is the world's largest online business-to-business trading platform for small businesses. |
| 34 | alimama | Web | alimama: This protocol plug-in classifies the http traffic to the host alimama.com. |
| 35 | alipay | Web | alipay: This protocol plug-in classifies the http traffic to the host alipay.com. It also classifies the ssl traffic to the Common Name alipay.com |
| 36 | aljazeera | Web | aljazeera: This protocol plug-in classifies the http traffic to the host aljazeera.net. |
| 37 | All other Store | Mobile App Download | unknown_store: SMURL_MAPPSTORE_UNKNOWN_STORE |
| 38 | all_slots_casino | Online gaming | all_slots_casino: This protocol plug-in classifies the http traffic to the host setup.realgaming.com |
| 39 | allocine | Web | allocine: This protocol plug-in classifies the http traffic to the host allocine.fr. |
| 40 | altiris | network management | altiris: Altiris provides service-oriented management solutions which allow managing IT infrastructures |
| 41 | Amazon App Store | Mobile App Download | amazon_store: SMURL_MAPPSTORE_AMAZON_STORE |

| Rule Order | Rule Name | Criteria | Action |
|---|---|---|---|
| 1 | Skype | Network Applications: Skype | Allow |
| 2 | Bittorrent | Network Applications: BitTorrent | Block/Drop |
| 3 | ICMP | Network Services: ICMP | Allow |
| 4 | Alexa, Alibaba | Network Applications: Alexa, Alibaba | Block/Drop |
| 5 | Basic | Network Services: DNS, HTTP, HTTPS | Allow |
| Default | Default Firewall Filtering Rule | Any | Block/Drop |

Advanced Settings

Authentication Bypass

Bypassed URL Categories: None ▼

Bypassed URLs: Use Enter to add multipl

Internal IP Logging

Log Internal IPs from XFF Headers: ✗

Windows App Traffic Authentication

Enforce Surrogate IP Authentication: ✓

HTTP Tunnel Control

Inspect tunneled HTTP traffic: ✗

Block tunneling to non-HTTP/HTTPS ports: ✗

Services Forwarded to HTTP Web Proxy

HTTP Services: HTTP ▼

HTTPS Services: HTTPS ▼

Services Applicable to DNS Transaction Policies

DNS Services: DNS ▼

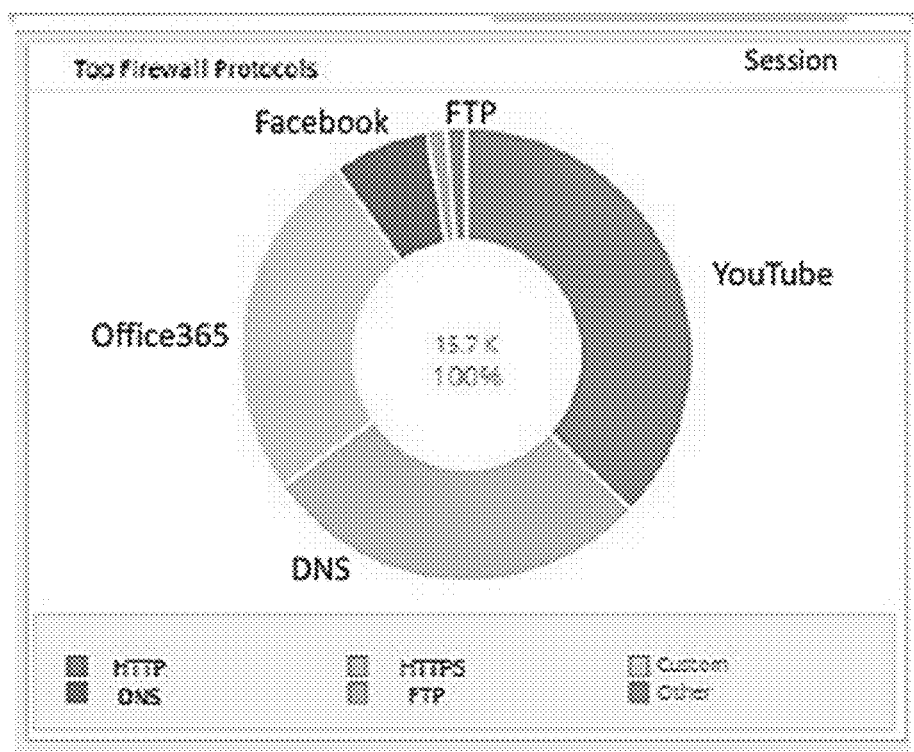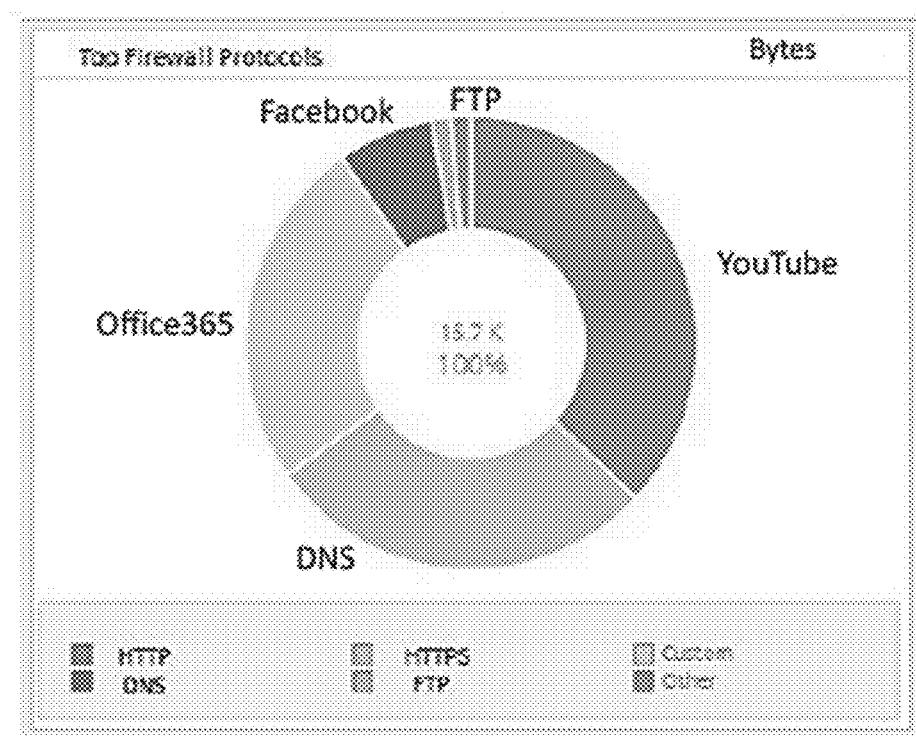
FIG. 25

CLOUD-BASED INTRUSION PREVENTION SYSTEM, MULTI-TENANT FIREWALL, AND STREAM SCANNER

CROSS-REFERENCE TO RELATED APPLICATIONS

The present disclosure is a continuation of U.S. patent application Ser. No. 16/858,892, filed Apr. 27, 2020, and entitled "Cloud-based Intrusion Prevention System," which is a continuation-in-part of U.S. patent application Ser. No. 16/781,505, filed Feb. 4, 2020, and entitled "Multi-tenant cloud-based firewall systems and methods," which is a continuation of U.S. patent application Ser. No. 14/943,579, filed Nov. 17, 2015 (now U.S. Pat. No. 10,594,656, issued Mar. 17, 2020), and entitled "Multi-tenant cloud-based firewall systems and methods," the contents of each incorporated by reference in their entirety.

FIELD OF THE DISCLOSURE

The present disclosure generally relates to computer networking systems and methods. More particularly, the present disclosure relates to a cloud-based Intrusion Prevention System (IPS), cloud-based firewall, and a cloud-based stream scanner.

BACKGROUND OF THE DISCLOSURE

Conventionally, Intrusion Prevention Systems (IPS), also known as Intrusion Detection and Prevention Systems (IDPS), are network security appliances that monitor network or system activities for malicious activity. The main functions of an IPS are to identify malicious activity, log information about this activity, report it, and attempt to block or stop it. Intrusion prevention systems are considered extensions of Intrusion Detection Systems (IDS) because they both monitor network traffic and/or system activities for malicious activity. The main differences are, unlike IDS, IPS systems are placed in-line and are able to actively prevent or block intrusions that are detected. An IPS system can take such actions as sending an alarm, dropping detected malicious packets, resetting a connection or blocking traffic from the offending Internet Protocol (IP) address. An IPS also can correct Cyclic Redundancy Check (CRC) errors, defragment packet streams, mitigate Transmission Control Protocol (TCP) sequencing issues, and clean up unwanted transport and network layer options.

Conventional IPS systems are physical devices and can be network-based, wireless, behavioral, or host-based. A network-based IPS can monitor traffic for a specific network. A wireless IPS can physically be collocated with a wireless network to monitor and analyze wireless network protocols. A behavioral system can examine network traffic to identify threats that generate unusual traffic flows such as Distributed Denial of Service (DDoS) attacks, etc. Finally, a host-based system is executed on a single host, i.e., a host-based system monitors a single host to identify suspicious activity associated with the host.

Information Technology (IT) is moving away from physical appliances; network perimeters are disappearing with user's mobile devices, 5G speeds, Bring Your Own Device (BYOD), etc. As such, physical IPS appliances are not able to capture and protect against threats where there is no perimeter. Enterprise users and applications ("apps") have left the enterprise network, but conventional IPS systems remain sitting in the data center. Mobility and cloud migration are causing the IPS investment, and the associated security, to run blind. Conventional IPS was designed to protect servers sitting in the data center, but intrusions now leverage the weakest link: the user. Enterprises cannot afford Inspection compromises and Secure Sockets Layer (SSL) limitations. The demands of inspecting all traffic, including SSL—where most threats hide—has been a challenge for conventional IPS approaches.

Also, in networks, firewalls monitor and control incoming and outgoing network traffic based on predetermined security rules. A firewall typically establishes a barrier between a trusted, secure internal network and another outside network, such as the Internet, that is assumed not to be secure or trusted. Firewalls are often categorized as either network firewalls or host-based firewalls. Network firewalls are a software appliance running on general-purpose hardware or hardware-based firewall computer appliances that filter traffic between two or more networks. Host-based firewalls provide a layer of software on one host that controls network traffic in and out of that single machine. Firewall appliances may also offer other functionality to the internal network they protect, such as acting as a Dynamic Host Configuration Protocol (DHCP) or Virtual Private Network (VPN) server for that network. Disadvantageously, conventional firewalls, either network firewalls or host-based firewalls are physical devices located at the boundary between the internal network and the outside network (the Internet). That is, network firewalls are appliance-based at the network boundary, and host-based firewalls are on a single device. This scheme does not reflect the evolving network of cloud-based connectivity, Bring Your Own Device (BYOD), etc. For example, a road warrior, home user, or employee with their mobile device does not have the benefit of a network firewall outside of the internal network. Also, mobile devices and their associated operating systems may not allow host-based firewalls. Thus, there is a need for next-generation firewall systems and methods that can adapt to the evolving network.

BRIEF SUMMARY OF THE DISCLOSURE

The present disclosure relates to a cloud-based Intrusion Prevention System (IPS). A cloud-based IPS enables IPS threat protection where traditional IPS systems cannot, namely, the cloud-based IPS follows users, no matter the connection type, location, device type, operating system, etc. Enterprise IT has always-on threat protection and visibility. The cloud-based IPS works across a full suite of technologies such as firewall, sandbox, Cloud Access Security Broker (CASB), Data Leakage Prevention (DLP), etc. to stop various types of attacks. The cloud-based IPS provides threat protection from botnets, advanced threats, and zero-day vulnerabilities, along with contextual information about the user, app, and threat. The cloud-based IPS is delivered as a cloud-based service, so inspection demands scale automatically, updates are immediate, and the need to manage hardware is removed.

BRIEF DESCRIPTION OF THE DRAWINGS

The present disclosure is illustrated and described herein with reference to the various drawings, in which like reference numbers are used to denote like system components/method steps, as appropriate, and in which:

FIG. 9 is a screenshot associated with the firewall illustrating example network services;

FIG. 10 is a screenshot associated with the firewall illustrates example applications;

FIG. 12A is a screenshot of defining a firewall filtering rule;

FIG. 12B is another screenshot of defining a firewall filtering rule;

FIG. 13 is screenshots of editing IP groups;

FIG. 18 is a screenshot of creating firewall policies;

FIG. 19 is a screenshot of a NAT configuration;

FIG. 20 is a screenshot of a user authentication screen;

FIG. 21 is a screenshot of DNS policy;

FIG. 22 is a screenshot of a reporting screen for firewall insights;

FIG. 25 is graphs of top firewall protocols in sessions and bytes;

DETAILED DESCRIPTION OF THE DISCLOSURE

Again, the present disclosure relates to a cloud-based Intrusion Prevention System (IPS). A cloud-based IPS enables IPS threat protection where traditional IPS systems cannot, namely, the cloud-based IPS follows users, no matter the connection type, location, device type, operating system, etc. Enterprise IT has always-on threat protection and visibility. The cloud-based IPS works across a full suite of technologies such as firewall, sandbox, Cloud Access Security Broker (CASB), Data Leakage Prevention (DLP), etc. to stop various types of attacks. The cloud-based IPS provides threat protection from botnets, advanced threats, and zero-day vulnerabilities, along with contextual information about the user, app, and threat. The cloud-based IPS is delivered as a cloud-based service, so inspection demands scale automatically, updates are immediate, and the need to manage hardware is removed.

Also, the present disclosure relates to a multi-tenant cloud-based firewall. The firewall systems and methods can operate overlaid with existing branch office firewalls or routers as well as eliminate the need for physical firewalls. The firewall systems and methods can protect users at user level control, regardless of location, device, etc., over all ports and protocols (not only ports 80/443) while providing administrators a single unified policy for Internet access and integrated reporting and visibility. In an embodiment, the firewall systems and methods can eliminate dedicated hardware at user locations (e.g., branch or regional offices, etc.), providing a software-based cloud solution, such as a Virtualized Network Function (VNF) in the cloud. The firewall systems and methods support application awareness to identify application regardless of port, protocol, evasive tactic, or Secure Sockets Layer (SSL); user awareness to identify users, groups, and locations regardless of physical Internet Protocol (IP) address; visibility and policy management providing globally unified administration, policy management, and reporting; threat protection and compliance to block threats and data leaks in real-time; high performance through an in-line cloud-based, scalable system; and cost effectiveness with rapid deployment. In an embodiment, the firewall systems and methods are described implemented through or in conjunction with a distributed, cloud-based security system and the firewall systems and methods can be integrated with sandboxing, web security, Data Leakage Prevention (DLP), content filtering, SSL inspection, malware protection, and cloud-scale correlation, anti-virus, bandwidth management reporting and analytics, and the like.

§ 1.0 Example High-Level System Architecture—Cloud-Based Security System

Figure 1:
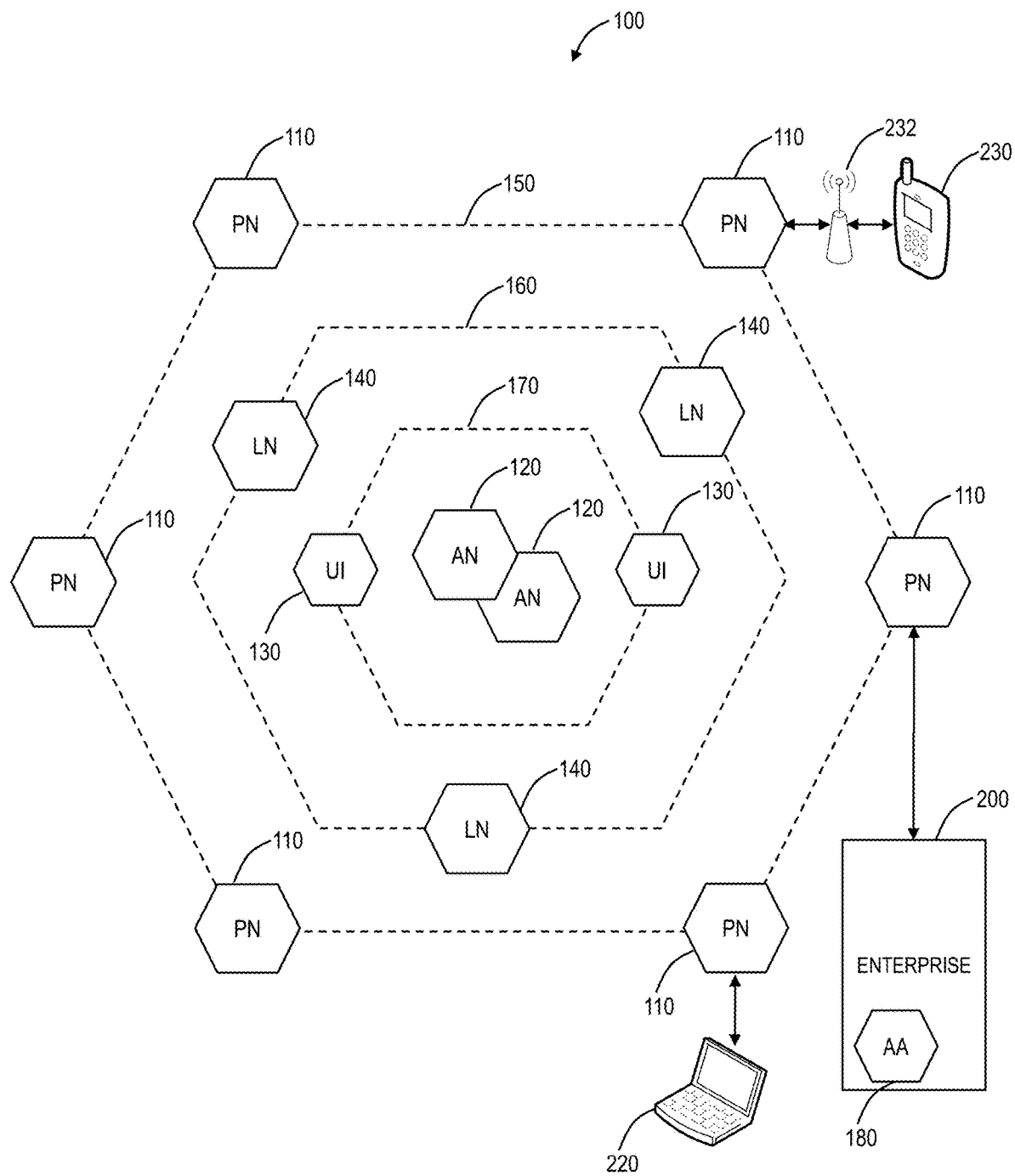
FIG. 1 is a network diagram of a distributed security system.

FIG. 1 is a block diagram of a distributed security 100. The 100 may, for example, be implemented as an overlay network in a wide area network (WAN), such as the Internet, a local area network (LAN), or the like. The 100 includes processing nodes (PN) 110, that proactively detect and preclude the distribution of security threats, e.g., malware, spyware, viruses, email spam, DLP, content filtering, etc., and other undesirable content sent from or requested by an external system. The processing nodes 110 can also log activity and enforce policies, including logging changes to the various components and settings in the 100. Example external systems may include an enterprise 200, a computer device 220, and a mobile device 230, or other network and computing systems communicatively coupled to the 100. In an embodiment, each of the processing nodes 110 may include a decision system, e.g., data inspection engines that operate on a content item, e.g., a web page, a file, an email message, or some other data or data communication that is sent from or requested by one of the external systems. In an embodiment, all data destined for or received from the Internet is processed through one of the processing nodes 110. In another embodiment, specific data specified by each external system, e.g., only email, only executable files, etc., is processed through one of the processing node 110.

Each of the processing nodes 110 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the processing node 110 may allow the distribution of the content item, preclude distribution of the content item, allow distribution of the content item after a cleaning process, or perform threat detection on the content item. In an embodiment, the actions taken by one of the processing nodes 110 may be determined by the threat classification of the content item and on a security policy of the external system to which the content item is being sent from or from which the content item is being requested by. A content item is violating if, for any part $C=[c1, c2, \ldots, cm]$ of the content item, at any of the processing nodes 110, any one of the data inspection engines generates an output that results in a classification of "violating."

Figure 3:
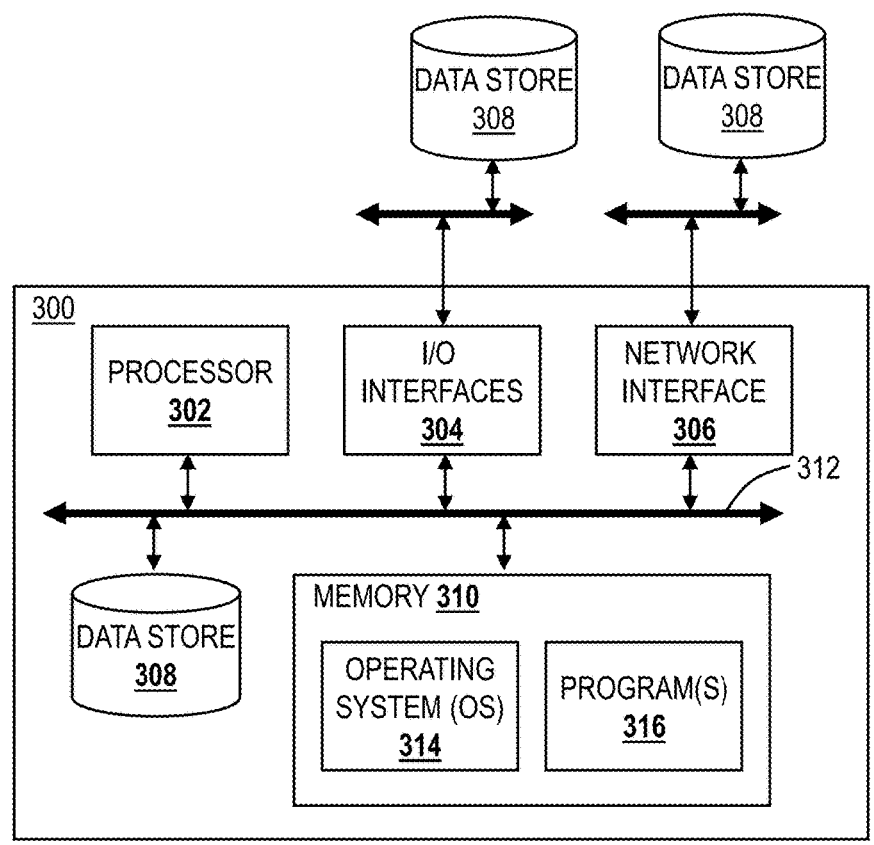
FIG. 3 is a block diagram of a server which may be used in the distributed security system of FIG. 1 or with any other cloud-based system.

Each of the processing nodes 110 may be implemented by one or more of computer and communications devices, e.g., server computers, gateways, switches, etc., such as the server 300 described in FIG. 3. In an embodiment, the processing nodes 110 may serve as an access layer 150. The access layer 150 may, for example, provide external system access to the security 100. In an embodiment, each of the processing nodes 110 may include Internet gateways and one or more servers, and the processing nodes 110 may be distributed through a geographic region, e.g., throughout a country, region, campus, etc. According to a service agreement between a provider of the 100 and an owner of an external system, the 100 may thus provide security protection to the external system at any location throughout the geographic region.

Data communications may be monitored by the 100 in a variety of ways, depending on the size and data requirements of the external system. For example, an enterprise 200 may have multiple routers, switches, etc. that are used to communicate over the Internet, and the routers, switches, etc. may be configured to establish communications through the nearest (in traffic communication time, for example) processing node 110. A mobile device 230 may be configured to communicate to a nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, websites and/or content that is disallowed, restricted domains, etc. The authority nodes 120 may distribute the policy data to the access nodes 110. In an embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may be implemented by push and pull distribution schemes described in more detail below. In an embodiment, each of the authority nodes 120 may be implemented by one or more computer and communication devices, e.g., server computers, gateways, switches, etc., such as the server 300 described in FIG. 3. In some embodiments, the authority nodes 120 may serve as an application layer 170. The application layer 170 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain web sites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 170. Each of the logging nodes 140 may store data related to security operations and network traffic processed by the processing nodes 110 for each external system. In an embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used. Note, as described herein, the systems and methods for tracking and auditing changes in a multi-tenant cloud system can be implemented in the data logging layer 160, for example.

In an embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an embodiment, the processing node 110 may act as a forward proxy that receives user requests to external servers addressed directly to the processing node 110. In another embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an embodiment, an enterprise gateway may be configured so that user requests are routed through the processing node 110 by establishing a communication tunnel between the enterprise gateway and the processing node 110. For establishing the tunnel, existing protocols such as generic routing encapsulation (GRE), layer two tunneling protocol (L2TP), or other Internet Protocol (IP) security protocols may be used. In another embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at or within the enterprise, the access agent 180 may be configured to perform MPLS labeling. In another transparent proxy mode embodiment, a protected system, such as the enterprise 200, may identify the processing node 110 as a next hop router for communication with the external servers.

Generally, the distributed security 100 may generally refer to an example cloud-based security system. Other cloud-based security systems and generalized cloud-based systems are contemplated for the systems and methods for tracking and auditing changes in a multi-tenant cloud system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser, with no installed client version of an application required. Centralization gives cloud service providers complete control over the versions of the browser-based applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The distributed security 100 is illustrated herein as one example embodiment of a cloud-based system, and those of ordinary skill in the art will recognize the tracking and auditing systems and methods contemplate operation on any cloud-based system.

§ 2.0 Example Detailed System Architecture and Operation

Figure 2:
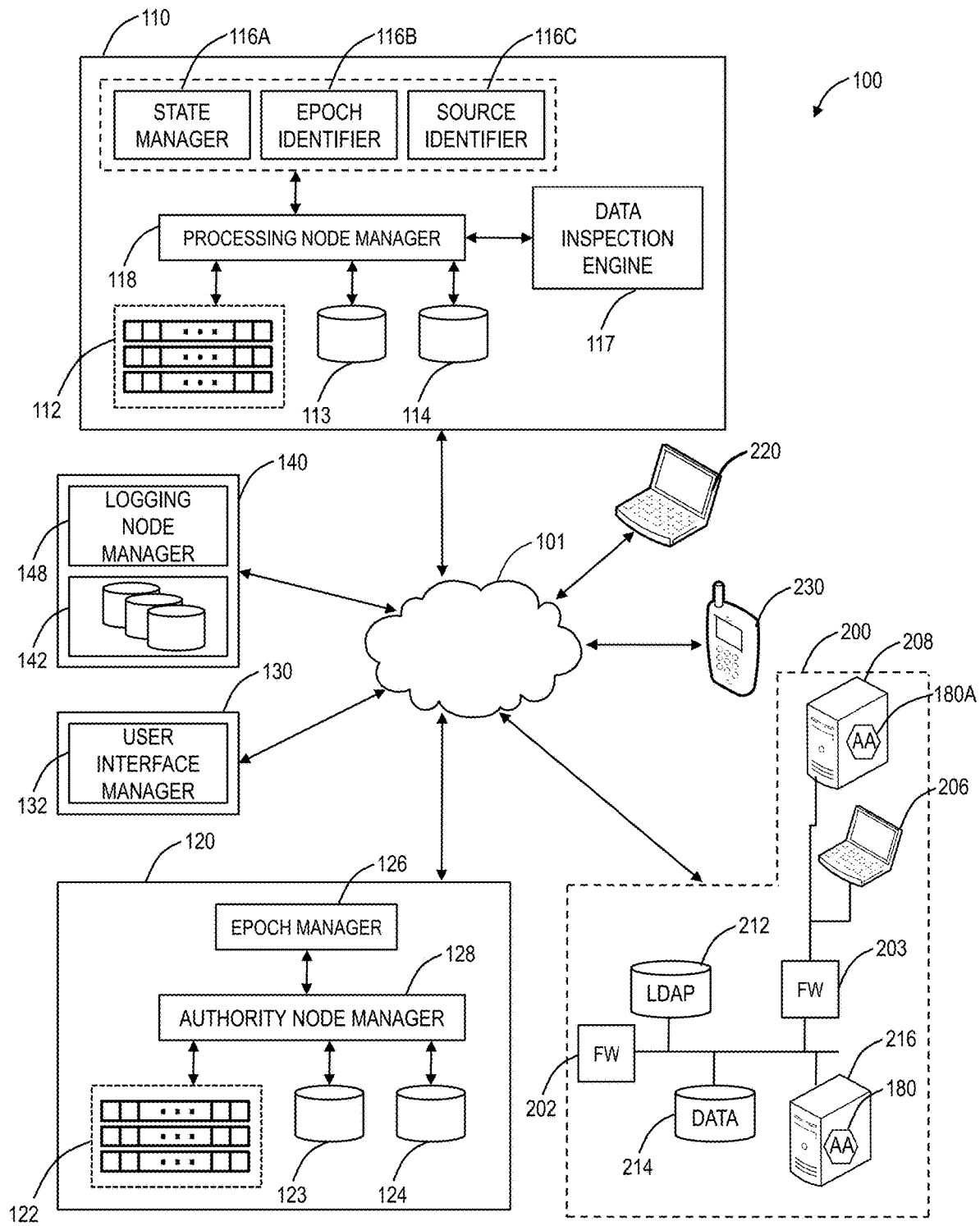
FIG. 2 is a network diagram of the distributed security system of FIG. 1 illustrating various components in more detail.

FIG. 2 is a block diagram of various components of the distributed security system 100 in more detail. Although FIG. 2 illustrates only one representative component processing node 110, authority node 120, and logging node 140, those of ordinary skill in the art will appreciate there may be many of each of the component nodes 110, 120, and 140 present in the 100. A wide area network (WAN) 101, such as the Internet, or some other combination of wired and/or wireless networks, communicatively couples the processing node 110, the authority node 120, and the logging node 140 to one another. The external systems 200, 220, and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a lightweight directory access protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include user identifiers, login passwords, and a login history associated with each user identifier. The other data stores 214 may include sensitive information, such as bank records, medical records, trade secret information, or any other information warranting protection by one or more security measures.

In an embodiment, a client access agent 180a may be included on a client computer 208. The client access agent 180a may, for example, facilitate security processing by providing a hash index of files on the user computer 208 to a processing node 110 for malware, virus detection, etc. Other security operations may also be facilitated by the access agent 180a. In another embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the server 206 of the enterprise 200, or to some other secured data provider server. The computer device 220 and the mobile device 230 can also store information warranting security measures, such as personal bank records, medical information, and login information, e.g., login information to a server 216 of the enterprise 200, or to some other secured data provider server.

§ 2.1 Example Processing Node Architecture

In an embodiment, the processing nodes 110 are external to network edges of the external systems 200, 220, and 230. Each of the processing nodes 110 stores security policies 113 received from the authority node 120 and monitors content items requested by or sent from the external systems 200, 220, and 230. In an embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to validate further the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front end to a looking of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, the absence of information, while a one in that bit position can indicate the presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached. Using the detection processing filter 112, however, the worst-case additional cost is only on the order of one, and thus its use for most failure queries saves on the order of m log m, where m is the number of information records present in the threat data 114.

The detection processing filter 112 thus improves the performance of queries where the answer to a request for information is usually positive. Such instances may include, for example, whether a given file has been virus scanned, whether the content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst-case null lookup operation into the threat data 114 is avoided, and threat detection can be implemented immediately. The detection processing filter 112 thus complements the threat data 114 that capture positive information. In an embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position, and that bit position indicates that the requested information is absent when it is actually present.

§ 2.2 Example Authority Node Architecture

In general, the authority node 120 includes a data store that stores master security policy data 123 for each of the external systems 200, 220, and 230. An authority node manager 128 may be used to manage the master security policy data 123, e.g., receive input from users of each of the external systems defining different security policies, and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from processing nodes 110 when the processing node 110 has processed a content item and update the master detection processing filter 122. For example, the master detection processing filter 122 may be distributed to the processing nodes 110, which then stores a local copy of the detection processing filter 112.

In an embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, a list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 110.

§ 2.3 Example Processing Node and Authority Node Communications

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined not to be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process and transmits the threat data update to an authority node 120.

The authority node manager 128, in response to receiving the threat data update, updates the master threat data 124 stored in the authority node data store according to the threat data update received from the processing node 110. In an embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined not to be classified by the threat data, then the processing node manager 118 may request responsive threat data for the content item from the authority node 120. Because processing a content item may consume valuable resource and time, in some implementations, the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 112 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to one of the authority nodes 120.

The authority node manager 128, in turn, may update the master threat data 124 and the master detection process filter 122 stored in the authority node data store according to the threat data update received from the processing node 110. In an embodiment, the authority node manager 128 may automatically transmit the updated threat data and detection processing filter to other processing nodes 110. Accordingly, threat data and the detection processing filter for new threats, as the new threats are encountered, are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations, the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process, and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are example processes for which the threat data and/or detection process filters may be updated in the 100 of FIGS. 1 and 2. Other update processes, however, are contemplated with the present invention. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer-readable medium. Other processing architectures can also be used, e.g., a combination of specially designed hardware and software, for example.

§ 3.0 Example Server Architecture

FIG. 3 is a block diagram of a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or a similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chipset), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. The user input may be provided via, for example, a keyboard, touchpad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate over a network, such as the Internet, the WAN 101, the enterprise 200, and the like, etc. The network interface 306 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300, such as, for example, an internal hard drive connected to the local interface 3112 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network-attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

§ 4.0 Example Mobile Device Architecture

Figure 4:
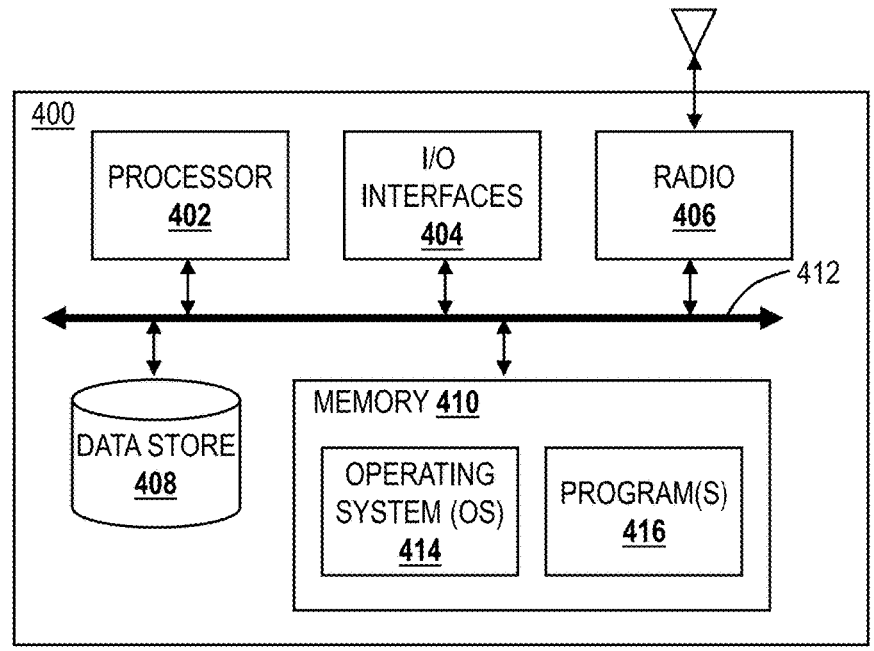
FIG. 4 is a block diagram of a mobile device which may be used in the system of FIG. 1 or with any other cloud-based system.

FIG. 4 is a block diagram of a user device 400, which may be used in the system 100 or the like. The user device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the mobile device 410 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example, but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 410, a semiconductor-based microprocessor (in the form of a microchip or chipset), or generally any device for executing software instructions. When the mobile device 410 is in operation, the processor 402 is configured to execute software stored within the memory 410, to communicate data to and from the memory 410, and to generally control operations of the mobile device 410 pursuant to the software instructions. In an embodiment, the processor 402 may include an optimized mobile processor such as optimized for power consumption and mobile applications. The I/O interfaces 404 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 410. Additionally, the I/O interfaces 404 may further include an imaging device, i.e., camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g., 3G/4G, etc.); wireless home network communication protocols; paging network protocols; magnetic induction; satellite data communication protocols; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs and provides scheduling, input-output control, file and data management, memory management, and communication control and related services. The programs 416 may include various applications, add-ons, etc. configured to provide end-user functionality with the user device 400. For example, example programs 416 may include, but not limited to, a web browser, social networking applications, streaming media applications, games, mapping and location applications, electronic mail applications, financial applications, and the like. In a typical example, the end-user typically uses one or more of the programs 416 along with a network such as the system 100.

§ 5.0 Example General Cloud System

Figure 5:
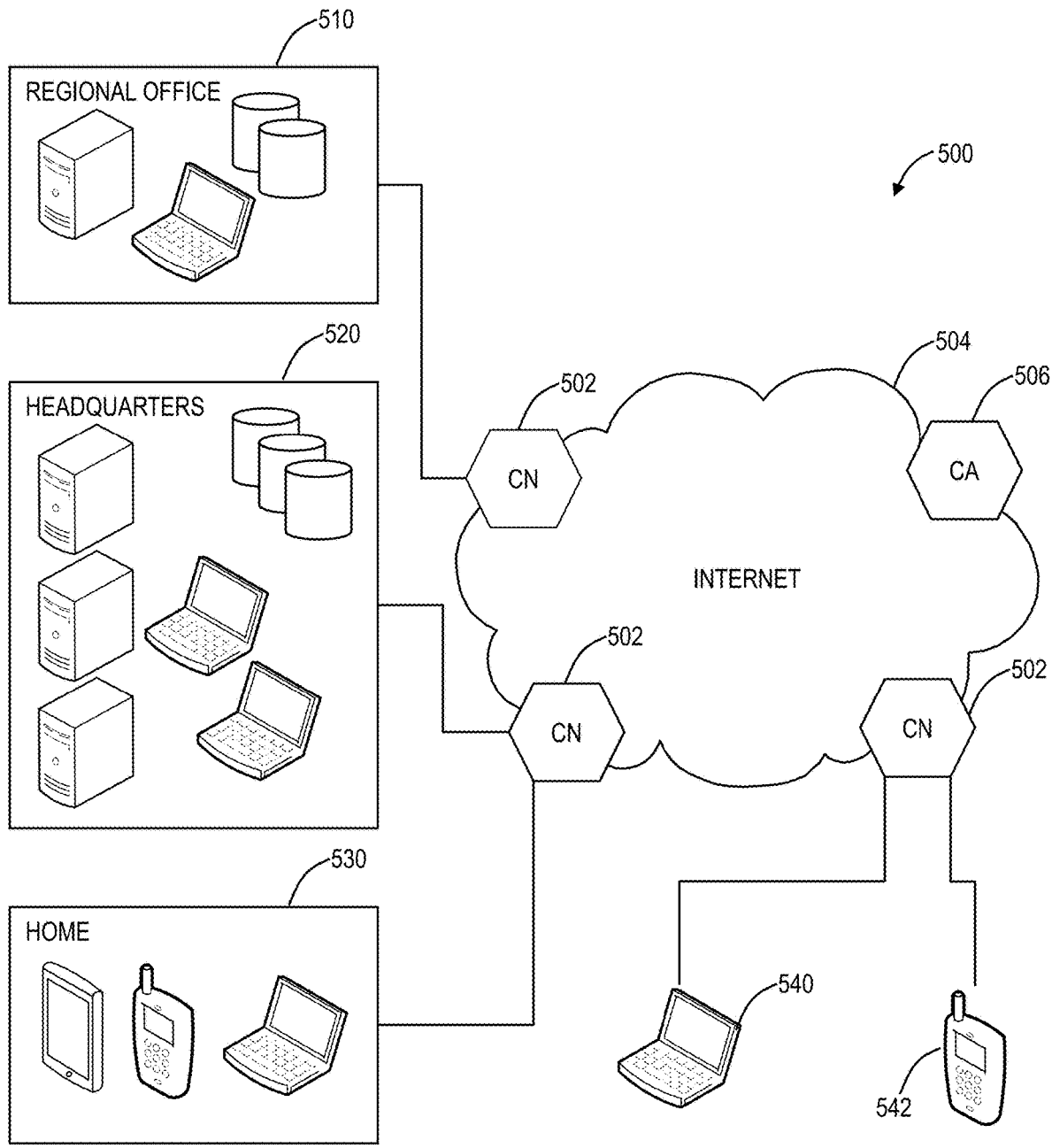
FIG. 5 is a network diagram of a generalized cloud-based system.

FIG. 5 is a network diagram of a cloud system 500 for implementing the systems and methods described herein for tracking and auditing changes in a multi-tenant cloud system. The cloud system 500 includes one or more cloud nodes (CN) 502 and central authority (CA) nodes 506 communicatively coupled to the Internet 504. The cloud nodes 502 may include the processing nodes 110, the server 300, or the like. The central authority nodes 506 may include the authority nodes 120, the server 300, or the like. That is, the cloud system 500 may include the distributed security 100 or another implementation of a cloud-based system, such as a system providing different functionality from security. In the cloud system 500, traffic from various locations (and various devices located therein) such as a regional office 510, headquarters 520, various employee's homes 530, mobile laptop 540, and mobile device 542 communicates to the cloud through the cloud nodes 502. That is, each of the locations 510, 520, 530, 540, 542 is communicatively coupled to the Internet 504 through the cloud nodes 502. For security, the cloud system 500 may be configured to perform various functions such as spam filtering, uniform resource locator (URL) filtering, antivirus protection, bandwidth control, data loss prevention, zero-day vulnerability protection, web 2.0 features, and the like. In an embodiment, the cloud system 500 and the distributed security 100 may be viewed as Security-as-a-Service through the cloud. In general, the cloud system 500 can be configured to perform any function in a multi-tenant environment. For example, the cloud system 500 can provide content, a collaboration between users, storage, application hosting, and the like.

In an embodiment, the cloud system 500 can utilize the systems and methods for tracking and auditing changes in a multi-tenant cloud system. That is, the cloud system 500 can track and audit administrator activity associated with the cloud system 500 in a segregated and overlaid fashion from the application functions performed by the cloud system 500. This segregated and overlaid fashion decouples the tracking and auditing from application logic, maximizing resources, and minimizing development complexity and runtime processing. The cloud system 500 (and the system 100) can be offloaded from complex tracking and auditing functions so that it can provide its primary function. In the context of a distributed security system, the tracking and auditing systems and methods enable accountability, intrusion detection, problem diagnosis, and data reconstruction, all in an optimized fashion considering the exponential growth in cloud-based systems.

There various techniques to forward traffic between users (locations 510, 520, 530, devices 540, 542) and the cloud system 500. Typically, the locations 510, 520, 530 can use tunneling where all traffic is forward, and the devices 540, 5420 can use an application, proxy, Secure Web Gateway (SWG), etc. Additionally, the cloud system 500 can be multi-tenant in that it operates with multiple different customers (enterprises), each possibly including different policies and rules. One advantage of the multi-tenancy and a large volume of users is the zero-day/zero-hour protection in that a new vulnerability can be detected and then instantly remediated across the entire cloud system 500. Another advantage of the cloud system 500 is the ability for the central authority nodes 506 to instantly enact any rule or policy changes across the cloud system 500. As well, new features in the cloud system 500 can also be rolled up simultaneously across the user base, as opposed to selective upgrades on every device at the locations 510, 520, 530, and the devices 540, 542.

§ 6.0 DNS Augmented Security

In an embodiment, the cloud system 500 and/or the distributed security system 100 can be used to perform DNS surrogation. Specifically, DNS surrogation can be a framework for distributed or cloud-based security/monitoring, as is described herein. Endpoint security is no longer effective as deployments move to the cloud with users accessing content from a plurality of devices in an anytime, anywhere connected manner. As such, cloud-based security is the most effective means to ensure network protection where different devices are used to access network resources. Traffic inspection in the distributed security 100 and the cloud-based system 500 is performed in an in-line manner, i.e., the processing nodes 110 and the cloud nodes 500 are in the data path of connecting users. Another approach can include a passive approach to the data path. DNS is one of the most fundamental IP protocols. With DNS surrogation as a technique, it is proposed to use DNS for dynamic routing of traffic, per-user authentication and policy enforcement, and the like.

In conjunction with the cloud system 500 and/or the distributed security system 100, various techniques can be used for monitoring which are described on a sliding scale between always inline to never inline. First, in an always inline manner, all user traffic is between inline proxies such as the processing nodes 110 or the cloud nodes 502 without exception. Here, DNS can be used as a forwarding mechanism to the inline proxies. Second, in a somewhat always inline manner, all user traffic except for certain business partners or third parties is between inline proxies such as the processing nodes 110 or the cloud nodes 502. Third, in an inline manner for most traffic, high bandwidth applications can be configured to bypass the inline proxies such as the processing nodes 110 or the cloud nodes 502. Example high bandwidth applications can include content streaming such as video (e.g., Netflix, Hulu, YouTube, etc.) or audio (e.g., Pandora, etc.). Fourth, in a mixed manner, inline monitoring can be used for "interesting" traffic as determined by security policy with other traffic being direct. Fifth, in an almost never inline manner, simple domain-level URL filtering can be used to determine what is monitored inline. Finally, sixth, in a never inline manner, DNS augmented security can be used.

Figure 6:
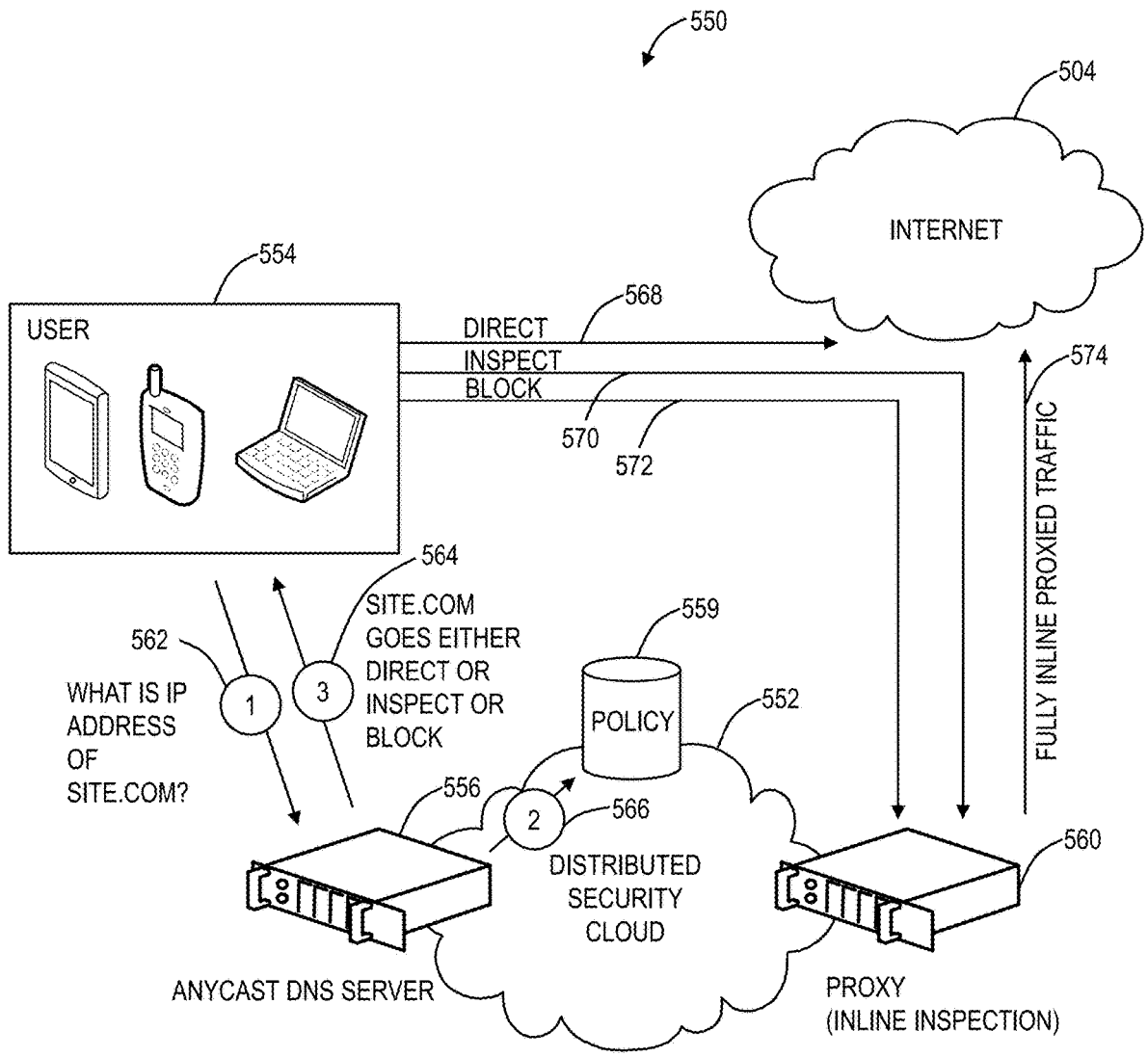
FIG. 6 is a network diagram of a network with a distributed security cloud providing DNS augmented security.

FIG. 6 is a network diagram of a network 550 with a distributed security cloud 552 providing DNS augmented security. The network 550 includes a user device 554 connecting to the distributed security cloud 552 via an anycast DNS server 556. The anycast DNS server 556 can be a server such as the server 300 of FIG. 3. Also, the anycast DNS server 556 can be the processing node 110, the cloud node 502, etc. The distributed security cloud 552 includes the anycast DNS server 556, policy data 558, and an inline proxy 560. The inline proxy 560 can include the processing node 110, the cloud node 502, etc. In operation, the user device 554 is configured with a DNS entry of the anycast DNS server 556, and the anycast DNS server 556 can perform DNS surrogation as is described herein. The distributed security cloud 552 utilizes the anycast DNS server 556, the policy data 558, and the inline proxy 560 to perform the DNS augmented security.

The network 550 illustrates the DNS augmented security where DNS information is used as follows. First, at step 562, the user device 554 requests a DNS lookup of a site, e.g., "what is the IP address of site.com?" from the anycast DNS server 556. The anycast DNS server 556 accesses the policy data 558 to determine the policy associated with the site at step 564. The anycast DNS server 556 returns the IP address of the site based on the appropriate policy at step 566. The policy data 558 determines if the site either goes direct (step 568) to the Internet, is inspected by the inline proxy (step 570), or is blocked per policy (step 572). Here, the anycast DNS server 556 returns the IP address with additional information if the site is inspected or blocked. For example, if the anycast DNS server 556 determines the access is direct, the anycast DNS server 556 simply returns the IP address of the site. If the anycast DNS server 556 determines the site is blocked or inspected, the anycast DNS server 556 returns the IP address to the inline proxy 560 with additional information. The inline proxy 560 can block the site or provide fully inline proxied traffic to the site (step 574) after performing monitoring for security.

The DNS augmented security advantageously is protocol and application-agnostic, providing visibility and control across virtually all Internet-bound traffic. For example, DNS-based protocols include Internet Relay Chat (IRC), Session Initiation Protocol (SIP), Hypertext Transfer Protocol (HTTP), HTTP Secure (HTTPS), Post Office Protocol v3 (POP3), Internet Message Access Protocol (IMAP), etc. Further, emerging threats are utilizing DNS today, especially Botnets and advanced persistent threats (APTs). For example, Fast flux is a DNS technique used to hide phishing and malware delivery sites behind an ever-changing network of compromised hosts acting as proxies. The DNS augmented security provides deployment flexibility when full inline monitoring is not feasible. For example, this can be utilized in highly distributed with high bandwidth environments, in locations with challenging Internet Access, etc. The DNS augmented security can provide URL filtering, white/blacklist enforcement, etc. for enhanced security without content filtering. In this manner, the network 550 can be used with the distributed security 100 and the cloud system 500 to provide cloud-based security without requiring full inline connectivity.

§ 7.0 Multi-Tenant, Cloud-Based Firewall

Figure 7:
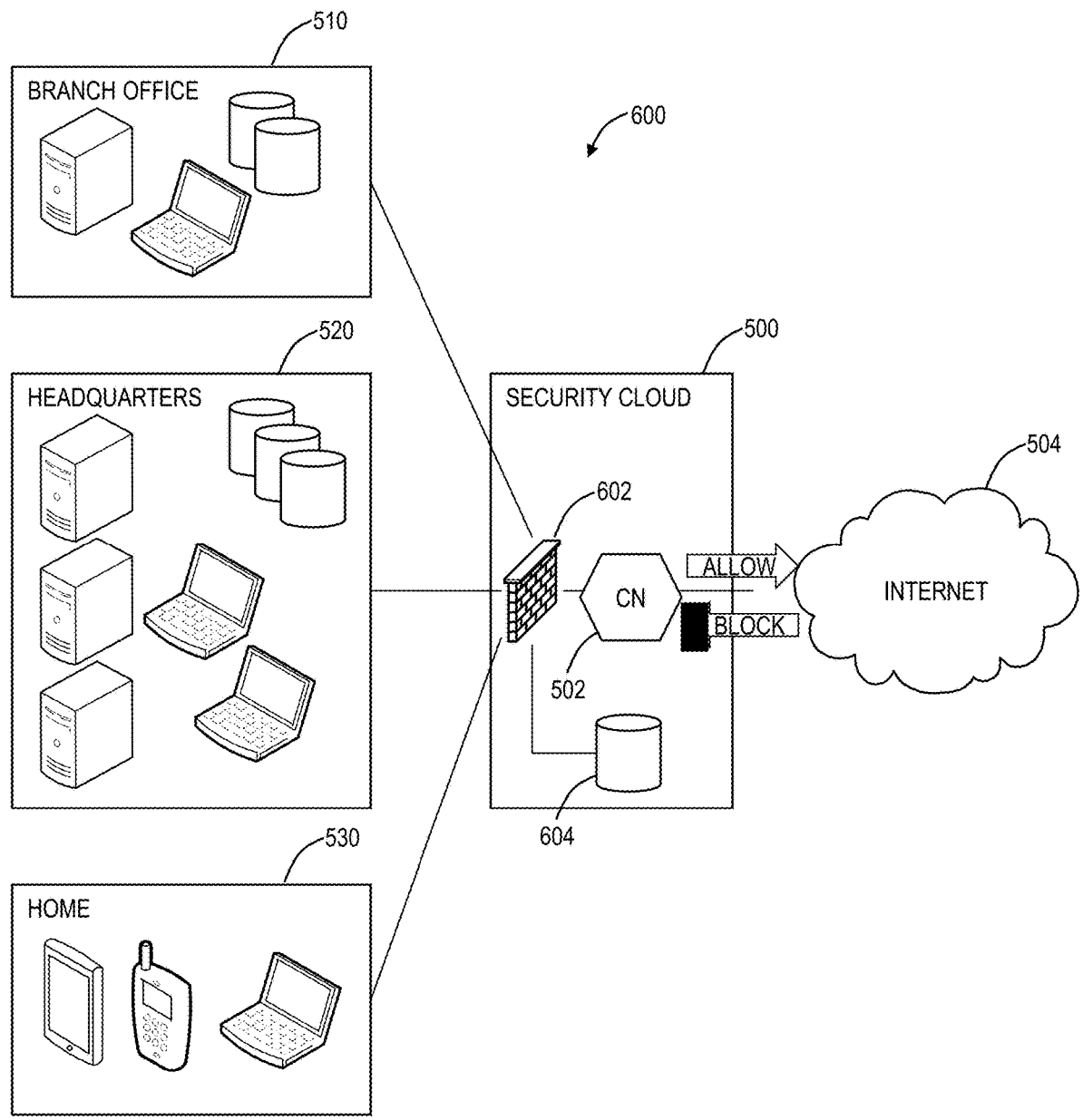
FIG. 7 is a network diagram of a network with a firewall in accordance with the multi-tenant cloud-based firewall systems and methods.

FIG. 7 is a network diagram of a network 600 with a firewall 602 in accordance with the multi-tenant cloud-based firewall systems and methods. The firewall 602 is functionally deployed through the cloud system 500 where traffic from various locations (and various devices located therein) such as a regional office/Branch office 510, headquarters 520, various employee's homes 530, mobile laptop 540, and mobile device 542 communicates to the Internet 504 through the cloud nodes 502. The firewall 602 can be implemented through the cloud node 502 to allow or block data between the users and the Internet 504. The firewall 602 could also be implemented through the processing node 110. Note, in the various descriptions that follow, reference is made to the cloud node 502, but those of ordinary skill in the art will recognize the processing node 110 can be used as well or any other type of server or node. Further, the firewall 602 can be communicatively coupled to a log 604 for logging associated data therein. In an embodiment, the cloud nodes 502 can be used only to provide the firewall 602. In another embodiment, the cloud nodes 502 can provide the firewall 602 as well as in-line inspection. The firewall 602 can handle various types of data, such as, for example, Session Initiation Protocol (SIP), Internet Message Access Protocol (IMAP), Internet Relay Chat (IRC), Simple Mail Transfer Protocol (SMTP), Secure Shell (SSH), and the like.

Users connect to the cloud system 500 via Internet Protocol Security (IPsec) or GRE, all traffic, including non-HTTP traffic may be sent through the cloud nodes 502. The firewall systems and methods propose to add support for non-HTTP applications to the cloud nodes 502. Thus, the cloud system 500 is able to support non-Web traffic and act as a Firewall for the Branch office, where clients typically sit behind a hardware-based firewall to connect to servers outside the hardware-based firewall. The firewall 602 provides advanced security functionality in the cloud that can be used to offload Branch office Customer Premises Equipment (CPE).

Advantageously, in the cloud system 500, processor and resource-intensive features are scalable, efficiently used for multiple customers, and inexpensive, relative to on-premises hardware-based solutions. The firewall 602 can be used to replace traditional expensive appliance box solutions that reside at the customer premise with service from the cloud system 500. This enables end customers to realize cost savings, provide efficient growth, and unified management/ reporting. For example, the cloud system 500 scales while appliance box solutions do not. On-premises hardware-based solutions are often integrated with feature-rich routers or operate as a stand-alone device. In both scenarios, the firewall 602 can provide cost savings, either removing the need for the stand-alone device or allowing the use of lower-cost routers and/or lower cost firewalls. The firewall 602, through the cloud system 500, can offer granular Layer 3 (L3) through Layer 7 (L7) control of applications, in a multi-tenant cloud infrastructure. This also includes integrated logging functionality, giving customers visibility into applications down to the L3 applications running on their networks.

§ 7.1 Multi-Tenant, Cloud-Based Firewall—Use Cases

Figure 8:
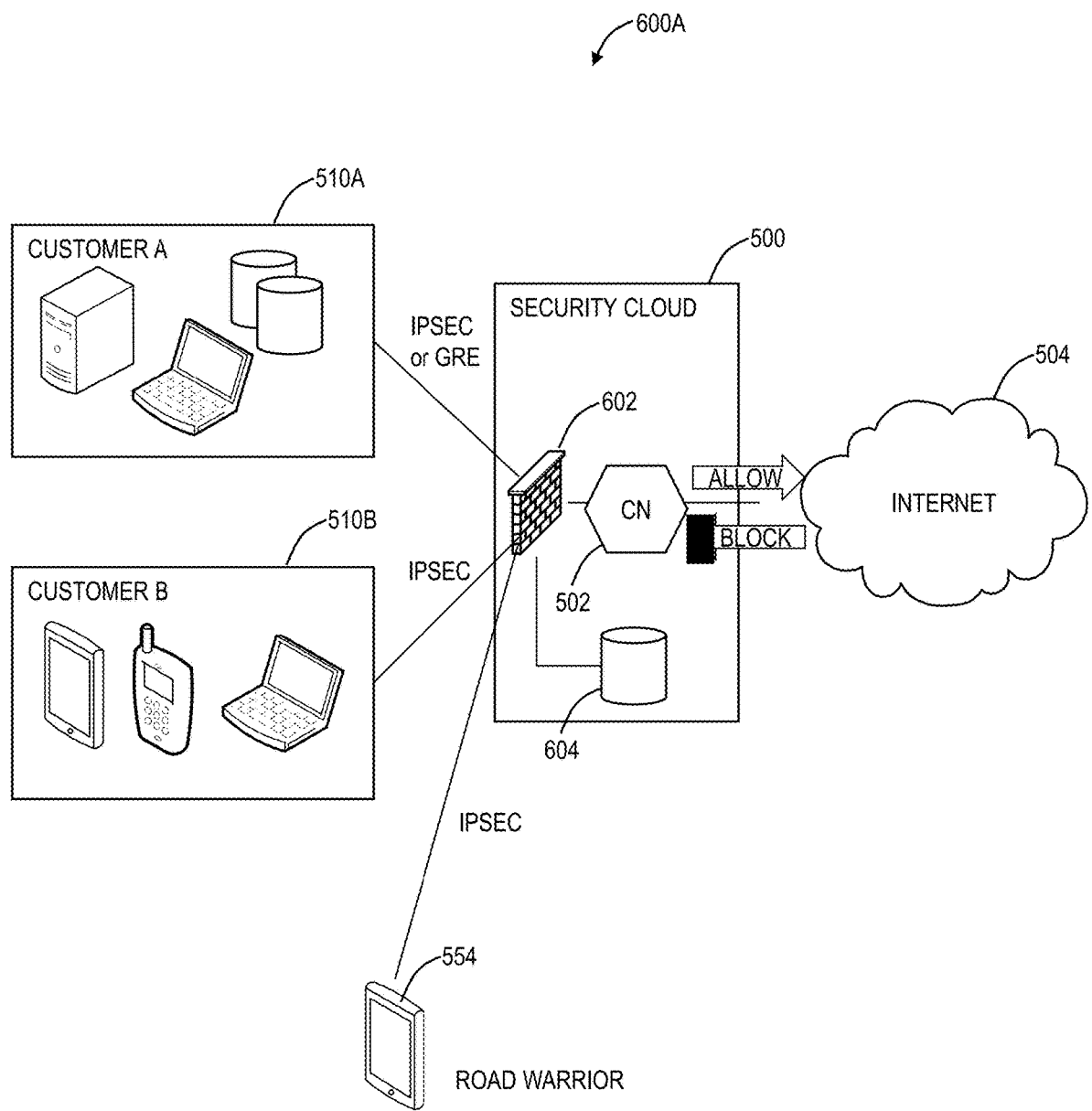
FIG. 8 is a network diagram of a network illustrating example use cases of the firewall.

FIG. 8 is a network diagram of a network 600A illustrating example use cases of the firewall 602. Here, the firewall 602 can support multiple customers, such as regional office/ Branch offices 510A, 510B. That is, the cloud system 500 can support the firewall 602 for more than one customer at a time. Additionally, the firewall 602 can support a road warrior, i.e., the user device 554, outside the office.

In an embodiment, the firewall 602 can be an outbound firewall for a Branch office, such as for large distributed enterprises, medium-size business, small business, and the like, with users sitting behind the firewall 602 and connecting to the cloud nodes 502 which allow outbound connections of various protocols. Traffic can come to the firewall 602 via IPSEC or GRE tunnels. Traffic can also come to the firewall 602 in a Layer 2 (L2) Transparent Mode, where Virtual Local Area Network (VLAN) tags are used, such as a specific tag mapped to a particular customer. In another embodiment, the firewall 602 can be an outbound firewall for Branch offices for Managed Service Provided, replacing existing managed firewall servers where large amounts of appliances are installed in data centers.

The firewall 602 also can provide basic stateful firewall functionality for common Layer 3 (L3) applications, allowing for the configuration of any one of these applications to traverse through the firewall 602. The user will now be capable of managing and controlling which protocols and applications are allowed through the firewall 602 and which ones are dropped.

For example, Telnet traffic can be configured to be allowed, and all other non-HTTP/HTTPS traffic to be dropped. Inbound functionality or any connections initiated by users coming from the Internet 504 can also be supported. The firewall 602 also includes an ability to support configuration policy rules and the ability to log all traffic and generate reports for the customer.

In an embodiment, the regional office/Branch offices 510A, 510B can each connect to the cloud system via an IPSec tunnel, configured for all traffic, including non-HTTP/HTTPS. This traffic can be Network Address Translation (NAT) out to the Internet 504, and return traffic is passed back through the appropriate tunnel. Because the cloud system 500 knows which customer and which location traffic originated, the return traffic can be mapped properly and sent back through the appropriate VPN tunnel, even though customers may have overlapping private address spaces.

§ 7.2 Multi-Tenant, Cloud-Based Firewall—Functionality

A firewall service is defined to be a traditional Layer 4 (L4) service that can be defined by ports and Ethernet protocol (Telnet, SSH, POP, IMAP, etc.). Firewall applications are defined as Layer 7 (L7) applications (e.g., Lync, Skype, YouTube, etc.). The firewall 602 enables custom firewall services to allow users to define their own pinholes through the FW firewall 602 if a pre-defined firewall application does not exist. This will be known as a custom-defined application that requires support for the custom application name and the configuration of ports or port ranges. This custom-defined application can override any pre-defined applications, and the custom-defined application cannot be defined with conflicting port ranges.

The firewall 602 can support pre-defined applications including, but not limited to, the following:

| | |
|---|---|
| HTTP | Port 80 |
| HTTPS | Port 443 |
| SMTP | Port 25 |
| File Transfer Protocol (FTP) control and Data | Port 21 control, Port 20 data |
| ICMP | |
| Telnet | Port 23 |
| DNS | Port 53 |
| Network Time Protocol (NTP) | Port 123 (User Datagram Protocol (UDP)) |
| SSH | Port 22 |
| Post Office Protocol (POP) | Ports 109/110 |
| IMAP | Ports 143/220 |
| Remote Procedure Call | Port 111 |
| SNMP | Ports 161 (UDP)/162 (TCP/UDP) |
| BGP | |
| ActiveSync | |
| Secure SMTP (SSMTP) | Port 465 |
| Secure IMAP (IMAP4-SSL) | Port 585 |
| IMAP4 over SSL (IMAPS) | Port 993 |
| Secure POP3 (SSL-POP) | Port 995 |

The firewall 602 can also support HTTP/HTTPS on non-standard ports through customer definition.

§ 7.3 Application Support

The firewall 602 can provide application signature support, which provides the visibility necessary for administrators to understand the applications running on the network including firewall services and applications. The application signature can detect a set of applications via a compiled signature database. The signatures are grouped into default groups with individual apps added to the appropriate group. A user can define a custom group and define which group an application resides. Signatures for custom applications are user-definable (typically through a Regular Expression (regex) engine).

FIG. 9 is a screenshot associated with the firewall 602 illustrating example network services. Specifically, the firewall 602 includes several predefined services based on ports. Further, users can create their own customer services and service groups. FIG. 10 is a screenshot associated with the firewall 602 illustrates example applications. In an embodiment, the firewall 602 can support thousands of applications (e.g., approximately 1200 applications), covering Peer-to-Peer (P2), Instant Messaging (IM), port evasive applications, streaming media, and other applications. Again, because the firewall 602 is multi-tenant and distributed (e.g., worldwide), new services and applications can be added instantly, across all customers and locations.

Figure 11:
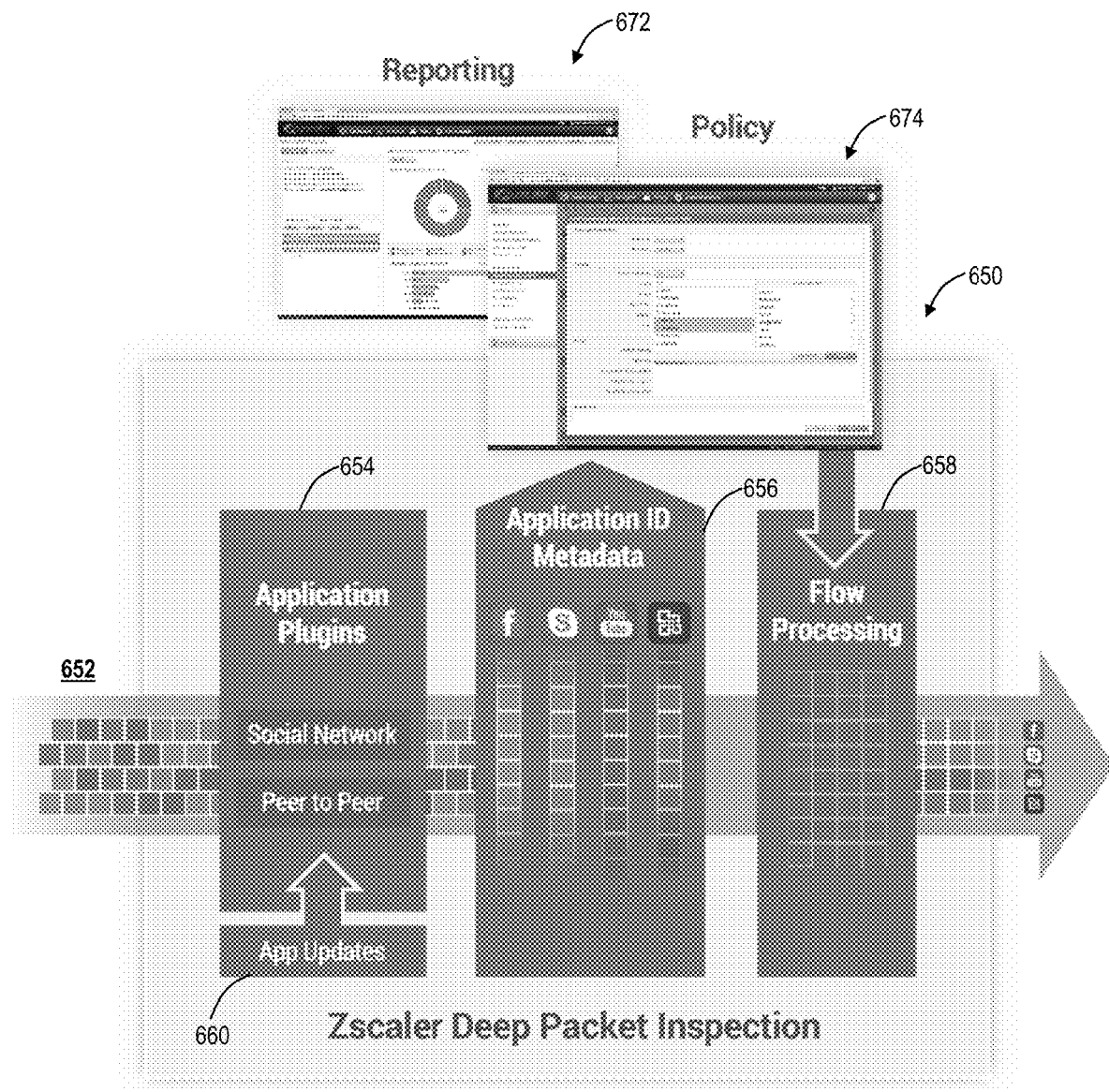
FIG. 11 is a diagram of a Deep Packet Inspection (DPI) engine for the firewall.

FIG. 11 is a diagram of a Deep Packet Inspection (DPI) engine 650 for the firewall 602. The DPI engine 650 is part of or works with the firewall 602 to categorize incoming packets 652 to the firewall 602. The DPI engine 650 includes application plugins 654, application ID metadata 656, and flow processing 658. The application plugins 654 is configured to receive application updates 660 that can be regularly or periodically provided by the cloud system 500. Through the application updates 660, the firewall 602 can support more than the approximately 1200 applications. The application ID metadata 656 provides details on how different applications are detected. The flow processing 658 operates on the incoming packets 652 using the application ID metadata 656 to determine applications associated with the incoming packets 652. The flow processing 658 identifies the protocol and application behind each IP flow of the packets 652 using stateful inspection and heuristic analysis through the extraction of metadata from protocols (e.g., app info, volume, jitter) and does not require SSL decryption. If the DPI engine 650 cannot classify app traffic, it will be categorized as either TCP, UDP, HTTP, or HTTPS. The DPI engine 650 can provide reporting 672 data to the log 604 as well as receive policy 674 updates.

The DPI engine 650 can use various classification methods, including explicit, Protocol Data Signature(s), Port-based classification over SSL, IP protocol number, pattern matching, session correlation, and the like. Explicit classification is at a bottom layer where a protocol is identified by information found in the layer below. For example, the IP protocol includes a field called "protocol" defining the protocol embedded in its payload. The Protocol Data Signature(s) is through a Protocol Data Engine. When parsing the HTTP, SSL, and Real-Time Messaging Protocols (RTMP) protocol headers, the Protocol Data Engine can look at a combination of specific value such as HTTP: Server, HTTP:Uniform Resource Indicator (URI), HTTP: User_agent, RTMP:page_Uniform Resource Locator (URL), SSL:common_name, and classifies the upper protocol using this information. For example, Facebook is classified after seeing an HTTP host matching *.facebook.com or *.fbcdn.net. In an embodiment, the DPI engine 650 was shown to take about 20 packets in order to detect the application.

For Port-based classification over SSL, in order to classify flows on top of SSL, the TCP port can be used in order to differentiate HTTPS, NAPS, POP3, etc. For example, POP3 is classified in the SSL TCP port 995. For IP protocol number, this is a subset to the explicit classification for protocols above IP. As described above, protocols above IP are explicitly specified in the IP protocol. For pattern matching, content parsing is used to identify the protocol. For example, the pattern matching searches for multiple patterns such as HTTP/1. [0|1], [GET|POST|HEAD|CONNECT|PUT|DELETE], and the like. For session correlation, information is required extracted from another flow in which the other protocol negotiated an IP and port for opening a new flow. For example, FTP-data by itself is only a binary streamed over the network and does not provide any information for classification. The only way to classify it is by using information from the FTP session leading to the opening of this flow in which FTP is specifying the IP and port to use for the ftp_data session.

Figure 13:
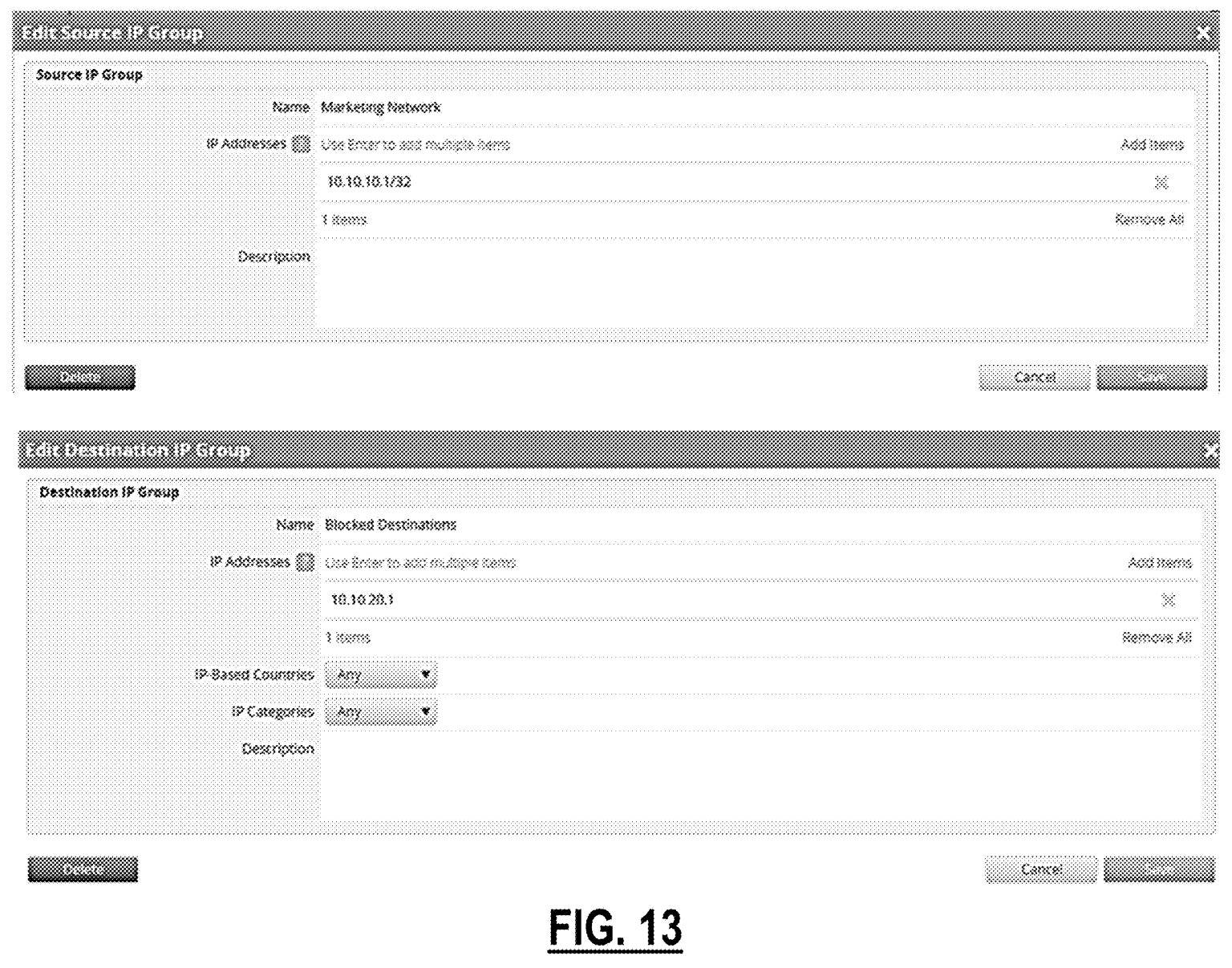
Figure 14:
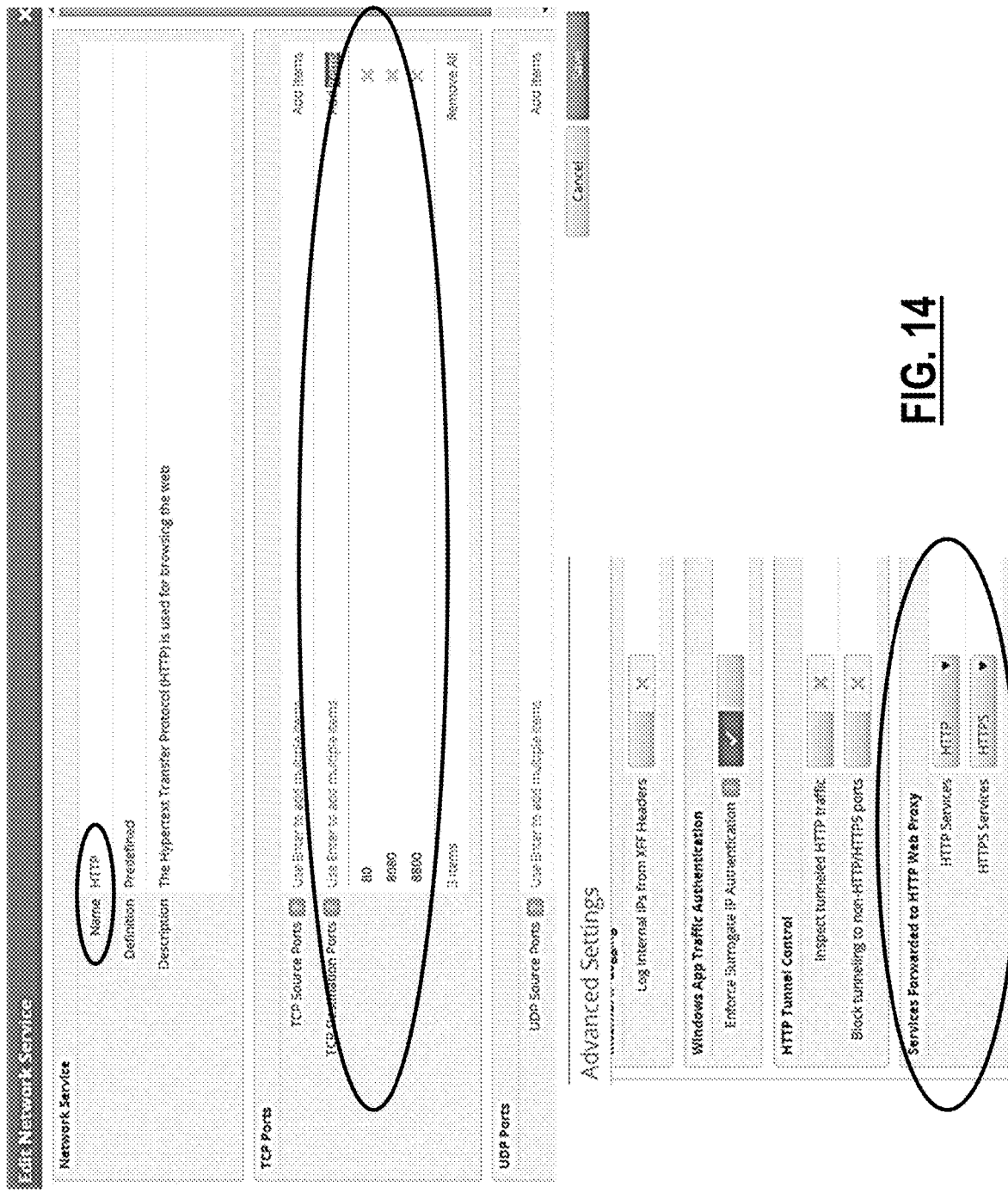
FIG. 14 is screenshots of editing a network service.

FIG. 13 is screenshots of editing IP groups. Specifically, FIG. 13 illustrates editing a source IP group and editing a destination IP group. IP groups can be predefined for the internal network and destination IPs. Destination IPs can be configured with IP-based countries and IP categories. FIG. 14 is screenshots of editing a network service. The firewall 602 can include editing HTTP and HTTPS network services to include non-port 80/443 ports, including configured ports that are not used in other services.

§ 8.0 Policy

A firewall policy (or rule) is an exact description of what the firewall 602 is supposed to do with particular traffic. When enabled, the firewall 602 always have at least one active rule, although usually multiple rules are employed to differentiate traffic varieties by {source, destination, and application} and treat them differently. In general, firewall policy consists of matching criteria, an action, and some attributes:

rule_rank rule_label [who] [from] [to] [network service] [network application] [when] action [action restrictions] [rule status] [logging]

The firewall 602 supports a policy construct, to determine where firewall policy is enforced during an overall order of operation of packet flow through the cloud node 502. In an embodiment, there are three types of policy, namely, firewall policy, NAT policy, and DNS policy.

The firewall policy construct supports a rule order, status, criteria, and action. Policies are matched in the rule order in which they were defined. The status is enabled or disabled. The matching criteria can include the following:

| | |
|---|---|
| From | Location, Department, Group, IP Address, IP Address Group, IP address Ranges, User, and/or User Group |
| To | IP address, Address Group, Domain Name or countries |
| Firewall service(s) | L4 services as listed above, and new services may be defined by Source IP, Destination IP, Source Port, Destination Port, and Protocol |
| Firewall application(s) | L7 application supported by a Deep Packet Inspection (DPI) engine |
| When | Schedule |
| Daily quota | Time or bandwidth, allowing the user to configure the amount of time or bandwidth a user is allowed for a certain application. |
| Action | Allow or block by either dropping traffic or by sending TCP reset |

All components of the matching criteria are optional and if skipped imply "any." A session matches a rule when all matching criteria components of the rule are satisfied (TRUE) by the session. If a session matches any element of a component (i.e., one of the IPs in a group), then the entire component is matched.

A rule might be configured as either company-wide or restricted to up to a certain number of locations, or up to a certain number of departments, or up to a certain number of users. Some rules might extend their coverage to the entire cloud (SNATor tracking rules), applying to every company in the cloud. Source/destination IPs are a group of the following in any number/combination. It is used to match session source/destination IPs: • individual IP, i.e. 192.168.1.1; • IP sub-net, i.e. 192.168.1.0/24; • IP range, i.e. 192.168.1.1-192.168.1.5. Note that there is no special support for IP range exclusions; • IP category. Same as the URL category and comes from a database. Custom categories are supported. Applicable to destination IPs only; • country-matches any IP that belongs to this country, i.e., "Russia." Applicable only to destination IPs; • domain name—any destination IPs behind this name matches this criterion. For example, any IP that matches "skype.com." The data plane builds an IP cache to match the names from DNS requests coming from the clients.

A network service is a group of {TCP/UDP, {src/dst port(s), or port ranges, or port sets}} or just ICMP. Network service defines an application based on L3/L4 information of the first packet in a session. Following is restrictions and implementation details: Each network service can be identified either by its name (aka label) or invisible for customer slot number in the range from 0 to 127. The slot number is required for firewall logging. Following slot numbers are reserved to simplify data plane implementation: • 0—predefined customizable HTTP service group; • 1—predefined customizable HTTPS service group; • 2—predefined customizable DNS service group; • 3-5-reserved for future use; • 6-ICMP any. This service covers ANY ICMP traffic; • 7—UDP any. This service covers ANY UDP traffic-port from 0 to 65535; • 8—TCP any. This service covers ANY TCP traffic—port from 0 to 65535; • 63-OTHER. This service covers all network services that don't match any predefined or custom services. Basically, it will catch all protocols other than ICMP, UDP, and TCP. • 64—is the very first slot of the custom services. The customer can be allowed to alter (add, modify or delete) protocol and ports in all predefined services except ICMP any, UDP any, TCP any, and OTHER. Although the customer is not allowed to delete a predefined network service, or modify its name, or delete all protocol/port entries in a particular predefined service. Different services must not have overlapping ports for the same protocols. The only exception is predefine *_any services. The data plane chooses more specific network service for logging. For example, if the session matches 2 network services TCP any and SSH then SSH is logged for this session.

The network application is defined based on L7 info. This is preconfigured for the cloud and comes only from the DPI engine 650. Rank is the priority of the rule. Rank is needed to resolve conflicts when a session matches more than one rule. The highest priority rule (the least rank number) takes precedence;

A Rule's action defines what should be done with the matching session. There might be several actions required to apply to a single session. For example, the first action lets the session go through (allow), a next action tells of tracking the session using state-full TCP proxy, next is to apply source NAT to the session, and final action redirects the session to a preconfigured IP. All these different actions belong to different rules. In other words, if the firewall 602 can apply up to 4 different actions to a single session, it's required to fetch up to 4 different policies for that session. To minimize the number of rules shown to the user front end might want to plump different rule types into a single rule as far as matching criteria are the same for those rules.

Here are example supported types of policies categorized by action type: • filtering policies—to allow or block sessions; • tracking policies—tell how to track allowed sessions—state-fully or statelessly; • SNAT policies—dictate how to apply source NAT; • DNAT policies—configures destination NAT; • bandwidth control policies; • DNS policies—provide DNS-specific actions. Tracking, SNAT and DNAT policies must be enforced at the first packet. Hence, they do not support network application matching component since its evaluation takes several packets. Action restrictions allow to modify rule action depending on some dynamic info. For example, the customer might want to limit total time or bytes per day of youtube.com traffic.

Depending on the action, there are different types of rules. The following types can be supported: • filtering rules are evaluated first. Monitored rule status overrides (only) filtering rules action—makes it allow without any restrictions. This type of rule is user-configurable. They provide the following actions: • allow—pass to the evaluation of other types of rules. This action might have an additional restriction for daily time/bandwidth quota; • block_drop—silently drop all packet that matches the rule; • block_reset—for TCP sessions send TCP reset to the client. For non-TCP traffic act the same as block_drop; and block_icmp—response to the client with ICMP error message type 3 (Destination unreachable), code 9 or 10 (network/host administratively prohibited).

Tracking rules provide-state-full or stateless action. Only OPs configure this type of rules; they are hidden from the user. The granularity of who component in the matching criteria should be from user to cloud wide.

SNAT rules dictate which type of outbound IP should be used for all the traffic matching such rule. Two types of outbound IPs are supported—open and secure. SNAT rules are applied to all outbound traffic, and there is no way to disable it. These rules might be configured by OPs only. The only purpose of SNATrules is to isolate harmful traffic from the rest of the clients. Requires persistence on the node 110. The granularity of who component in the matching criteria should be from user to cloud wide.

DNAT (redirect) rules provide destination IP and port (as the action attribute). They tell where the client-side traffic has to be redirected. Port is optional and when is not specified firewall does not alter destination port. DNAT is user-configurable.

A Rule's attributes include: • rule rank-reflects the priority of the rule comparing to the other rules; • rule label-rule specific label (or name) which is shown in firewall reports. This is a way to match configuration and reporting; • rile status—administrative status of the rule—enabled, disabled, or monitor; • logging—tells how to log sessions created via this rule.

The NAT policy construct includes source NAT and destination NAT. For the source NAT, all applications, including custom defined applications, are NAT'ed with a public IP address associated with the cloud system 500 (source NAT'ed). All return traffic is received and sent back to the appropriate IPsec or GRE tunnel. It may be desirable from an operations perspective to have a different IP address for firewall source NAT'd traffic that for HTTP(S) source NAT'd traffic. This is to avoid blacklists between the two functionalities, so the firewall 602 customers do not accidentally blacklist our HTTP only customers. For destination NAT (DNAT), in cases where the customer wants to force a protocol out a particular port DNAT will be required.

The DNS policy construct includes the following:

| | |
|---|---|
| To | IPs and countries |
| IP/domain category Network service Network application | Group of IP or domain categories derived |
| Action | Allow, block, redirect request (to a different DNS server or substitute IP in response with pre-configured IP) |

DNS might be policed on the session as well as on transaction (individual request) levels. While session DNS policies have regular policy structure, the DNS transaction policies are different: rule_label [who] [from] [to] [IP/domain category] [when] action [action restrictions] [rule status] [logging]

The differences are: • to—a group of IPs and countries. Note that IP categories should not be included here to avoid confusion. These are IPs or countries of the destination DNS server; • IP/domain category—a group of IP or domain categories derived from ZURL DB. These categories are derived from matching the DNS request domain or responded IP a database. Such separation of to (server IP) and IP/domain category allows to configure fine granular matching criteria like "malicious IP/domain request sent to specific DNS server"; • network service—is not configurable here because DNS transaction policies get applied only to the sessions that matched predefined DNS service group; • network application—is not configurable. There is no way to find an application just by IP (w/o port/protocol). This finds out the application when a client comes with a session using a resolved IP as destination IP. Besides URL category lookup does not return application ID. The application requires one extra look up; • action—actions applied only to DNS transactions. It includes allow, block, redirect_request (redirect to a different DNS server), redirect_response (substitute IP in response with pre-configured IP). Rules with redirect_request action can be applied only to the request phase of DNS transaction. Rules with redirect_response action are applicable only to the response phase of DNS transaction. And finally, rules with allow or block actions are evaluated during both phases (request and response) of DNS transaction.

Figure 12A:
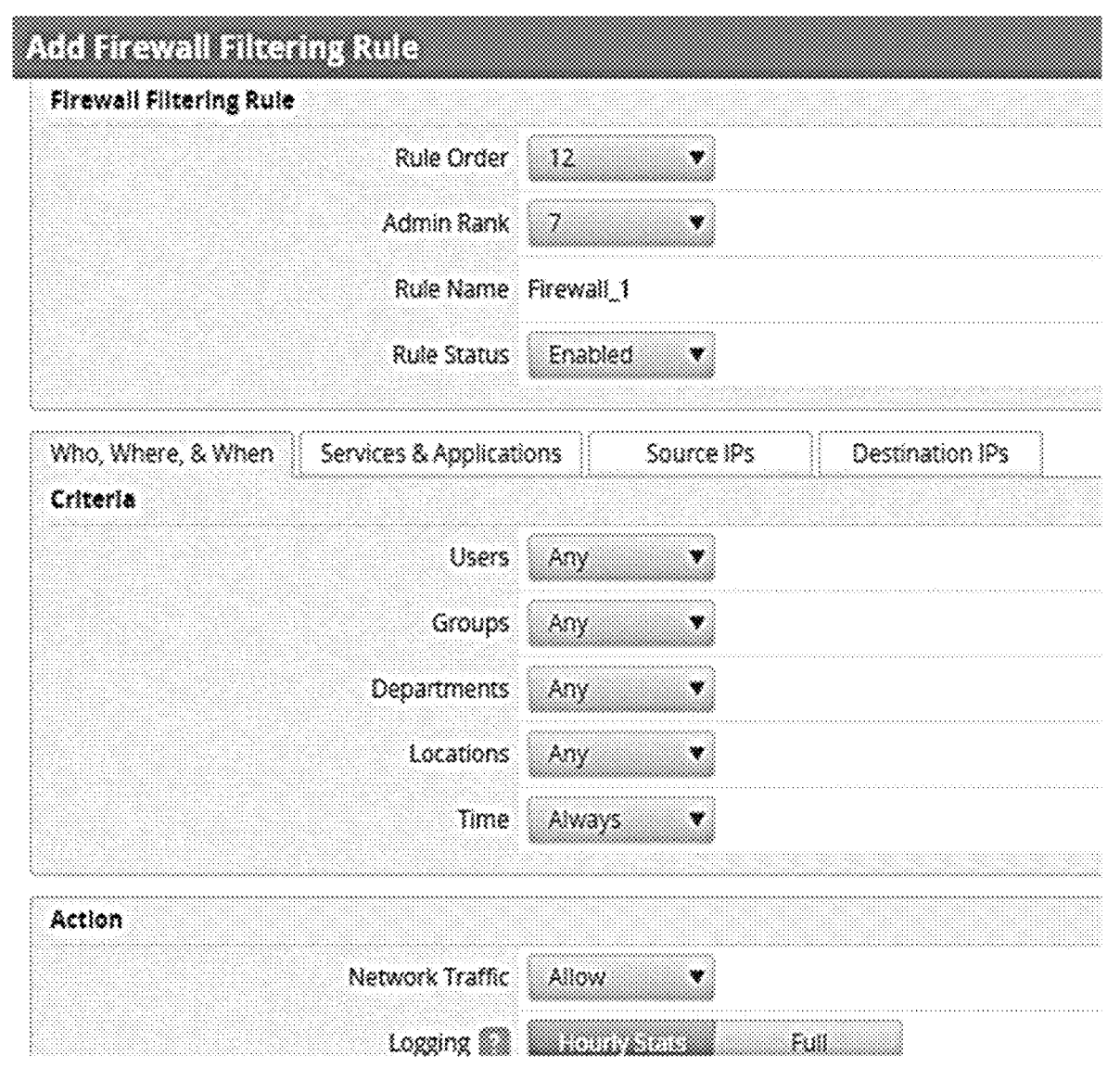
Figure 12B:
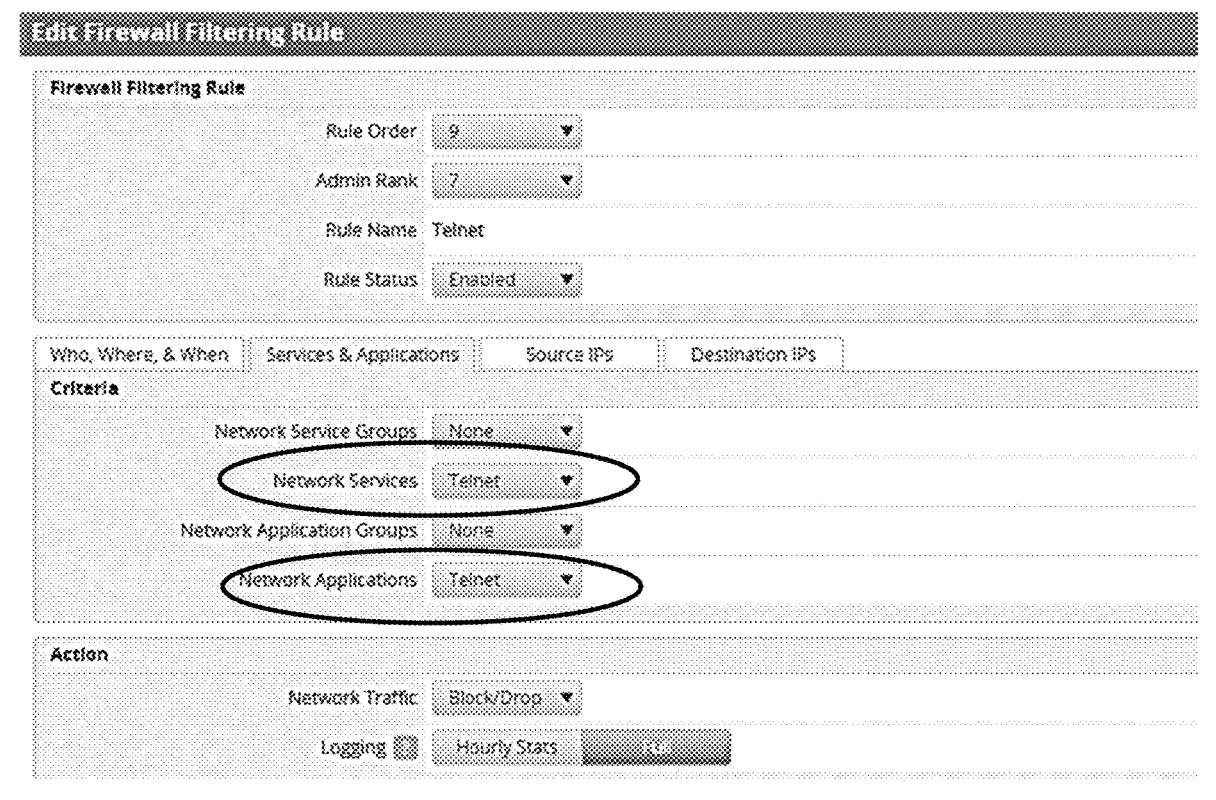

The firewall 602 can support various policies, e.g., 128 policies, 1024 policies, etc., including variable locations, departments, and users per policy. Again, since the firewall 602 is multi-tenant, policies can be different for each customer as well as different for different locations, departments, and users per customer. For user-based policy, a specific user must have IP surrogation enabled for user tracking. FIG. 12A is a screenshot of defining a firewall filtering rule. The rule is named, has an order and rank, and is enabled/disabled. Matching criteria are set for the users, groups, departments, locations—Who, From, To, Network Service, Network App, When. Finally, the action is determined—Allow, Block/Drop, Block with ICMP Error Response, Block with TCP Reset. FIG. 12B is another screenshot of defining a firewall filtering rule. Network service and network application criteria in the same rule results in a logical "AND" condition. In FIG. 12B, a Telnet network service on Port 23 and a Telnet network application on any port—"AND" results in telnet protocol as detected by the DPI engine 650 must be on port 23. Conversely, criteria within the same network service or network app are logical "OR."

Figure 15:
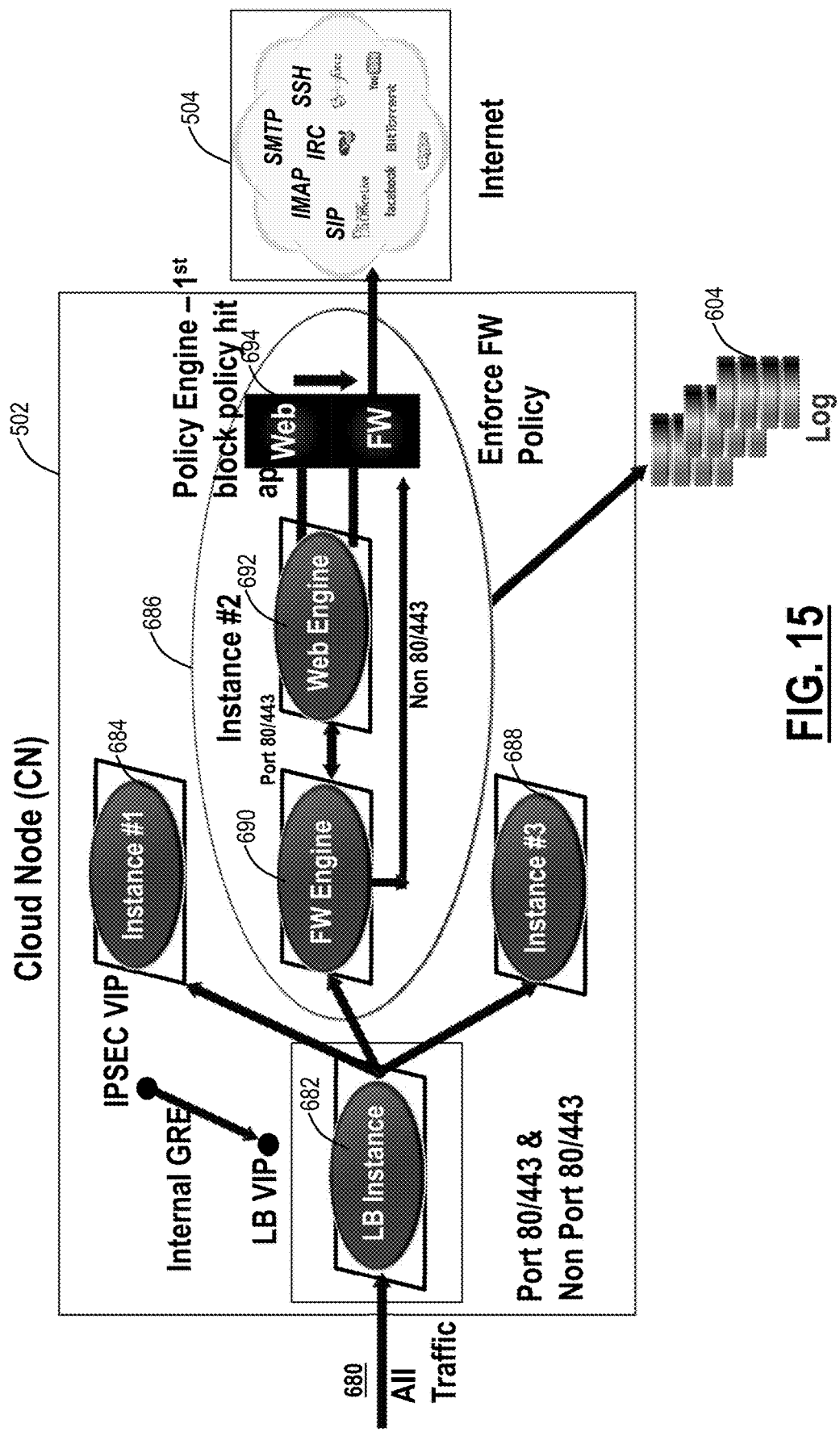
FIG. 15 is a flow diagram that illustrates packet flow through the cloud node.

FIG. 15 is a flow diagram of packet flow through the cloud node 502. Again, all traffic 680 between users and the Internet 504 is processed through the cloud node 502 (or the processing node). The traffic 680 can be received at a Location Based (LB) instance 682 which could also receive traffic from GRE, a Virtual IP (VIP) IPsec, an LB VIP, etc. From the LB instance 682, the traffic 680 is sent to one or more instances 684, 686, 688 (labeled as instance #1, #2, #3). For illustration purposes, the instance 686 is shown which includes a firewall engine 690, a Web engine 692, and a policy engine 694. The firewall engine 690 forwards on port 80/443 traffic to the policy engine 694 and port 80/443 traffic to the Web engine 692. If Web policy and FW policy are configured for a Web application, Web policy is applied first and then FW policy will be enforced. The policy engine 694 is configured to enforce Web and firewall policies and to send the traffic 680 to the Internet 504.

Figure 16:
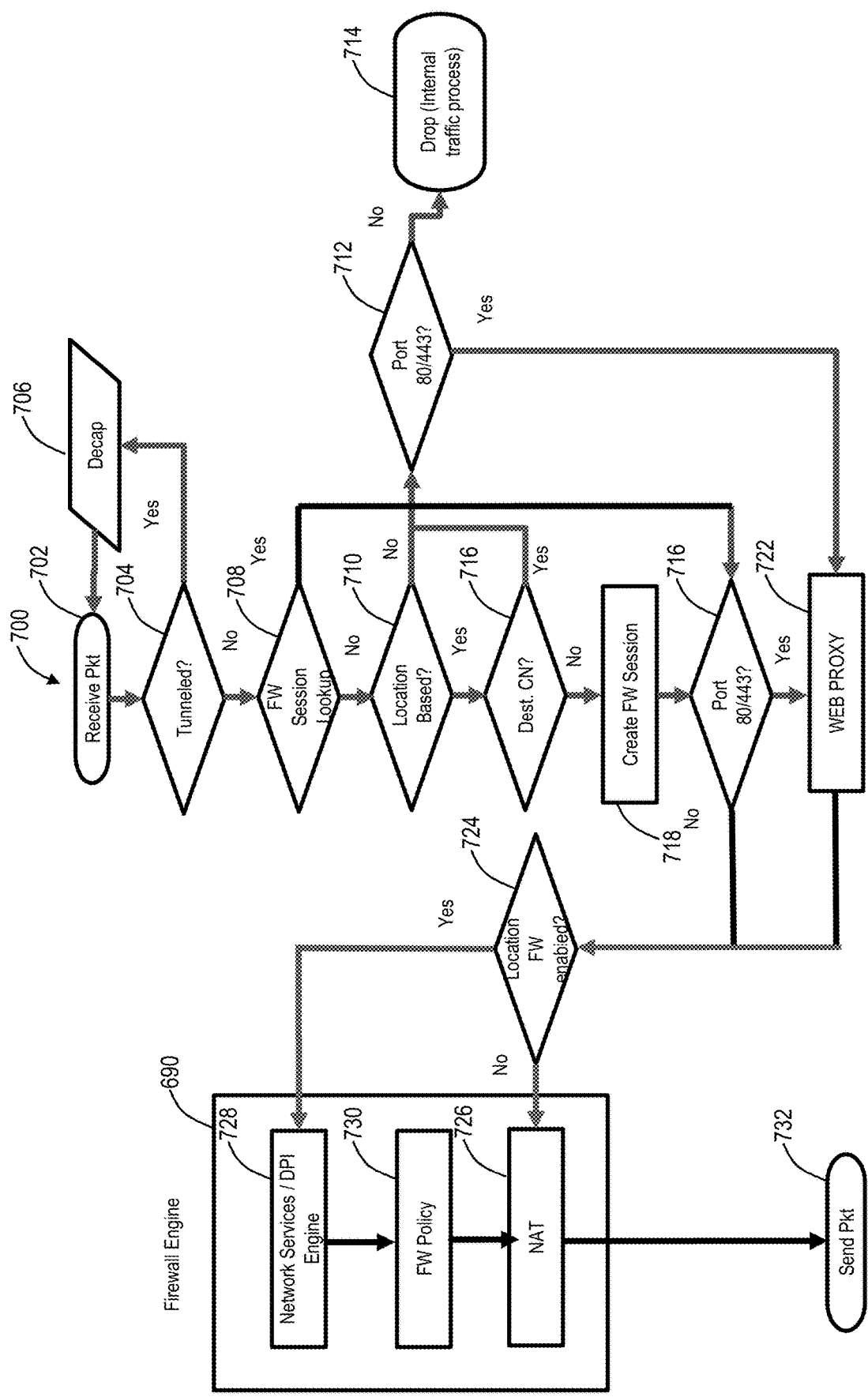
FIG. 16 is a flowchart of a process for packet flow through the firewall from a client.

FIG. 16 is a flowchart of a process 700 for packet flow through the firewall 602 from a client. The process 700 includes receiving a packet (step 702). If the packet is from a tunnel (step 704), the packet is de-encapsulated (step 706) and the process 700 returns to step 702. After step 704, a firewall session lookup is performed (step 708). If no firewall session exists, the process 700 checks if the packet is location-based (step 710). If the packet is not location-based (step 710) and not port 80/443 traffic (step 712), the traffic is dropped (step 714). If the packet is location-based (step 710), the process 700 checks if the packet is destined for the cloud node 502 (step 716) and if so, moves to step 712. If the packet is not destined for the cloud node 502 (step 716), the process 700 includes creating a firewall session (step 718). After step 718 and if a firewall session exists in step 708, the process 700 checks if the traffic is port 80/443 (step 720), and if so, established a web proxy (step 722). After steps 716, 722, the process 700 checks if the location firewall is enabled (step 724). If so, the traffic is processed by the firewall engine 690, and if not, the traffic is NAT'd (step 726). The firewall engine 690 analyzes the traffic through a network services/DPI engine (step 728), applies firewall policy (step 730), and the traffic is NAT'd (step 726). Finally, the packet is sent (step 732).

Figure 17:
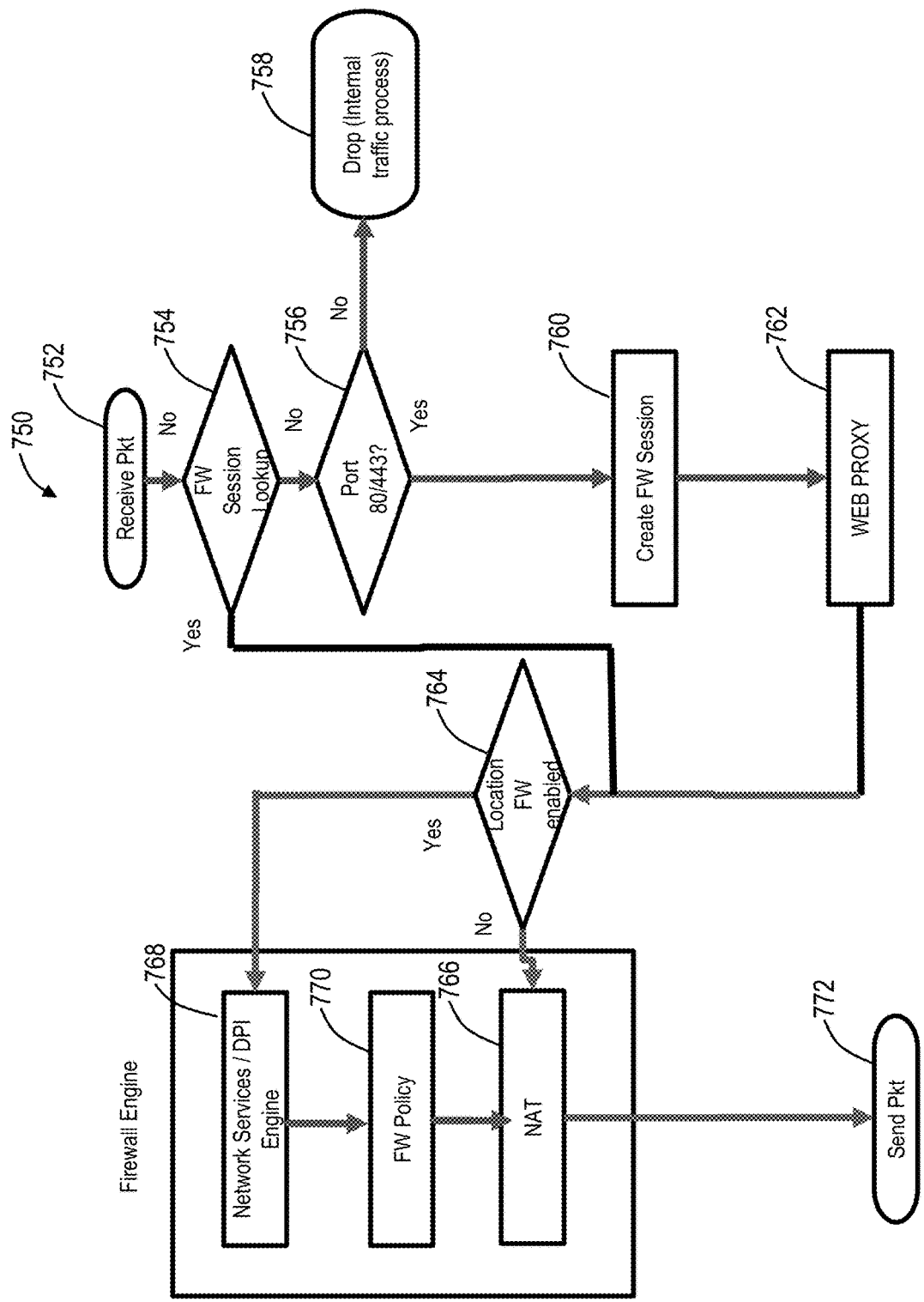
FIG. 17 is a flowchart of a process for packet flow through the firewall from a server.

FIG. 17 is a flowchart of a process 750 for packet flow through the firewall 602 from a server. The process 750 includes receiving a packet (step 752), and a firewall session lookup is performed (step 754). If no session exists, the process checks if the traffic is port 80/443 (step 756), and if not, drops the traffic (step 758). If the traffic is port 80/443 (step 756), a firewall session is created (step 760) and a Web proxy is performed (step 762). The process 750 checks is location firewall is enabled (step 764). If so, the traffic is processed by the firewall engine 690, and if not, the traffic is NAT'd (step 766). The firewall engine 690 analyzes the traffic through a network services/DPI engine (step 768), applies firewall policy (step 770), and the traffic is NAT'd (step 766). Finally, the packet is sent (step 772).

Every packet hits the firewall 602 which requires the firewall 602 to process packets as efficiently as possible. This is achieved by having slow and fast paths for packet processing. The slow path deals with the very first packet of a new session. It is slow because the corresponding policy has to be found and firewall resources allocated (memory, ports, etc.) for the session. All packets of an existing session go through a fast path where only a simple lookup is required to find the corresponding session.

Here is a description of policy evaluation of the first packet in a session—the slow path:
every packet hits the firewall code first—it is intercepted on the ip_input( ) level;
if the packet destined to one of the cloud system 500's IP addresses, a pass up session is created, and the packet is forwarded up to the network stack. No firewall policy is evaluated in this case;
the who component of matching criteria is evaluated based on a combination of:
client IP—inner IP in case of a tunnel or just client IP in case of L2 redirection; o tunnel info—outer IP of the tunnel;
default location IP if auth_default_location_ip is configured to 0 value in sc.conf. This IP is used as location IP and overrides any tunnel info;
based on the who value the following actions might be taken:
if the packet came for a road warrior (no location is found for the client's IP) and status was ready at least once, then pass up this session.
the packet came from a known location. If firewall functionality is disabled for the company—a pass up session is created, and the packet gets forwarded to the networks stack.;
if the firewall is not configured for the location, a new session object gets created with allow the action, and the packet are SNATed out. The session is allowed to overcome rule infrastructure limitation of only up to 8 locations per rule—the i.e. company wants to disable FW in 100 locations out of 10000. Otherwise, firewall policy evaluation continues;
if the firewall fails to retrieve company, location or user configuration due to lack of resources (out of memory), then the packet is silently dropped. If config retrieval failure is due to any other reason then the cloud wide default policy is applied to the session;
finally, if the firewall is configured for the client, and all configuration is available the session is treated per configured policies;
for policy lookup, firewall queries the configuration of the corresponding company, location, location user, and if available surrogate IP user. Company config contains a list of all firewall rules. The location has the firewall enable/disable knob. And the two users configs tell which firewall rules are enabled for the particular location and particular surrogate IP user.
policy lookup is done to find the highest priority best-matching rule using all enabled rules for the location OR surrogate IP user. In other words, policy lookup evaluated all rules enabled for the location as well as for the surrogate IP user. Note that if a user belongs to a company A while coming to the node 110 from the location of company B, then only location configured policies are applied to such user;

to determine network application (which mostly comes from layer 7) DPI engine usually has to see more than one packet. That is why all filtering rules with "other-than-any" network application components are replaced with similar rules where network application is any and action is allowed. Based on the result of the policy look up firewall creates a session object and acts accordingly. For example, a rule from_subnet_1 network_application_tor DENY for the first look up gets replaced with from_subnet_1 network_application_any ALLOW;

when several packets later network application are determined by DPI, it notifies firewall about the findings. At this point, the firewall checks the original (non-modified) policies and if needed, can correct actions applied to the session. Using the previous example, the DENY rule will be checked during this second policy look up.

Again, all traffic is inspected through the cloud node 502. Web Traffic (Port 80/443) is sent to the Web Policy engine 692. If the firewall (non-port 80/443) is enabled, then all web traffic is sent to the firewall engine 690 for inspection. Firewall traffic is sent to the firewall engine 690 and will go through the firewall policy table. Web policies are inspected first. Firewall policies are enforced after all web policies. If there is a web allow policy, firewall policies are still evaluated.

FIG. 18 is a screenshot of creating firewall policies. The policies have an order, rule name, criteria, and action. Firewall policies start by defining the Network Services to Allow followed by Network Applications. A basic policy is defined to allow HTTP, HTTPS, and DNS traffic just before the default rule. Again, it may take up to 20 packets in order for the DPI engine 650 to detect the Application. If a packet hits a Network Application policy, and the DPI engine 650 cannot determine the Application, then the packet is allowed, and the next rule is not evaluated. The next rule will be evaluated once the Application is determined.

Figure 19:
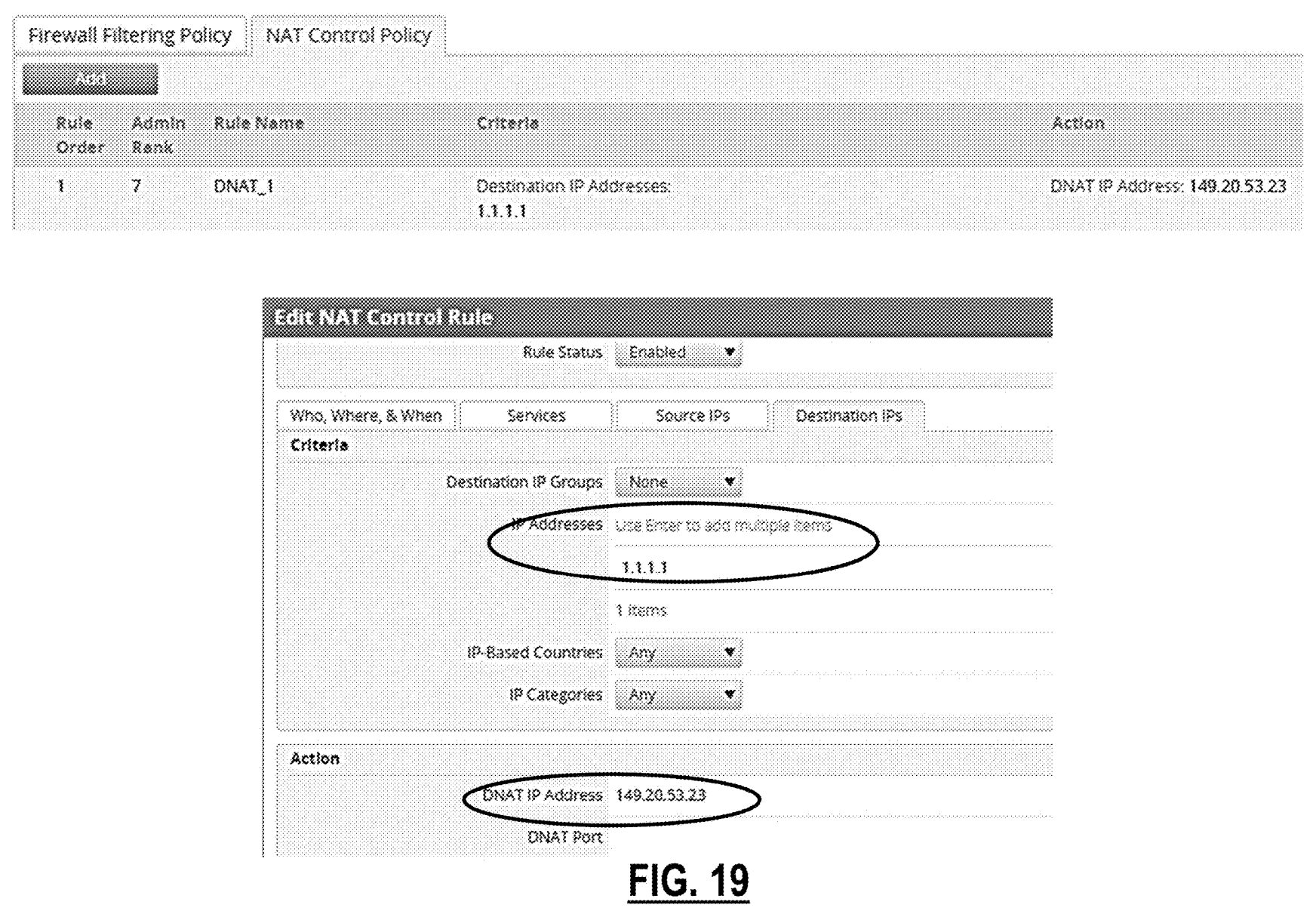

FIG. 19 is a screenshot of a NAT configuration. The firewall 602 can support destination NAT to redirect traffic to another IP and/or port. The use case is to control what resources a user can access. For example, a customer requires their users to go to an internal IP to access external non-web servers.

FIG. 20 is a screenshot of a user authentication screen. The user authentication can leverage existing authentication infrastructure in the systems 100, 500. In an embodiment, IP Surrogate is configured to map the IP address to the user. The user must authenticate with the Web first (or have a cookie stored).

Figure 21:
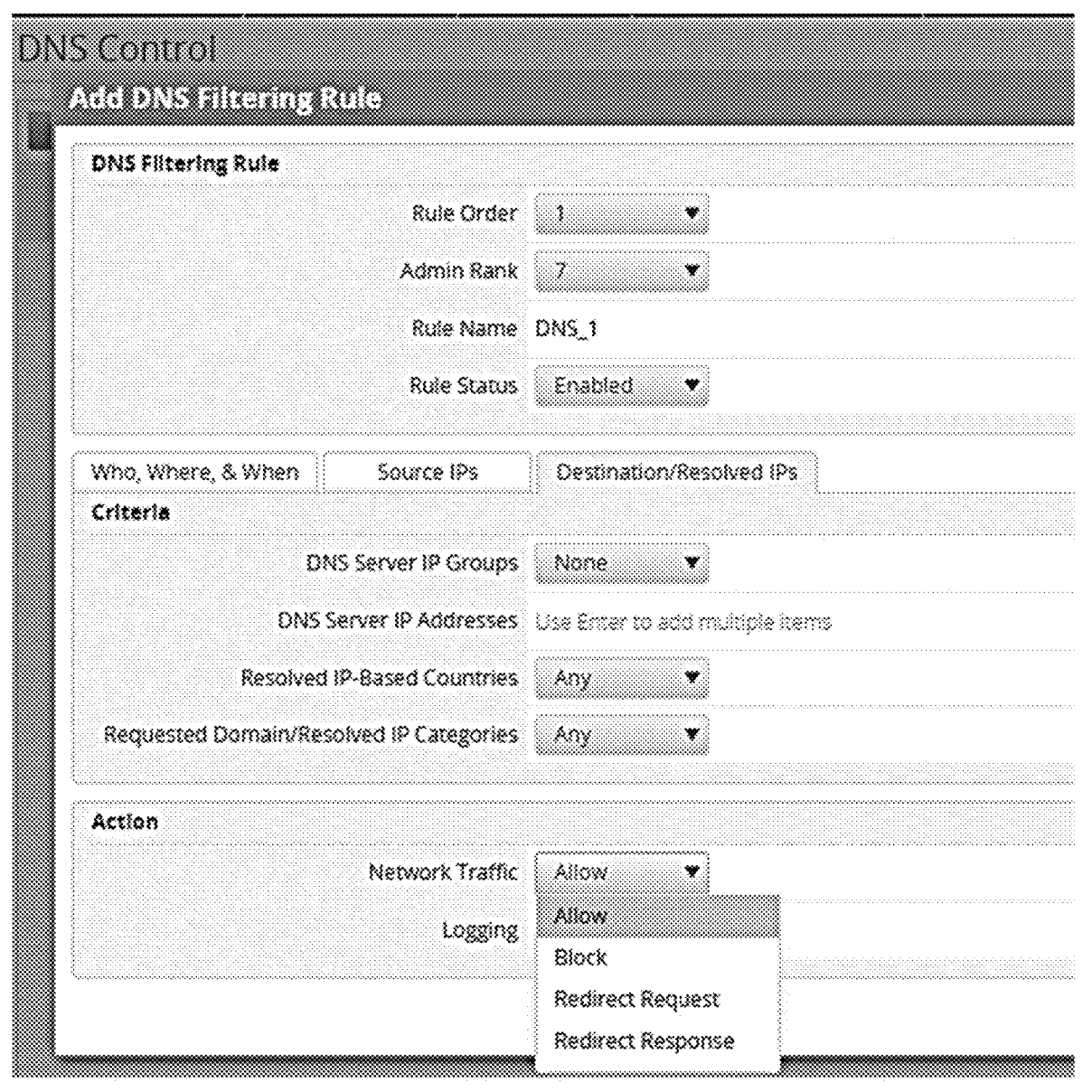

FIG. 21 is a screenshot of DNS policy. For example, the use case can include guest wireless where a sub location is created for a guest wireless to apply DNS-based policies. DNS policy includes an ability to apply policy based on DNS request—allow, block or redirect the request, redirect response. The DNS policy can be based on server IP or requested/resolved IP category.

§ 9.0 Reporting and Logging

The firewall 602 can support the log 604. In an embodiment, the log 604 can be through the logging nodes 140. The log 604 can be configurable. For example, by default, only blocked events or DNS events are logged. Aggregated logs can be used when logging exceeds certain thresholds or when large amounts of logs need to be processed and is of similar traffic type. For example, Internet Control Message Protocol (ICMP) logs will only be logged until a certain threshold, e.g., 10/second, and then no additional logs will be sent until the traffic falls back under the threshold. The definition of the thresholds for firewall sessions can be defined.

Each firewall rule can be configured for full or aggregated logging. Full logging can be enabled by default on block policies. Aggregate logging can be the default on for Allow rules. Allow rules can have the option to be changed to Full logging. In another embodiment, two types of log formats are enabled per rule—i) Full Session logging—performed for all block firewall policies+DNS transactions, and ii) Hourly (or Aggregate) logging—performed for Web logs to avoid duplication with Web transactions.

A log format for the log 604 for firewall logs can include:

> Firewall instance ID
> Session Duration
> Time Stamp
> User
> Department
> Location
> Incoming Source IP
> Incoming Destination IP
> Incoming Source Port
> Incoming Destination Port
> Outgoing Source IP
> Outgoing Destination IP
> Outgoing Source Port
> Outgoing Destination Port
> Matched firewall rules
> Firewall service
> Firewall application
> Action (Allow, block)
> Client TX Bytes (from client to firewall 602) - Outbound
> Client RX Bytes (from firewall 602 to the client) - Inbound
> GRE or VPN
> IP Category
> Cloud node 502 ID A log format for the log 604 for DNS Request/Response logs can include:

> Log Number
> Time
> User
> Department
> Location
> Source IP
> Destination IP
> Query Domain
> IPs
> Category A log format for the log 604 for Attack logs can include:

> Port Scan
> Syn Flood
> Tear Drop
> ICMP Flood
> UDP Flood
> WinNuke
> Etc.

The purpose of the reports is primarily two-fold, namely i) to provide visibility into the top Applications and Services that are traversing the network and ii) to provide visibility into top firewall threats that have been detected. Note, because the firewall 602 is multi-tenant and distributed (e.g., worldwide), the visibility can be used to detect zero-day/zero-hour threats and instantly provide a defense.

Several reports can be supported to display the various fields above in columns that can be configured to be visible or hidden in the display. The reports can be available based on a number of sessions or bytes. The admin can have the ability to filter based on the various fields. The filter can allow the admin (or other users) to show all sessions for a defined between for a particular user, IP address (Source or Destination), or group of IP addresses. There can be two types of reports: Real-time reports generated by Compressed Stats and Analyze reports generated by full session log analysis. Each report below is marked as (RT) Real-Time or (Analyze). Example reports can include Firewall Usage Trend, Top firewall Applications (based # of sessions and bytes)—Includes Applications detected over HTTP, HTTPS (RT), Top Blocked Rules Hit (RT), Top Internal Source IPs (Analyze), Top Destination IPs (Analyze), Top Users (RT), Top Departments (RT), Top Locations (RT), List of Top Users/Departments/Locations with Top Protocols for each User/Dept/Location, List of Top IPs with Top protocols per IP, Top firewall Attacks (Analyze), etc.

Figure 22:
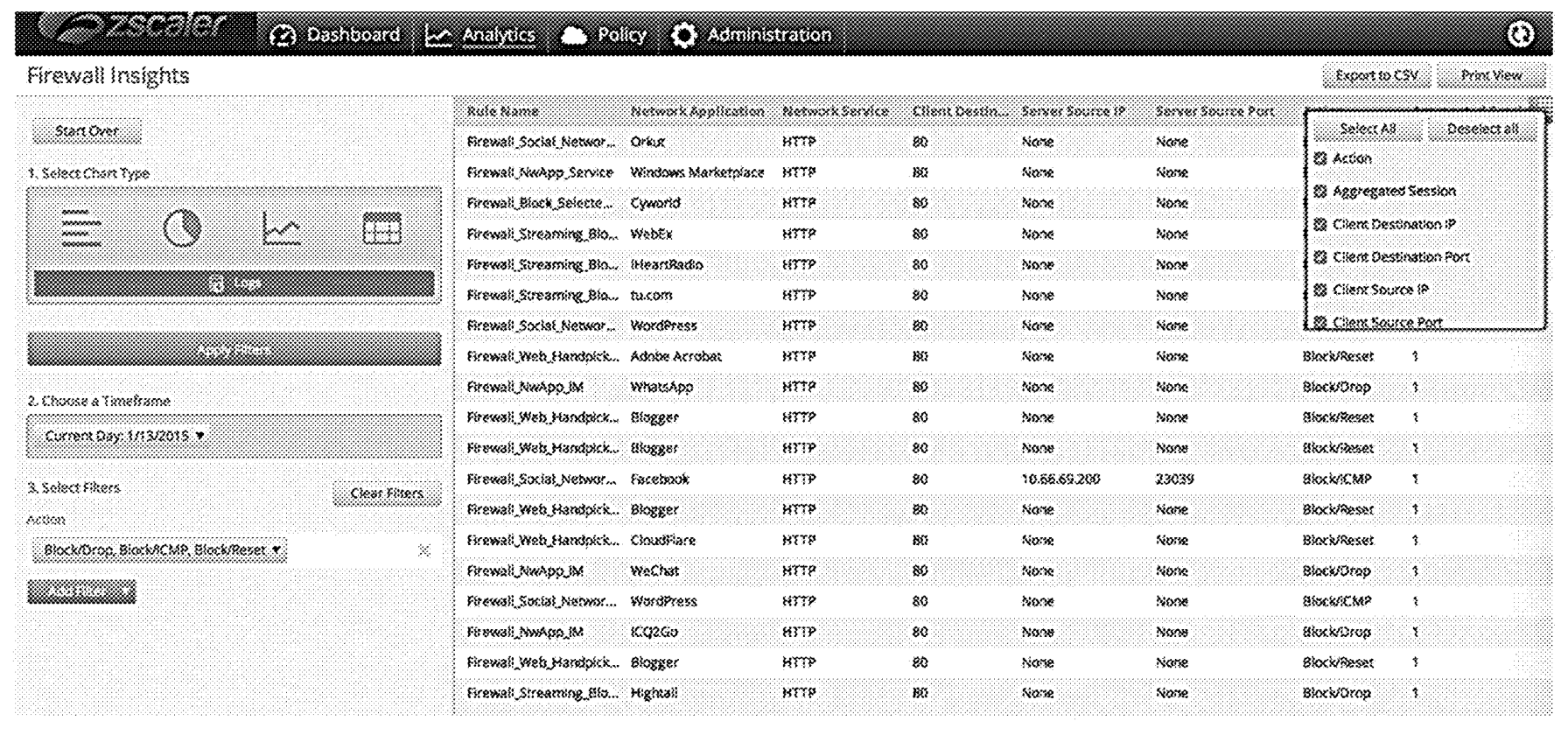
Figure 23:
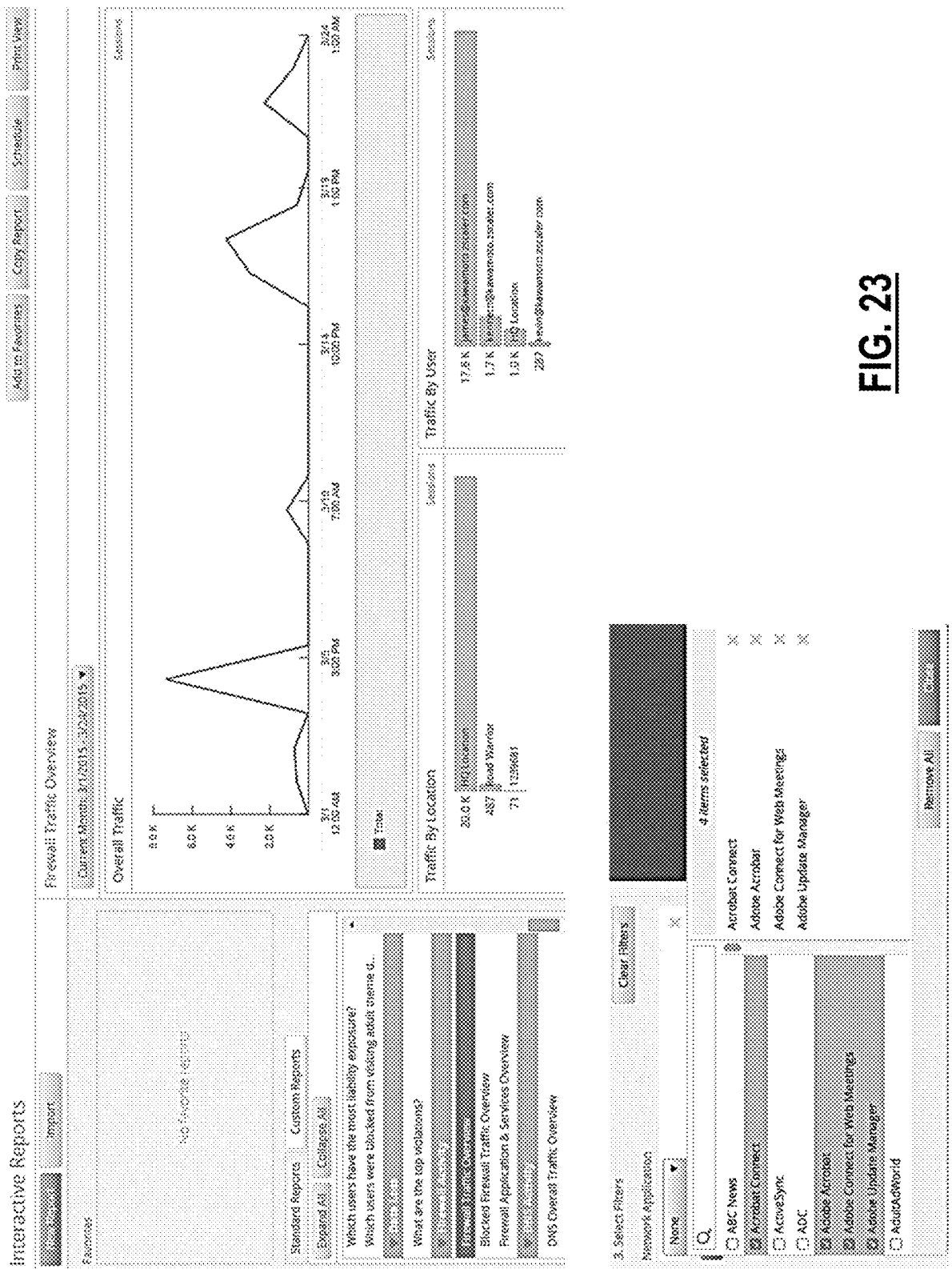
FIG. 23 is a screenshot of an interactive report for firewall insights.
Figure 24:
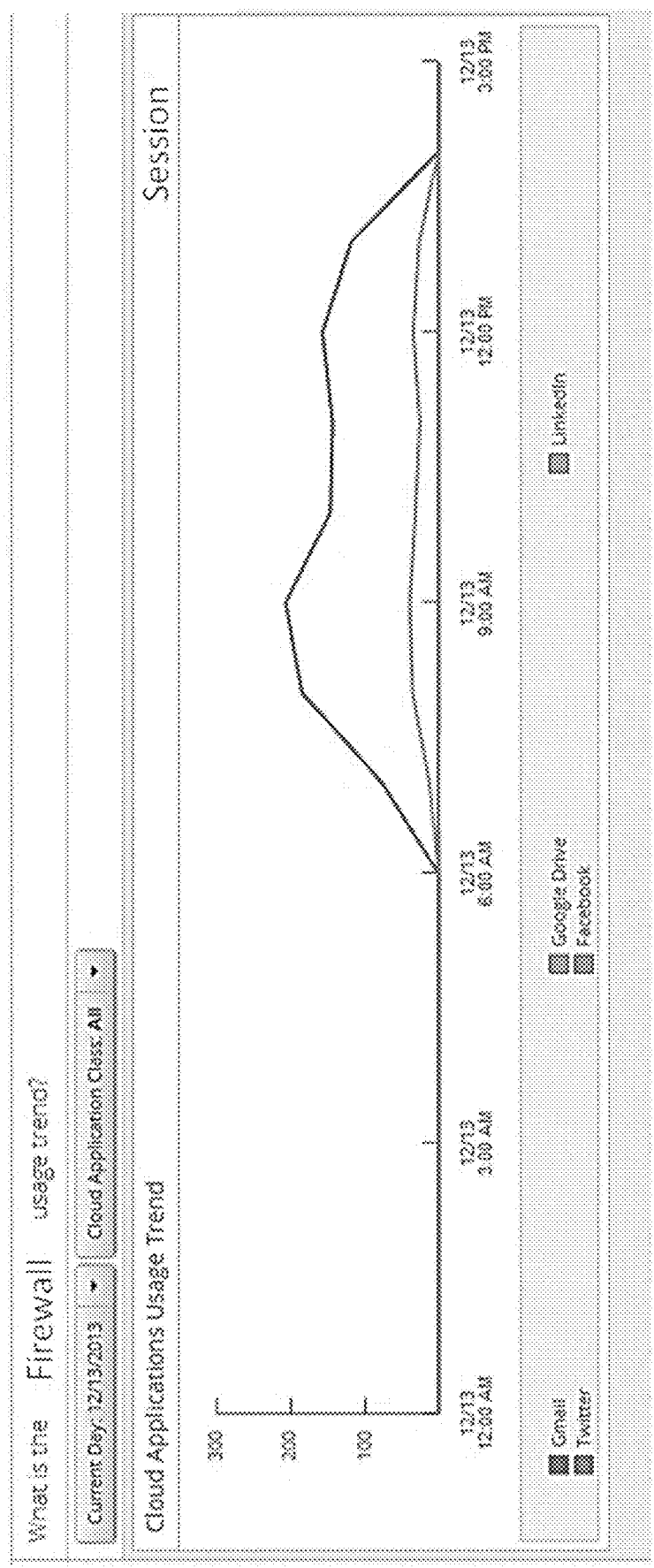
FIG. 24 is a screenshot of a graph of usage trends through the firewall.

FIG. 22 is a screenshot of a reporting screen for firewall insights. FIG. 23 is a screenshot of an interactive report for firewall insights. FIG. 24 is a screenshot of a graph of usage trends through the firewall 602. FIG. 25 is graphs of top firewall protocols in sessions and bytes.

In an embodiment, a multi-tenant cloud-based firewall session logging method performed by a cloud node includes firewall Session Stats logging where are a firewall module records aggregated statistics based on various criterion such as client IP, user, network application, location, rule ID, network service, etc., firewall Session Full logging where the firewall module records complete criterion such as user location, network application, customer location, rule ID, network service, client IP, etc. based on every session, and the firewall module implements Rule based choice of logging as described herein.

In another embodiment, a multi-tenant cloud-based firewall with integrated web proxy method is performed by a node in the cloud. Firewall traffic which is determined to be web traffic (default port 80/443) is sent through the web proxy prior to being processed by the firewall engine or non-web traffic (default non-port 80/443) traffic. Non-web traffic is processed by the firewall engine bypassing the web proxy engine. Rule order precedence of web traffic processed through the web proxy policies before being processed by firewall policies. The firewall module integrated web proxy could reply End User Notification pages if user traffic hits policies with action block.

§ 10.0 Cloud Firewall Deployment Modes

Figure 26:
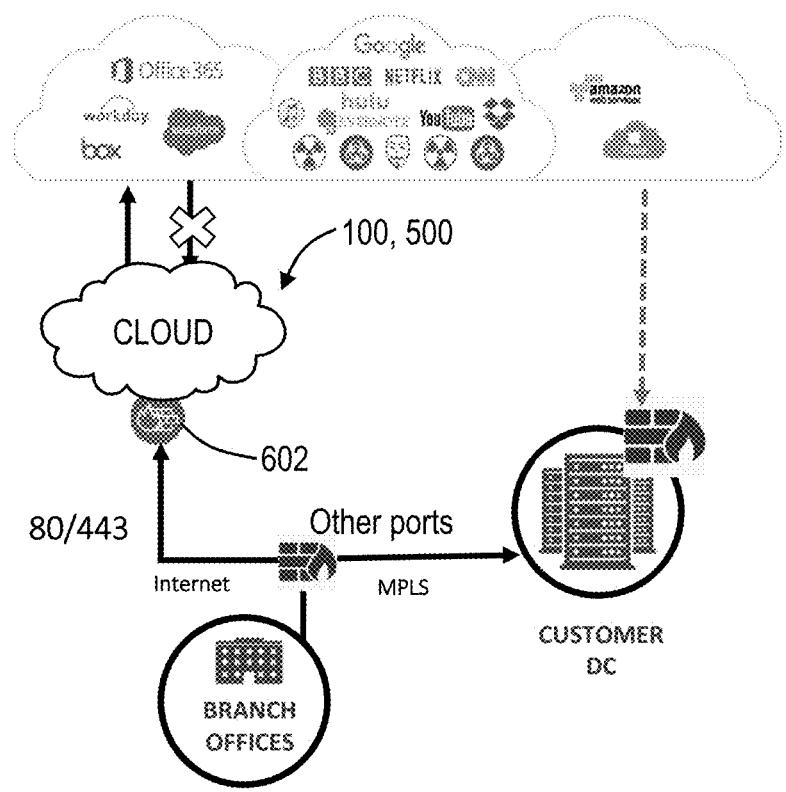
FIGS. 26 and 27 are network diagrams illustrating deployment modes of the cloud firewall.
Figure 27:
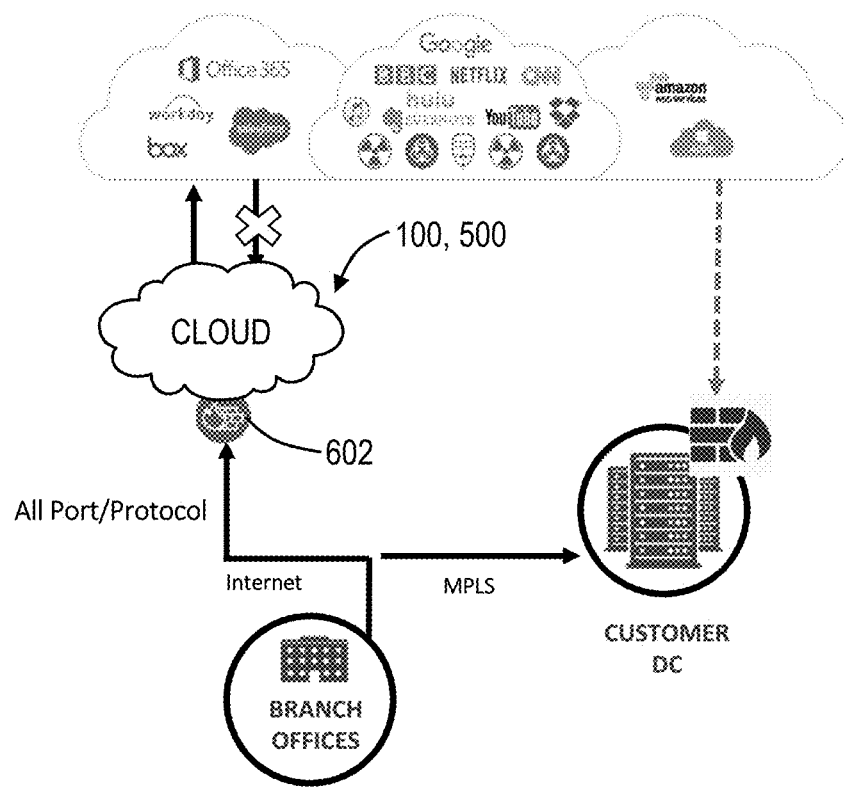

FIGS. 26 and 27 are network diagrams illustrating deployment modes of the cloud firewall 602. Specifically, FIG. 26 includes a web-only breakout for the cloud firewall 602, namely ports 80/443, and FIG. 27 includes a full branch breakout where all traffic (all ports/protocols) is through the cloud firewall 602. Note, FIGS. 26 and 27 illustrate a branch office; of course, this can be a single user. The benefit of the cloud firewall 602 is it removes the requirement for local appliances and provides customer IT control of the firewall 602 for the branch office.

As described herein, the cloud firewall 602 includes 1) Application awareness—Identify applications regardless of port, protocol, evasive tactic, or SSL using DPI engine; 2) User awareness—Identify users, groups, and locations, regardless of IP address; 3) Real-time, granular control and visibility—Globally unified administration, policy management, and reporting; 4) Fully qualified domain name (FQDN) policies—Manage access policies for apps hosted on dynamic IPs (Azure/AWS) or across multiple IPs; and 5) Stateful firewall policies—Apply allow/block security policy based on source and destination IP address, ports, and protocols.

Further, the cloud firewall 602 can be integrated with a Cloud Sandbox, web security, DLP, content filtering, SSL inspection, and malware protection, with cloud-scale correlation, reporting, and analytics, in the cloud system 500 and/or the distributed security system 100.

The cloud firewall 602 includes a proxy-based architecture that dynamically inspects traffic for all users, apps, devices, and locations, natively inspects SSL/TLS traffic—at scale—to detect malware hidden in encrypted traffic, and enables granular firewall policies based upon network app, cloud app, domain name (FQDN), and URL. The cloud firewall 602 includes visibility and simplified management for IT, namely real-time visibility, control, and immediate policy enforcement across the platform, logging of every session in detail, and the use of advanced analytics to correlate events and provide insights. The cloud firewall 602 includes DNS security and control to protect users from reaching malicious domains as the first line of defense, optimizes DNS resolution to deliver better user experience and cloud app performance—critical for Content Delivery Network (CDN)-based apps, and provides granular controls to detect and prevent DNS tunneling. Further, the cloud firewall 602 can support cloud-based IPS to deliver always-on IPS threat protection and coverage, regardless of connection type or location, to inspect all user traffic on and off network, even SSL, and SNORT style signature support.

§ 11.0 Cloud Node Architecture

Figure 28:
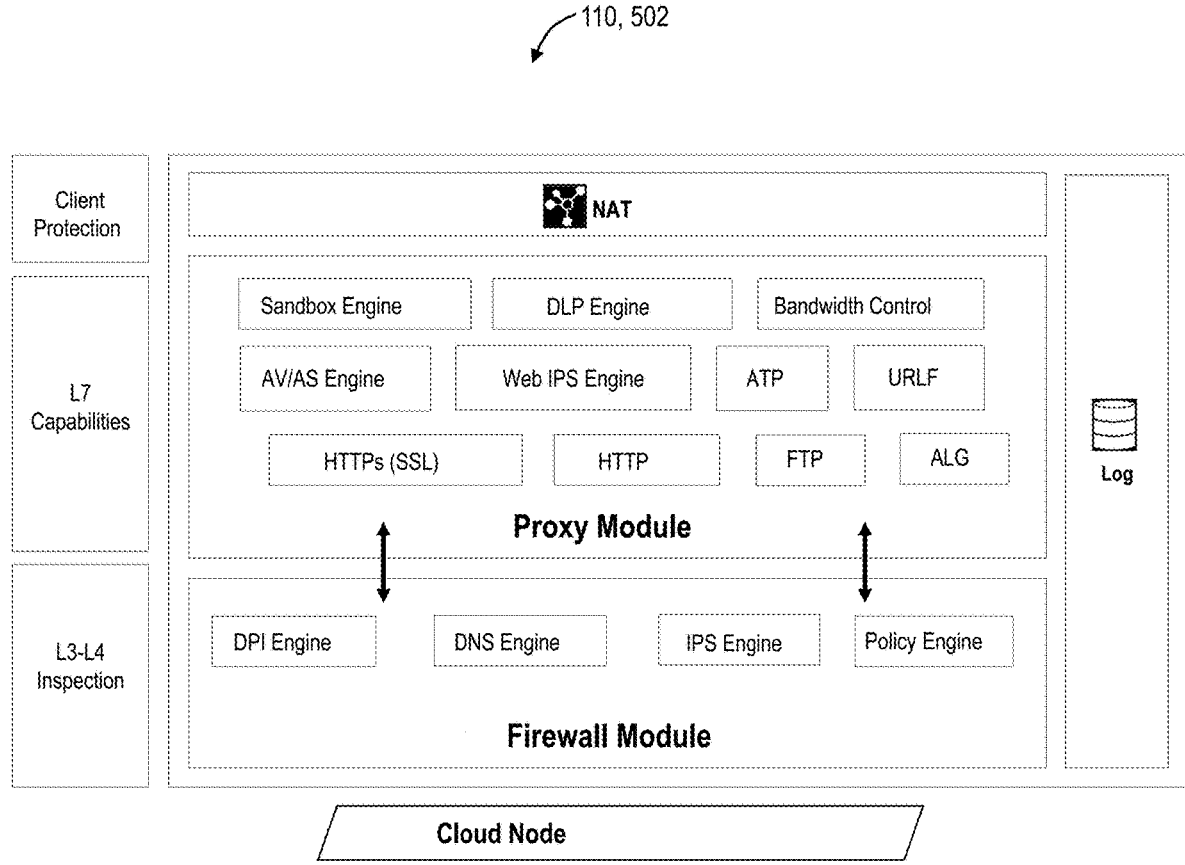
FIG. 28 is a block diagram of functionality in the processing node or the cloud node for implementing various functions described herein

FIG. 28 is a block diagram of functionality in the processing node 110 or the cloud node 502 for implementing various functions described herein. As described herein, the cloud firewall 602 is implemented by the cloud system 500 and/or the distributed security system 100, via the cloud node 502 or the processing node 110. The cloud firewall 602 provides a proxy-based firewall architecture, and FIG. 28 illustrates functional modules for supporting such architecture. A firewall module can provide Layer 3 (L3)-Layer 4 (L4) inspection, via a DPI engine, a DNS engine, an IPS engine, and a policy engine. A proxy module connected to the firewall module can support Layer 7 (L7) capabilities, such as, without limitation, a sandbox engine, a DLP engine, bandwidth control, an AV/AS engine, a web IPS engine, ATP (Advanced Threat Protection), URL filtering, and the like.

Figure 29:
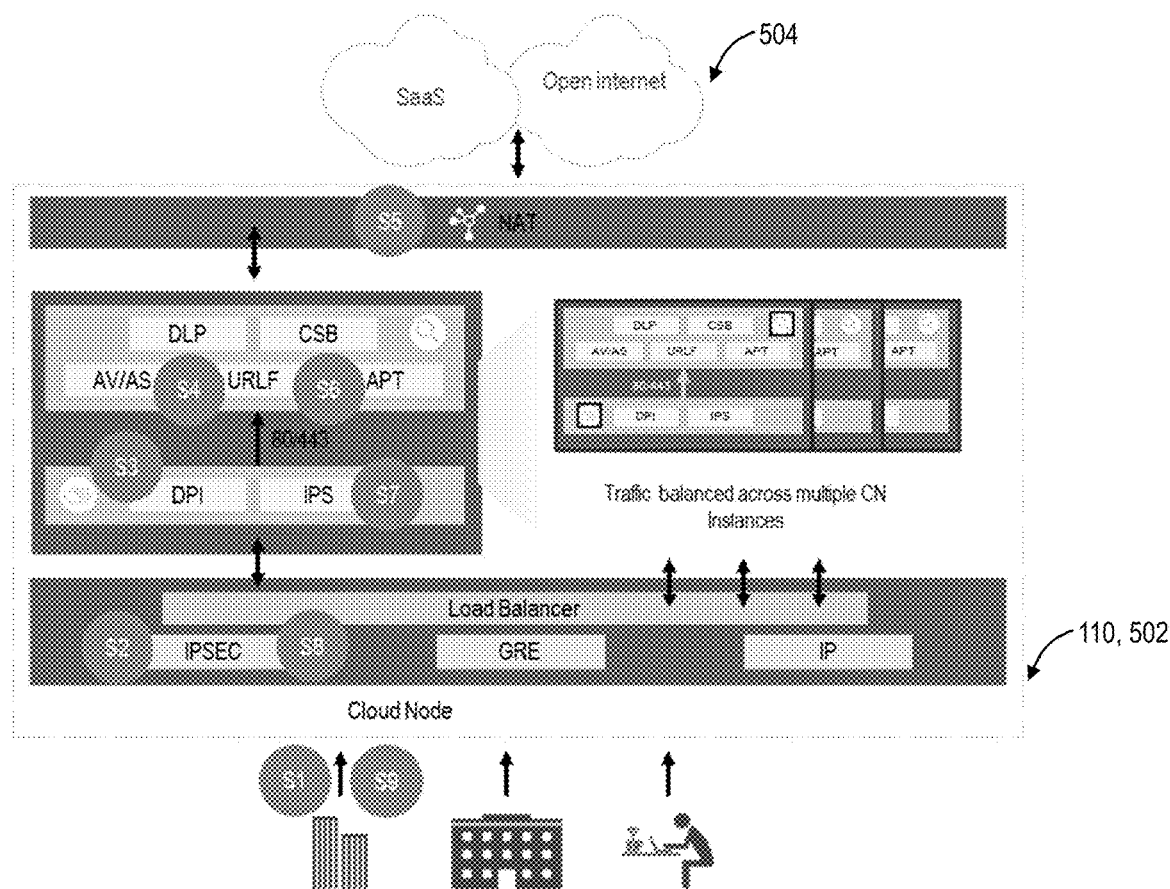
FIG. 29 is a block diagram and flowchart of how a packet is processed inside the processing node or the cloud node.

FIG. 29 is a block diagram and flowchart of how a packet is analyzed inside one of the processing nodes 110 or the cloud nodes 502. In this example, a user (e.g., at the regional office 510, headquarters 520, various employee's homes 530, the mobile laptop 540, and the mobile device 542, etc.) is accessing a cloud-based SaaS, such as Dropbox. Further, the description provided for FIG. 29 makes reference to the cloud system 500 and the cloud node 502, but is equally applicable to the distributed security 100 and the processing nodes 110.

The user, behind a gateway, sends traffic via a primary IPSEC tunnel to the cloud system 500 for accessing the SaaS or the Internet 504 (step S1). The cloud node 502 terminates the IPSEC tunnel and sends traffic to a load balancer and then to a cloud node 502 instance (step S2). The cloud node 502 instance detects a specific app associated with the traffic using DPI and sends to a proxy module (web) (step S3). The proxy module inspects with URL filtering and DLP policies after SSL decryption (step S4). The traffic is NAT'd and sent to a server (step S5), and the user IP is not exposed. Content is inspected on response and evaluated for APT, AV, and sandbox policies (step S6), firewall policy is enforced (step S7), and the traffic is returned encapsulated in the IPSEC tunnel (step S8) for the user to receive the traffic (step S9). Note, an IPSEC tunnel may be used between the regional office 510, headquarters 520, etc. and the cloud system 500. Alternatively, an application can reside on the user device to forward traffic to the cloud system 500, instead of the IPSEC tunnel.

Now, when traffic is sent to the cloud node 502 (or the processing node 110), all traffic first hits the firewall engine. If the traffic is on port 80 or 443 or the firewall engine determines that this traffic (not on port 80 or 443) is web, then it will forward the traffic to the web engine for processing. Once the web engine has processed the traffic it is once again forwarded back to the firewall 602 and the firewall rules are evaluated. If the traffic is not port 80 or 443 and determined to be not web, then the firewall rules are evaluated before forwarding on to the Internet 504.

§ 12.0 Cloud IPS

Figure 30:
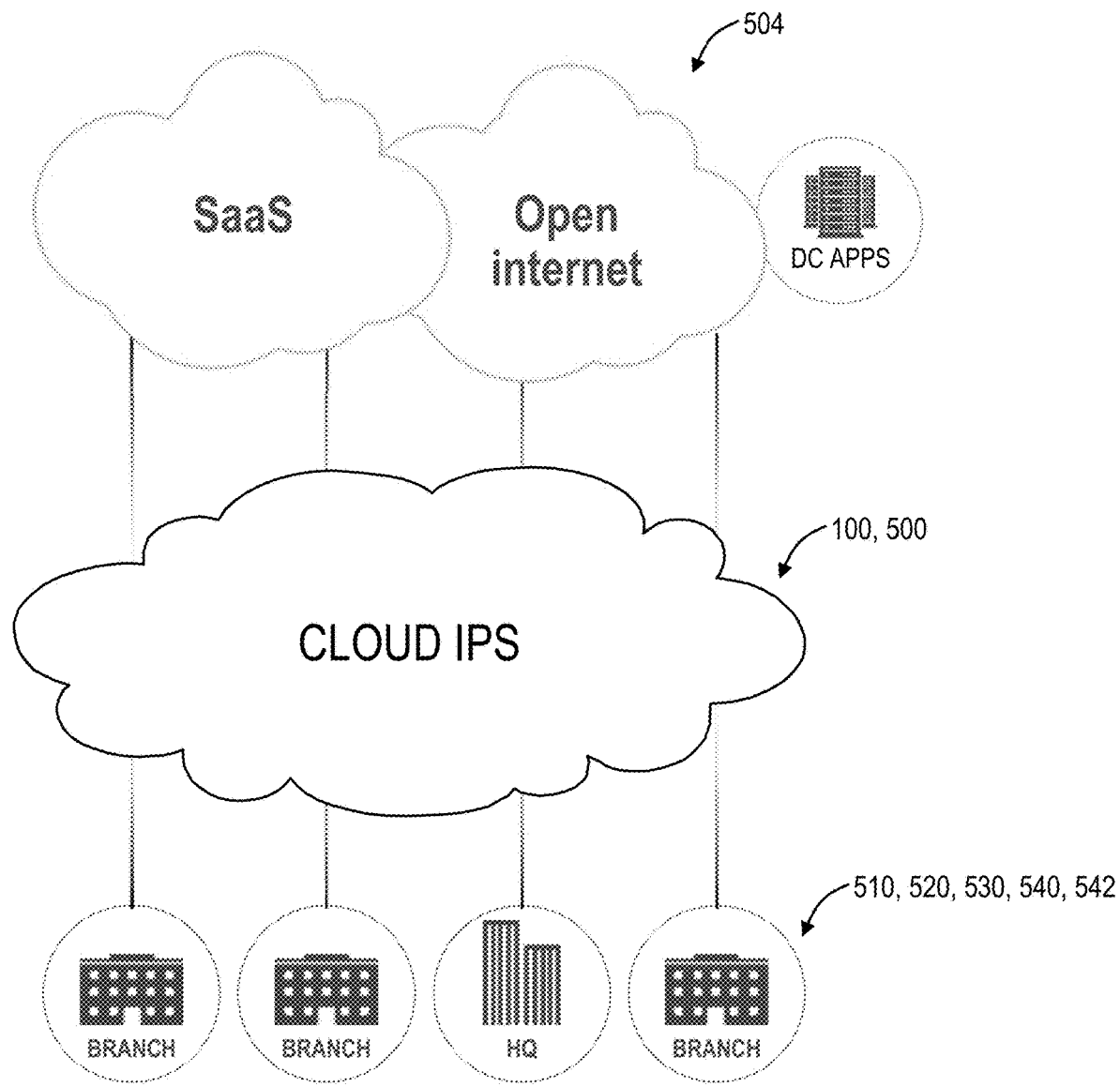
FIG. 30 is a block diagram of a cloud IPS system, implemented via the cloud system of FIG. 5 and/or the distributed security system of FIG. 1.

FIG. 30 is a block diagram of a cloud IPS system 800, implemented via the cloud system 500 and/or the distributed security 100. Attackers are intruding into user host machines (i.e., the user device 400, etc.) to gain server and data access. Static signatures will not work as attackers are getting sophisticated. Further, SSL encrypted traffic is an easy way for hackers to get away. Thus, the cloud IPS system 800 can provide complete protection on all ports and protocols, regardless of location, platform, operating system, etc. The cloud IPS system 800 protect users from Intrusion based on attack signatures, Known and unknown exploits; provides inline detection to identify outbound malware intrusion attacks and block/alert them; provides real-time, granular control and visibility for globally unified administration, policy management, and reporting; and provides SNORT based signatures for detecting Command-and-Control (C2C), exploits, etc. on all ports and protocols.

In today's world, IPS is essential for security and is can be offered as a stand-alone solution, or incorporated in next-generation firewalls, the technology is more pervasive than ever before. But while most companies have some form of IPS in place, there are questions about its effectiveness. Due to the increase in user mobility and the skyrocketing use of cloud services, users and apps have been leaving the network—taking with them precious visibility, the key to IPS. As users access applications off the network and often away from VPNs, they leave behind the IPS, running blind.

Today's IPS solutions are primarily built for server protection, and attackers have moved to primarily targeting users. While protecting the server still has its place, having an IPS that can follow the user and provide always-on inspection of the user connection is fundamental to stopping today's intrusions. Traditional IPS approaches have difficulty scaling to meet the inspection demands of today's organizations. Adding to that challenge, a majority of threats now reside in SSL-encrypted traffic, but there are limits to the amount of SSL traffic IPS hardware can inspect. As internet traffic and user demands increase, organizations must constantly balance the need for performance and the amount of traffic they can inspect. And they must often compromise by inspecting less, thereby increasing threat exposure and organizational risk.

Note, as described herein, the terms customer, enterprise, organization, etc. are used and all refer to some entity's network, computing resources, IT infrastructure, users, etc. Those skilled in the art will recognize these different terms all relate to a similar construct, namely the enterprise 200, regional office 510, the headquarters 520, etc. That is, these terms collectively refer to computing and networking resources that require protection by the cloud system 500 and/or the distributed security system 100.

The objective of the cloud IPS system 800 is to provide an IPS service, via the cloud system 500 and/or the distributed security 100. By delivering IPS from the cloud, all users and offices get always-on IPS threat protection and coverage, regardless of connection type, platform type, operating system, or location. The cloud IPS also restores full visibility into user, app, and internet connections, as all traffic on and off network is fully inspected. Because the cloud IPS 800 is delivered as a service from the cloud system 500 and/or the distributed security system 100, there is unlimited capacity to inspect user traffic, even hard-to-inspect SSL traffic.

Most IPS solutions reside in the data center and lack the ability to deliver visibility and control to off-network traffic. These IPS solutions lose more visibility and control every day, as mobility and SaaS take users and apps off the network. In addition, newer connections—such as SD-WAN, 5G, and direct-to-internet—all encourage organizations to embrace the Internet 504 as their corporate network. All these technological shifts have diminished the value of traditional IPS and hindered its ability keep users safe.

Again, the cloud IPS system 800 delivers IPS from the cloud, which allows IPS to follow the user, regardless of connection type or location. Every time a user connects to the Internet 504 or an app, the cloud IPS system 800 is there. It sits between the connection, inline, providing needed IPS threat visibility that traditional IPS solutions have lost. Organizations can finally restore their lost visibility and threat protection.

One of the major challenges facing traditional IPS solutions is the ability to scale traffic inspection—and correctly sizing IPS solutions is a real guessing game. What seems like the right size can quickly become insufficient as user demands grow, and that triggers costly hardware refreshes. Even more challenging is the need for SSL inspection. The growth of SSL traffic is staggering—it has been reported that over 80 percent of enterprise traffic is now encrypted. But SSL inspection is performance intensive, which is why most IPS hardware solutions fall far short of the task. The result is organizations cannot inspect all their SSL traffic, and with a majority of threats now hiding in SSL, that's a serious risk.

The cloud IPS system 800 turns the inspection challenge into an effortless afterthought. Because the cloud IPS system 800 is delivered from the cloud system 500 and/or the distributed security system 100, inspection is elastically scaled based upon demand. Every user gets unlimited inspection capacity, so there is no need to guess how much inspection is needed going forward. Best of all, SSL inspection is native in the cloud system 500 and/or the distributed security system 100, so there is the freedom to inspect all encrypted traffic.

There is a requirement to understand the meaning of alert data. Key to this task is bringing in full user and application context from external sources and correlating this data. However, many IPS solutions struggle to deliver because the meaningful context and correlation of threat data requires thoughtful integration of multiple security systems. With the cloud IPS system 800, it is a fully integrated platform from day one, with no assembly required. Built from the ground up as a full security stack delivered as a service, the cloud system 500 and/or the distributed security 100 provides multiple threat technologies that expertly work together to unify and correlate the threat data. Here, the cloud firewall 602, cloud sandbox, DLP, Cloud Access Security Broker (CASB), and web and content filtering are all integrated into a unified multi-tenant cloud service. Turn on the services needed, when needed, as demands grow. Because all relevant threat data is in one place, there is full user, file, and app context and the correlation needed to understand the risk posture.

Also, maintaining an IPS can strain IT resources. Consistently testing and deploying IPS signatures is time consuming, error prone, and often requires restrictive change windows. As a result, many companies fall behind on updates, which increases risk. Delivered as a service, the cloud IPS system 800 is constantly updated transparently with the latest vulnerability coverage. Users will always get the latest threat protection.

Further, the cloud system 500 and/or the distributed security 100 has millions of users and thousands of companies around the world, sharing threat data and intelligence. Thus, the cloud IPS system 800 is constantly tracking emerging threats across the cloud and closely collaborating with industry, military, and security organizations to keep the cloud updated. As a result, one gets smarter threat intelligence designed to stop emerging threats quicker and reduce corporate risk. The cloud IPS system 800 can support tens of thousands of signatures and continually update/add new signatures as required.

§ 13.0 Stream Scanning

The various functions described herein, the firewall 602, the cloud IPS system 800, etc., can utilize various approaches to scan traffic in the cloud node 502 and/or the processing node 110. Again, the following description is presented with reference to the cloud node 502 in the cloud-based system 500, but those skilled in the art will recognize the same applies to the processing node 110 in the distributed security 100. One scanning technique can be via a Security Pattern Matching (SPM) engine that is block based typically used for web traffic (HTTP Header+Body scan) if the cloud node 502 proxy inspects HTTP transactions.

Another approach includes a stream scanning approach described herein to perform a packet based or stream-based scan that matches rules based on a Snort style rule syntax. That is, the stream scanning approach borrows the Snort format for writing signatures. For example, the Snort format can be compliant to the SNORT User Manual 2.9.15.1, 2019, the contents of which are incorporated by reference herein in their entirety.

A Snort rule can be broken down into 2 sections:

| Rule Header | Rule Options |
| --- | --- |

The rule header specifies the connection parameters protocol, source IP/port and destination IP and port. The rule header is used to create a tree for a rule database lookup. Here is the anatomy of the rule header.

| Action | Protocol | Address | Port | Direction | Address | Port |
| --- | --- | --- | --- | --- | --- | --- |

For example, alert tcp any any→any 21

Various protocols are supported such as IP (matches any IP protocol), TCP, UDP, etc. Classless Inter-Domain Routing (CIDR) notation can be used to specify an IP address.

Multiple IP address and ports can also be specified. A few examples are given below:

alert tcp any any→any [21,48,50]
alert udp any any←any:1024
alert ip any any< >any 1024:
alert tcp 192.168.0.0/16 any→any:1024
alert tcp 192.168.0.0/16 any→[192.168.0.0/16, 10.10.120.0/24, 172.11.12.41] any The rule options follow the rule header and are enclosed inside a pair of parentheses. There may be one or more options. These options are then separated with a semicolon. If you use multiple options, these options form a logical AND.

For example, (msg:"DoS"; content:"server"; classtype: DoS;)

An example of a complete rule includes alert tcp any any→any 21 (msg:"DoS"; content:"server"; classtype: DoS;)

The following options are used to specify details about the threat.

Threatname is the threat name for the rule. The name for threats can come from a threat library. New threats are found by a researcher and added to the threat library.

Threatcat is an internal categorization of threats. This value can be a name or a number. Here are some example categories:

| | |
| --- | --- |
| advthrt_advanced_security | advthrt_suspicious_dest |
| advthrt_phishing | advthrt_page_risk_ind |
| advthrt_botnet | advthrt_adspyware |
| advthrt_malware_site | advthrt_webspam |
| advthrt_peer_to_peer | advthrt_cryptomining |
| advthrt_unauth_comm | Advthrt_adspyware_sites |
| advthrt_xss | advthrt_exploit |
| advthrt_browser_exploit | advthrt_dos |

Threatid is associated with the given threatname and is a unique identifier for a threat in the threat library.

Experimental rules can be monitoring rules evaluated by a stream scanning (SS) engine normal like any other rule, but when these rules are matched, then no policy is enforced by the cloud node 502. These rules are however logged in the firewall/Weblog records for analysis. Here are two scenarios where these experimental rules will be helpful.

The best possible signature being written appears to be aggressive and may result in False Positives (FPs). The guideline over here is to start with monitor mode signature and then review the hits in production (actual use) for a time period for FPs before promoting the signature to block mode category.

A threat campaign is being scoped out where a generic signature is written to gather domains/IPs which are then processed offline to get content and develop better block mode signatures. These experimental signatures do not result in block mode and are usually phased out after a week or two.

Fast Pattern rules are applicable only to rules that have at-least one pattern specified using content or Perl Compatible Regular Expressions (PCRE) option. These are patterns that are evaluated first. A rule can explicitly specify fast pattern by using the fast_pattern option. The max fast pattern length can be 16 bytes. The fast pattern also should be at least 3 bytes long. A rule with PCRE option must contain at least one content which is eligible to be treated as fast pattern. If no fast_pattern is specified, then the longest content pattern is taken as fast pattern. A fast pattern is automatically taken as ONLY if it does not have any within or distance modifiers.

alert tcp any any any→80 (msg:"DOM Elements"; content:"document.getElementsByTagName";)

For example, in the rule above since there is only one content, we will choose the pattern specified by this content as the fast pattern. However, the pattern is larger than 16 bytes so we will only select 16 bytes from the pattern. So "document.getElem" will be the fast pattern. The rule will be equivalent to writing.

alert tcp any any→any 80 (msg:"DOM Elements"; content:"document.getElem"; fast_pattern:only; content:"document.getElementsByTagName";)

Once the rules are written, then before loading up the rule file, its best to first validate the rules for any errors. A tool can be used to validate the rule file.

§ 13.1 Event Processing

The stream scanning supports rules with event processing using two options namely 'detection_filter' and 'event_filter.' The event processing engine primarily uses the count of number of packets over a certain period of time. The count for the time period is maintained over more than one stream/connection based on what the tracking attribute is. The tracking attribute can be either of source IP, source port, destination IP, and destination port. One key difference from Snort is that Snort does not support tracking by ports. The timer for the count starts after the first packet that matches the rule. Once the timer expires, the new timer again starts after the first match of the rule. Therefore, it is important to note that the timer is NOT aligned to any boundary (like second or hour) rather is dependent on the timing of matches. After the timer expires the counter is reset to 0.

Detection filters can be used to write rules that take into consideration the number of times the rule matches in a given time period. Furthermore, the number of matches can be tracked based on IP address or port of source or the destination.

Detection_filter: track <by_src|by_dst|by_srcport|by_dstport), count c, seconds s;

An example of using a detection filter includes

Alert tcp any any→any 24 (msg:"example"; flags:S; detection_filter:track by_src, 20, 60;)

In the example above, the rule matches if the TCP packet is a SYN (Synchronize) packet (i.e., only the SYN flag is set). However, the rule match alone does not generate an alert. The stream scanner will now check if the detection_filter condition has also been satisfied, i.e., if there are more than 20 SYN packets from the same source IP (as the current packet's source IP) within 60 seconds then it will generate alert.

Note: All packets after the first packet that meets the condition of the detection filter will generate alerts until the time period expires. In the example above after the 20th packet all packets will generate alerts for that 60 second period. It is recommended to use event_filter to reduce the number of alerts.

| Option | Description |
|---|---|
| track by_src \| by_dst \| by_srcport \| by_dstport | Rate is tracked either by one of these attribute. This means count is maintained for each unique source IP addresses or source port or destination IP or destination port. |
| count c | number of rule matching in s seconds that will cause detection_filter limit to be exceeded, c must be nonzero value. A value of −1 disables the detection filter |
| seconds s | time period over which count is accrued. s must be nonzero value. |

Event filters can be used to reduce the number of alerts that are generated. If the rule contains both event_filter and detection_filter, the count and timer for both the options are calculated and maintained separately.

event_filter: type <limit|threshold|both>, track <by_src|by_dst|by_srcport|by_dstport), count c, seconds s;

| Option | Description |
|---|---|
| type limit \| threshold \| both | type limit alerts on the 1st m events during the time interval, then ignores events for the rest of the time interval. Type threshold alerts every m times we see this event during the time interval. Type both alerts once per time interval after seeing m occurrences of the event, then ignores any additional events during the time interval. |
| trackby_src \| by_dst \| by_srcport \| by_dstport | rate is tracked either by one of these attributes. This means count is maintained for each unique source IP addresses or source port or destination IP or destination port. |
| count c | number of rule matching in s seconds that will cause event_filter limit to be exceeded, c must be a nonzero value. A value of −1 disables the event filter |
| seconds s | time period over which count is accrued, s must be nonzero value. |

Example of using event_filter and detection_filter together. When using together, event_filter only considers an event that has passed the detection filter.

Alert tcp any any→any 24 (msg:"example"; flags:S; detection_filter:track by_src, 3, 10; event_filter:type both, track by_src, 2, 10;)

Figure 31:
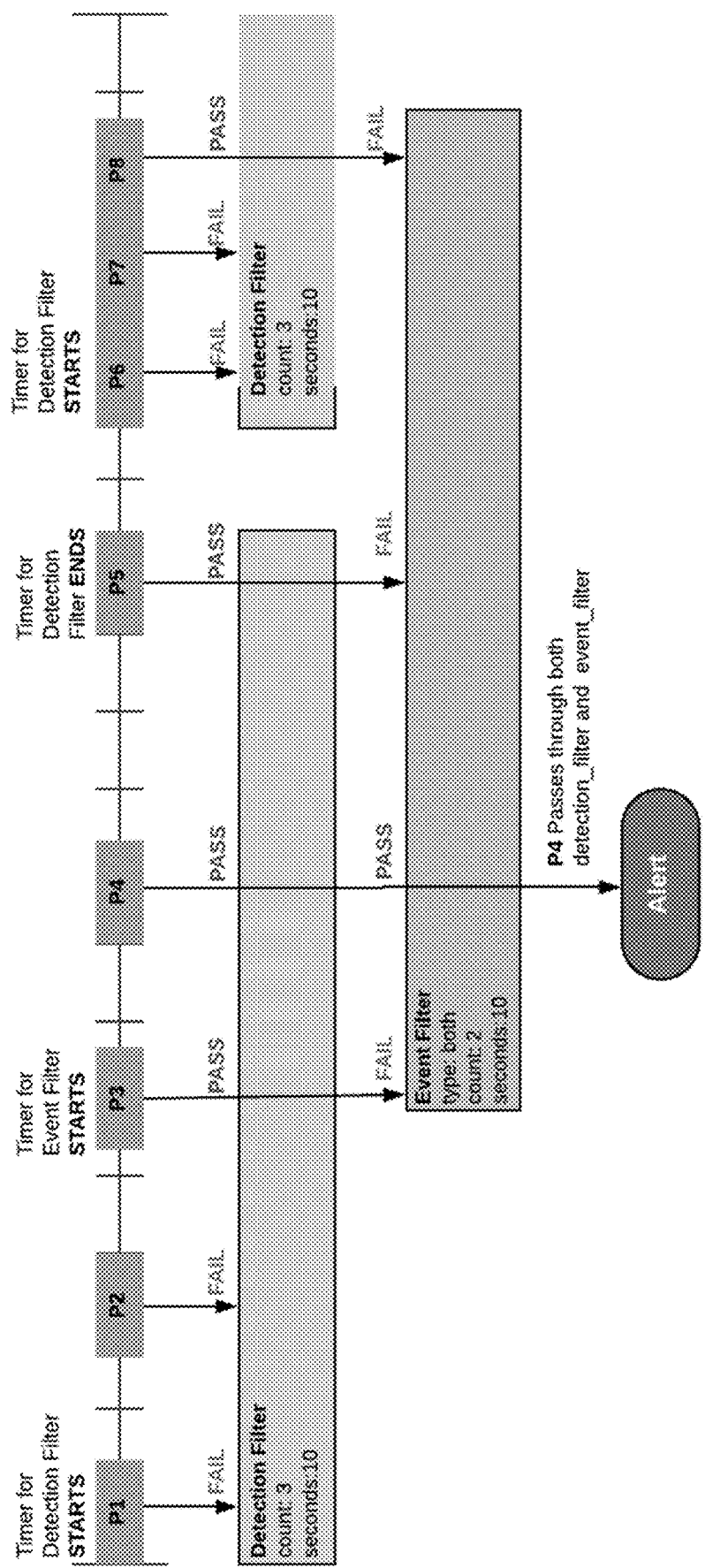
FIG. 31 is a diagram of detection filters and event filters used together for a stream scanner.

FIG. 31 is a diagram of detection filters and event filters used together. In the example of FIG. 31, the event_filter will only alert once on the 2nd alert for the 10 seconds period. Note that the start of the 10 seconds is from the first alert generated when the detection filter condition is true. Important point to note is that the timing period for detection_filter and event_filter is not the same. The timer for detection_filter starts when the rule matches (i.e., in this case when SYN packet is seen) whereas the timer for the event_filter starts when after the first alert is generated by the detection_filter.

§ 13.2 Differences From Snort

This section outlines what are the differences between the stream scanner and Snort when it comes to evaluating the rules. By default, the stream scanner will apply the offset and depth on each packet:

alert tcp any any→any 21 (content:"SMB"; offset:4; depth:5;)

If one wants the stream scanner to match a pattern over a stream rather than a single packet, the keyword 'flow:stream' can be used, i.e., the internal tracking offsets by default always increases as more data is scanned (more packets are seen).

alert tcp any any→any 21 (content:"SMB"; flow:stream; offset:4; depth:5;)

The above rule will only search for pattern between offset 4 to 9 in the entire stream irrespective of the number of packets seen. If the first packet is of size 10, then the search will terminate in the first packet itself.

The stream scanner does not buffer data. This is the most important difference with Snort. Internally, the stream scanner does not buffer any traffic data. This does not mean it will not maintain state for streams. It can still apply pattern matching across packets boundary by maintaining stream state.

The stream scanner can only scan up to the limit of max_scan_size. This limit can be overridden by specifying the max_scan_size in the rule. For the rules with flow: to_server or flow:from_server the limit is only applied on the matching direction. For example, if the rule says 'flow: to_server' then maximum is checked against only total bytes sent to the server. If the direction is not specified, then the rule applies to total bytes in both directions.

alert tcp any any→any 21 (msg:"DoS"; flow:to_server; content:"Test"; max_scan_size:100; classtype:DoS;)

In the above rule, the stream scanner will stop scanning if it sees more than 100 bytes from the client side of the connection.

Apart from having max_scan_size, the stream scanner also enforces packet limit. By default, the packet limit is 16 packets which includes packets from both server and client side. This limit can be configured per rule using the option 'max_count.' The default value of Both max_count and max_scan_size are enforced even if they are not specified in the rule.

alert tcp any any→any 21 (msg:"DoS"; flow:to_server; content:"Test"; max_scan_size:100; max_count:10; classtype:DoS;)

In the above rule, the stream scanner will stop scanning if it sees more than 10 packets (total of both directions) OR more than 100 bytes from the client side of the connection. The maximum value for max_count can be the 2^31, i.e., the limit for signed integer.

By default, Snort will continue matching further packets for flows even after a match is found. When using the stream scanner as part of the cloud node 502, it does not make sense to match more than a single rule for a given session/ transaction since it is only important to log one rule, and the action of (drop/allow) is based on the first matched rule.

alert tcp any any→any 21 (msg:"DoS"; flow:to_server; content:"Test"; max_scan_size:100; single_match:yes; classtype:DoS;)

If you want to force a rule to do multiple match in the cloud node 502, you need to set "single_match:no" explicitly.

alert tcp any any→any 21 (msg:"DoS"; flow:to_server; content:"Test"; max_scan_size:100; single_match; classtype:DoS;)

If yes and no is not specified then "yes" is assumed. For example in the above rule, it is the same as specifying "single_match:yes." This only applies to fast pattern on patterns that are larger than 16.

Let's look at two different cases with below 2 rules.

alert tcp any any→any 21 (msg:"DoS"; content:"for_firstof_part-other_part"; content: "example1"; classtype: DoS;)

alert tcp any any→any 21 (msg:"DoS"; content:"example2"; content:"for_firstof_part-other_part"; fast_pattern; classtype:DoS;)

In the above rules, fast patterns are longer than 16 characters/bytes. In the first rule, the first content is automatically taken as fast pattern while in the second rule the second content is manually specified as the first pattern. In both cases, the first 16 characters of the pattern are chosen and the rules is rewritten internally as below:

alert tcp any any→any 21 (msg:"DoS"; content:"for_firstof_part"; fast_pattern:only; content:"for_firstof_part-other_part"; content: "example1"; classtype:DoS;)

alert tcp any any→any 21 (msg:"DoS"; content:"for_firstof_part"; fast_pattern:only; content:"example2"; content:"for_firstof_part-other_part"; classtype: DoS;)

Now for the First rule, if the fast patterns falls across two packet boundaries then the above rules will never match.

| Packet 1 | Packet 2 |
|---|---|
| a sample data for_first_of_ | part-other_part example1 |

We would have matched the derived fast pattern (that was broken from original pattern) across the pattern boundary at packet 2. But when we go to match the actual complete pattern maximum, we will rewind is only up to the beginning of the Packet 2 where it will fail to find the complete match. The fix for the above rule is to dedicate a pattern for fast_pattern and manually specify it as fast_pattern:only. This way the stream scanner will not break the pattern into 2 parts internally.

alert tcp any any→any 21 (msg:"DoS"; content:"for_firstof_part-other_part"; fast_pattern:only; content: "example1"; classtype:DoS;)

Similarly, for the second rule, we will only start pattern matching if the fast pattern matches first. The fast pattern will only match in packet 2. However when we go to match the content:"example2," we already missed it in packet 1. Hence this rule will not get triggered.

| Packet 1 | Packet 2 |
|---|---|
| a example2 data for_first_of_ | part-other_part |

When multiple patterns are specified, the stream scanner can recursively go back if a pattern fails to match. For example, in the rule below. Recursion can originate from content or byte_test options alert tcp any any→any 21 (msg:"DoS"; content:"this"; content:"is"; distance:0; within:3; content:"ok"; within:"3";)

And for the data—Let's say first this is not ok and later this is ok.

The first 'this is' in the data will match the first 2 content options of the rule, however, the "not" will disqualify the 3rd content from matching. When the 3rd content fails to match, we will go back to again to match the second content "is" from the last matched point. When even "is" fails, then we go all the way back to first content "this" to match from the last matched point (i.e., after the first 'is' in the data). Recursion can slow the process of matching rules and impact performance.

If any dsize is present, then it is the first option to be evaluated, irrespective of the location of dsize within the rule. The dsize will only consider the current size of the packet. Note that dsize is not applied on the size of the stream. Dsize may not be reliable due to TCP reassembly or fragmentation. If dsize fails then the entire packet is skipped.

alert tcp any any→any 21 (msg:"DoS"; content:"master"; dsize:14; content: "server"; classtype:DoS;)

Will test for dsize first. The content pattern will only be searched on packets that are EXACTLY 14 bytes.

alert tcp any any→any 21 (msg:"DoS"; content:"master"; dsize:>14;)

Will search for pattern "master" on all TCP packets to destination port 21 that have packet size greater than 14.

The stream scanner uses two different versions of regex (Regular Expression) engines to evaluate PCRE patterns.

§ 13.3 Supported Options

Here is a list of example options that are supported by the stream scanner:

| Option | Description |
| --- | --- |
| content | Test against a string pattern |
| pcre | Test against a regex pattern. Support for pcre flags is limited. Please refer to the secion 'Supported PCRE flags' |
| byte_test | Extract bytes and test against a value, 'dce' is not supported |
| byte_extract | Extract bytes and store, 'dce' is not supported. Extracted variable cannot be used across rules. |
| byte_jump | Jump to a offset based on extracted bytes, 'dce' is not supported |
| isdataat | Check the size of the payload |
| distance | Modifier for content/pcre |
| within | Modifier for content/pcre |
| offset | Modifier for content/pcre |
| depth | Modifier for content/pcre |
| flags | Filters on TCP flags. Supports ignoring of flags too. |
| flow | Supported options<br>To_server & from_client<br>From_server & to_client<br>No_stream<br>Established (always enabled) |
| flowbits | Supported actions<br>1. set<br>2. unset<br>3. isset<br>4. Isnotset<br>5. noalert |
| nocase | Caseless match for content, pcre |
| fast_pattern | Sets the pattern as fast_pattern |
| stream_size | Limit the size of the stream |
| detection_filter | Post detection option based on rate of packet |
| event_filter | Controls the amount of alerts for each rule. Only allowed within rule and not as a standalone option. |

Here is list of options, that are added to support specific use cases in the cloud system 500 and to integrate with other modules such as the firewall 602, the cloud IPS system 800, etc.

| Option | Description |
| --- | --- |
| threatname | Threat name from threat database |
| threatid | Threat id |
| threatcat | Threat Category (same was Malware category in Web logs) |
| rank | Threat Rank |
| fw_appid | Firewall Application Id (for future use) |
| experimental | Marks the rule as experimental. Has effects only when using SS in inline mode in the cloud node |
| noalert | Same as flowbits:noalert;<br>Does all evaluation of the rule but does not generate an alert when rule matches. In API mode, the rule will not generate a callback. |
| max_scan_size | Same as stream_size but limit applied on both directions of traffic. |

These rules do not impact the evaluation of the signature and is added only to make external rules usable in the stream scanner.

| Option | Description |
| --- | --- |
| msg | Message to display. |
| classtype | The snort classtype |
| reference | Reference for the rule |
| metadata | Metadata for the rule |
| sid | Snort id |
| gen_id | |
| rev | The revision number |

Supported HTTP Modifiers for Content

| Option | Description |
| --- | --- |
| http_uri | The URI for http |
| http_method | The HTTP Method |
| http_header | Start of HTTP header |
| http_cookie | The HTTP cookie |
| http_client_body | The start of HTTP client body |

Example of using HTTP modifiers for content are given below:

alert tcp any any→any 80 (msg:"example website"; content:"www.example.com"; http_uri;)

alert tcp any any→any 80 (msg:"example website"; content:"POST"; http_method; distance:2; content: "www.example.com"; http_uri;)

§ 13.4 Rule Evaluation Mechanism

This section describes the internal workings of the stream scanning engine. It gives an overview of how the internal structures are created for rules and what sequence is followed to evaluate rules. The design principle closely tries to mimic the Snort evaluation order while also keeping performance in mind.

§ 13.4.1 Rule Grouping

Figure 32:
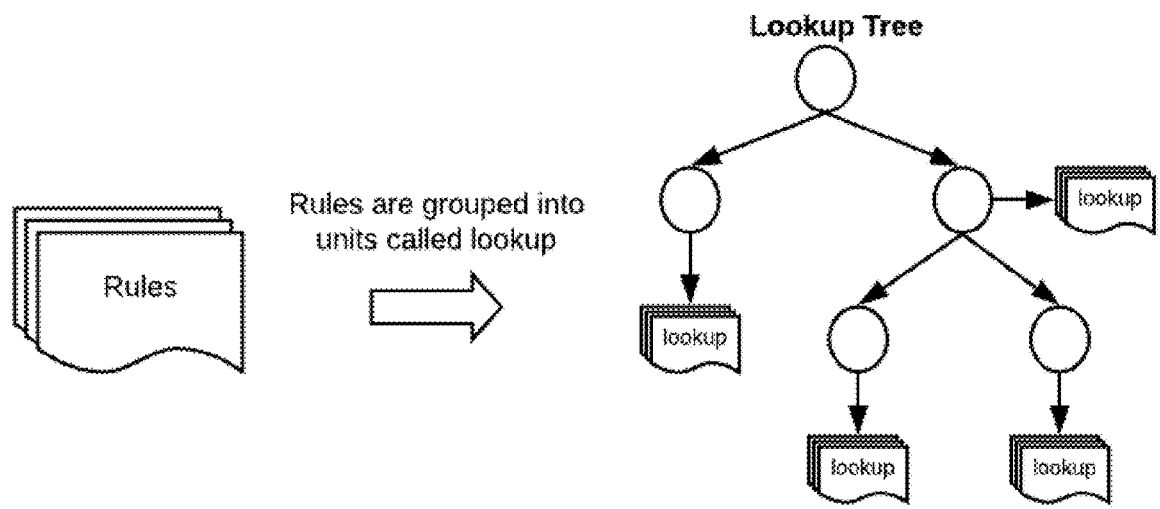
FIG. 32 is a diagram illustrating rule grouping in a lookup tree.

During the compilation stage, similar rules are grouped together based on criteria (described in the next topic). These groups are referred to as lookup objects. The grouping step constructs a lookup tree whose edges are individual lookup objects (rule groups). During the data path, the stream scanner will first walk through the lookup tree and select one or more lookup objects to evaluate. Once lookup objects are selected, the stream scanner will proceed to match fast patterns for the rules in those lookup groups. FIG. 32 is a diagram illustrating rule grouping in a lookup tree.

§ 13.4.2 Grouping Attributes

Below are the attributes used to create the lookup tree. Each level of the lookup tree indicates a grouping attribute. For example, at the top-level protocol is used as a grouping attribute. At the root node of the lookup tree each branch represents a unique value of protocol.

| Order | Attribute | Description | Algorithm Used for Searching |
| --- | --- | --- | --- |
| 1 | Protocol | TCP, UDP, ICMP or any | Linear Table |
| 2 | Destination Port | The destination port from TCP and UDP Datagram. For ICMP it's always 0 (signifies any) | Linear Table |
| 3 | Destination IP | IPv4 Destination IP from the IP datagram | Patricia Tree with bit widths [4, 4, 4, 4, 4, 4, 4, 4] |

| Order | Attribute | Description | Algorithm Used for Searching |
|---|---|---|---|
| 4 | Source Port | The source port from TCP and UDP datagram. For ICMP its always 0. | Patricia Tree with bit width [3, 3, 3, 3, 4] |
| 5 | Source IP | IPv4 Source IP from the IP Datagram. | Patricia Tree with bit widths [4, 4, 4, 4, 4, 4, 4, 4] |
| 6 | Direction | The direction of Traffic flow. Determined by to_server (flow:to_server) or from server (low:from_server) or both if no direction is specified. | Linear Table |

§ 13.4.3 Fast Pattern on Lookups

The fast pattern of rules belonging to the same lookup object (rule group) are added into single multi pattern search interface. Search interfaces are lower-level string search engines like aho-corasick, hyperscan or sregex. Currently these fast patterns are added to a aho-corasick search engine (acism). There could be one or more matches among the fast patterns. The stream scanner then takes the individual rules that belong to the matched fast pattern and starts evaluating those rules. Some Rules in the rule group may not have any pattern (neither contents nor PCRE) at all. These rules are called default rules since they will immediately be evaluated once a lookup is selected before fast pattern evaluation is performed. A group can contain multiple default rules along side with multiple rules with patterns.

§ 13.4.4 Single Rule Evaluation

Figure 33:
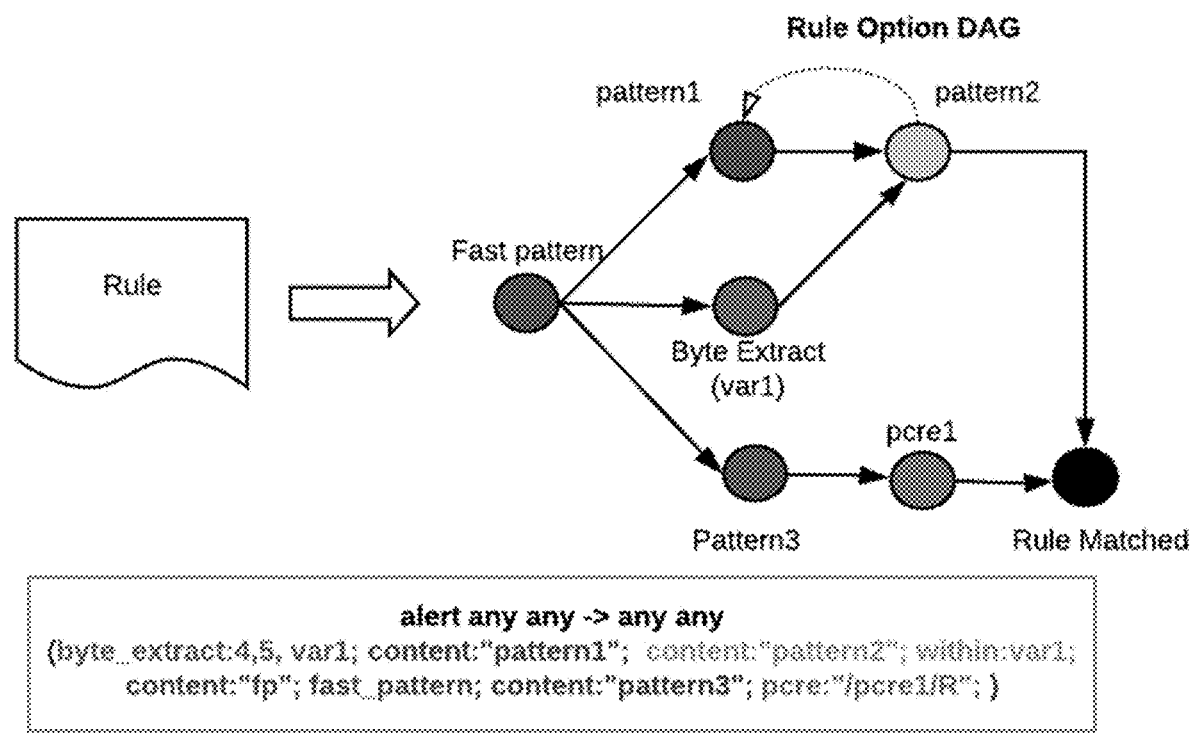
FIG. 33 is a diagram of an example rule option Directed Acyclic Graph (DAG)

All rules selected from the lookup objects are evaluated individually. For rules with patterns, evaluation only starts if the fast pattern matches. A rule can contain multiple rule options (like content, byte_test, etc.). These options form what is called a rule option DAG (directed acyclic graph). For a rule to match all the rule options have to match. FIG. 33 is a diagram of an example rule option Directed Acyclic Graph (DAG).

The dependency in the DAG is determined by the rule option modifiers. For example, assume two 'content' options and the second 'content' has a 'within' modifier. The second 'content' has a dependency on the first 'content' and is only evaluated if the first contain matched. Similarly, if there are options that use a variable defined by 'byte_extract,' then all those options will be dependent on the byte_extract option. Those options will only be evaluated after byte_extract succeeds.

During pattern matching, if recursion occurs then, we may walk back in DAG. The dotted lines in FIG. 33 represent the recursion transition for the states. For example, if 'pattern2' fails in the above DAG then it will clear the state of 'pattern1' from matched to non-matched. In the example above, note that 'pcre' is dependent on 'content:"pattern3"' because of the 'R' (Relative) flag.

§ 13.4.5 From Data to Matches

Figure 34:
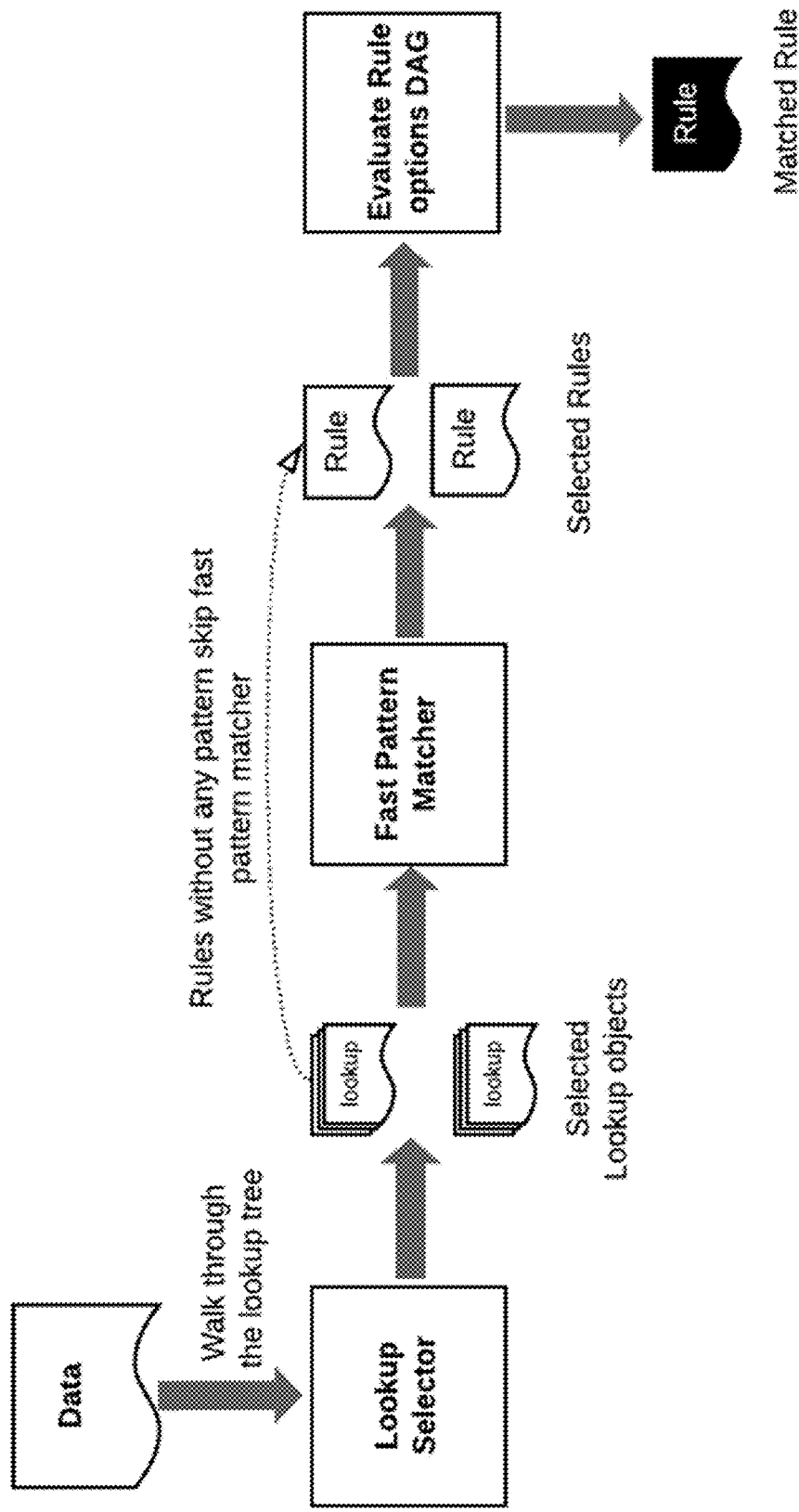
FIG. 34 is a diagram of the overall flow when data arrives on the stream scanning engine.

FIG. 34 is a diagram of the overall flow when data arrives on the stream scanning engine. At first, we extract the grouping attributes from the data, then using the attribute we walk through the lookup tree and select the matching lookup objects. It might find none, one or many lookup objects. If no lookup object is found for given attributes, then the search terminates there.

Now it processes the lookup objects individually. Rules that do not have any fast pattern are immediately evaluated. For other rules with fast pattern first the fast pattern must match before it is evaluated. Once the fast pattern is matched, the rule is evaluated individually. The rule options DAG is evaluated, and if all the options matches, then the rule is finally matched. The stream scanning engine can match multiple rules for a given data.

§ 14.0 Stream Scanner on a Cloud Node

Figure 35:
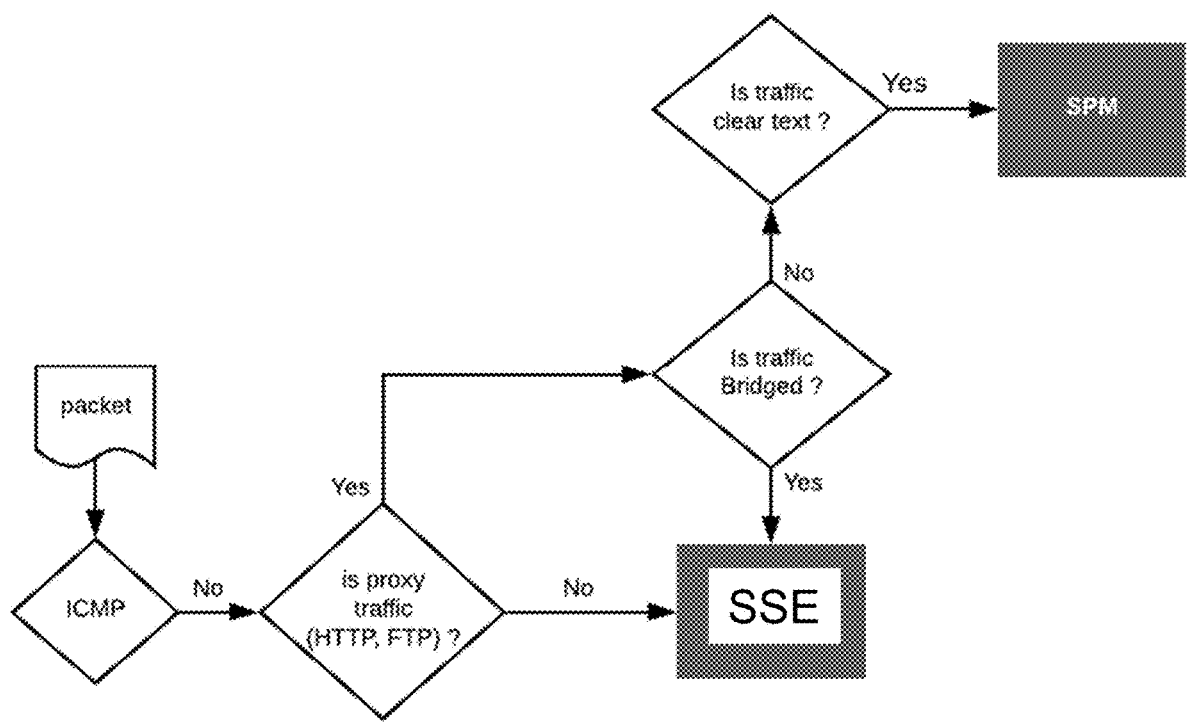
FIG. 35 is a flowchart of scan processing at a cloud node.

The cloud node 502 (or the processing node 110) can execute a stream scanning engine. The stream scanning engine runs in the firewall NAT layer hence all traffic destined for NAT'ing is scanned. Note that non-NAT'd traffic like HTTP, HTTPS does not go through the stream scanning engine. Any bridged traffic, i.e., non-HTTP traffic bridged using HTTP protocol, is also passed through the stream scanning engine. FIG. 35 is a flowchart of scan processing at a cloud node 502, with a Stream Scanning Engine (SSE) and Security Pattern Matching (SPM).

§ 14.1 Threat Detection Between SPM and SSE

Threats policy can be specified both in Proxy configuration (Admin>policy>Advanced Threat Protection) and from IPS rules (Admin>policy>IPS Control). There can be a situation where Proxy configuration for Advanced Threat Protection is set to Allow; however, IPS rules for the same threat category is set to Block/Drop. A transaction is identified to contain a threat but is allowed by the Proxy because the action is set to allow, However Firewall will block the session containing this Transaction. The end result is that the said transaction will still be blocked.

Figure 36:
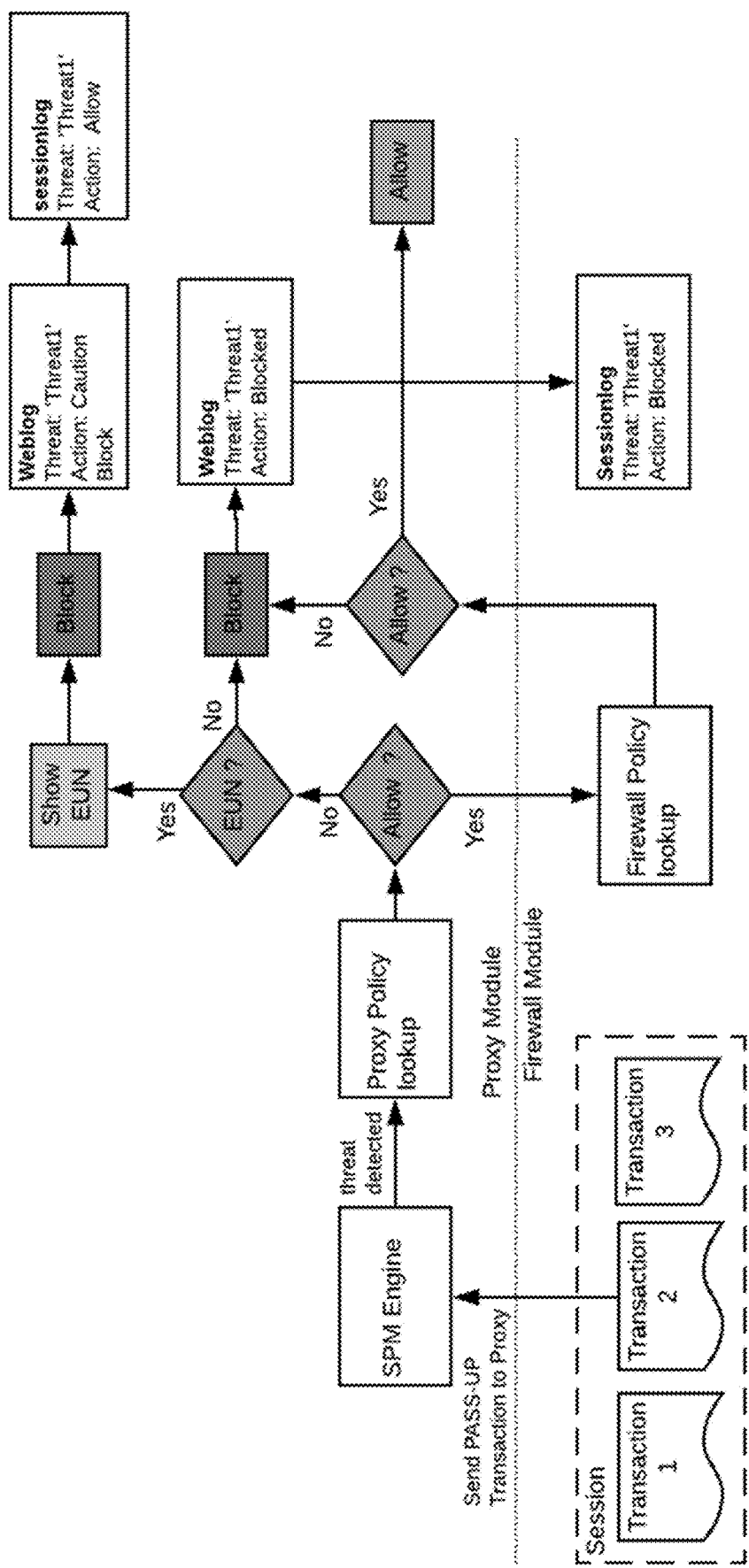
FIG. 36 is a flow diagram of functions performed by the cloud node between a firewall module and a proxy module.

FIG. 36 is a flow diagram of functions performed by the cloud node 502 between a firewall module and a proxy module.

When the cloud node 502 starts up for the first time, it loads the rule file specified by the option 'rulefile' in sc.conf. A new rule file can be loaded on a running cloud node 502. Any files pushed through smcdss gets loaded and replaces the current database.

In production deployment for privacy and security reasons, we cannot keep plain text rules files. Specially in private and virtual cloud nodes 502 where customers have login access, it is important they not be able to access the rules. To enable privacy of rule files, the stream scanner supports reading encrypted files. The stream scanner can be disabled by not providing any rule file.

§ 15.0 Stream Scanner Statistics

The stream scanner maintains various statistics internally that can be used to measure the performance of a particular rule (including rule groups) or a pattern. These stats are internally always collected.

It will be appreciated that some embodiments described herein may include one or more generic or specialized processors ("one or more processors") such as microprocessors, digital signal processors, customized processors, and Field-Programmable Gate Arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic. Of course, a combination of the aforementioned approaches may be used. Moreover, some embodiments may be implemented as a non-transitory computer-readable storage medium having computer-readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read-Only Memory), an EPROM (Erasable Programmable Read-Only Memory), an EEPROM (Electrically Erasable Programmable Read-Only Memory), Flash memory, and the like. When stored in the non-transitory computer-readable medium, the software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method implemented by a cloud-based system comprising steps of:
    responsive to connecting to a user device with a user associated with a first tenant of a plurality of tenants, obtaining security policies for the user that are configured for the tenant, wherein the security policies for the user are the same regardless of connection type, location of the user, and device type and operating system of the user device;
    stream scanning traffic between the user device and the Internet based on the security policies, wherein the security policies are for firewall and intrusion prevention functions and the security policies includes a plurality of rules, wherein the stream scanning includes applying the plurality of rules to packets associated with the traffic for pattern matching, maintaining a state of the pattern matching across packet boundaries while not buffering any of the traffic where there are a plurality of patterns each broken intro parts for monitoring across the packet boundaries, and determining the pattern matching based on the state utilizing a rule option Directed Acyclic Graph (DAG) to track the plurality of patterns wherein the DAG defines a dependency determined by a rule option modifier; and
    one of allowing and blocking the traffic based on the pattern matching of the stream scanning.

2. The method of claim 1, wherein the steps further include
    responsive to connecting to a user device with a second user associated with a second tenant of the plurality of tenants, obtaining second security policies for the second user that are configured for the second tenant, wherein the second security policies are different from the security policies.

3. The method of claim 1, wherein the steps further include
    disconnecting from the user device and subsequently reconnecting to the user device at a different location, wherein the different location is any of a home, a branch office, headquarters, and a road network.

4. The method of claim 1, wherein the stream scanning and the one of allowing and blocking is performed via a server in the cloud-based system, without a physical security appliance.

5. The method of claim 1, wherein the traffic includes web and non-web applications.

6. The method of claim 1, wherein the traffic includes encrypted traffic with the cloud-based system inline between the user device and a destination of the traffic.

7. The method of claim 1, wherein the steps further include
    analyzing the traffic for a plurality of malware, spyware, viruses, email spam, data loss prevention, and content filtering.

8. The method of claim 1, wherein the steps further include
    responsive to the traffic being destined for a software-as-a-service (Saas) provider, operating as a cloud access security broker (CASB) on the traffic and on data for the user stored with the SaaS provider, wherein the CASB is part of a unified multi-tenant cloud service.

9. The method of claim 1, wherein the traffic includes any port and any protocol, between the user and the Internet.

10. A non-transitory computer-readable storage medium having computer readable code stored thereon for programming a processor, in a node of a cloud-based security system, to perform steps of:
    responsive to connecting to a user device with a user associated with a first tenant of a plurality of tenants, obtaining security policies for the user that are configured for the tenant, wherein the security policies for the user are the same regardless of connection type, location of the user, and device type and operating system of the user device;
    stream scanning traffic between the user device and the Internet based on the security policies, wherein the security policies are for firewall and intrusion prevention functions and the security policies includes a plurality of rules, wherein the stream scanning includes applying the plurality of rules to packets associated with the traffic for pattern matching, maintaining a state of the pattern matching across packet boundaries while not buffering any of the traffic where there are a plurality of patterns each broken intro parts for monitoring across the packet boundaries, and determining the pattern matching based on the state utilizing a rule option Directed Acyclic Graph (DAG) to track the plurality of patterns wherein the DAG defines a dependency determined by a rule option modifier; and
    one of allowing and blocking the traffic based on the pattern matching of the stream scanning.

11. The non-transitory computer-readable storage medium of claim 10, wherein the steps further include
    responsive to connecting to a user device with a second user associated with a second tenant of the plurality of tenants, obtaining second security policies for the second user that are configured for the second tenant, wherein the second security policies are different from the security policies.

12. The non-transitory computer-readable storage medium of claim 10, wherein the steps further include
    disconnecting from the user device and subsequently reconnecting to the user device at a different location, wherein the different location is any of a home, a branch office, headquarters, and a road network.

13. The non-transitory computer-readable storage medium of claim 10, wherein the stream scanning and the one of allowing and blocking is performed via a server in the cloud-based system, without a physical security appliance.

14. The non-transitory computer-readable storage medium of claim 10, wherein the traffic includes web and non-web applications.

15. The non-transitory computer-readable storage medium of claim 10, wherein the traffic includes encrypted traffic with the cloud-based system inline between the user device and a destination of the traffic.

16. The non-transitory computer-readable storage medium of claim 10, wherein the steps further include
analyzing the traffic for a plurality of malware, spyware, viruses, email spam, data loss prevention, and content filtering.

17. The non-transitory computer-readable storage medium of claim 10, wherein the steps further include
responsive to the traffic being destined for a software-as-a-service (Saas) provider, operating as a cloud access security broker (CASB) on the traffic and on data for the user stored with the SaaS provider.

18. The non-transitory computer-readable storage medium of claim 10, wherein the traffic includes any port and any protocol, between the user and the Internet.

\* \* \* \* \*